(12) United States Patent
Hasako et al.

(10) Patent No.: US 7,103,800 B2
(45) Date of Patent: Sep. 5, 2006

(54) DISPLAY DEVICE, RECEIVER, AND TEST APPARATUS

(75) Inventors: Satoshi Hasako, Iizuka (JP); Masahiro Maki, Iizuka (JP); Yuji Igata, Tukushino (JP); Junji Kondou, Tagawa-Gun (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 671 days.

(21) Appl. No.: 10/291,695

(22) Filed: Nov. 12, 2002

(65) Prior Publication Data

US 2003/0093715 A1   May 15, 2003

(30) Foreign Application Priority Data

Nov. 9, 2001   (JP) .............................. 2001-344282

(51) Int. Cl.
    *G06F 11/00*   (2006.01)
(52) U.S. Cl. .......................... 714/25; 348/177; 348/181
(58) Field of Classification Search ................ 348/181, 348/177
    See application file for complete search history.

(56) References Cited

U.S. PATENT DOCUMENTS 5,537,145 A * 7/1996 Miseli .................. 348/181
5,572,444 A * 11/1996 Lentz et al. ............... 702/117
5,969,756 A * 10/1999 Buckley et al. ............. 348/190
6,326,996 B1 * 12/2001 Brabander ................. 348/189
2003/0036866 A1 * 2/2003 Nair et al. .................. 702/81

FOREIGN PATENT DOCUMENTS

| EP | 0 540 200 | 5/1993 |
| EP | 0 716 312 | 6/1996 |
| JP | 7-170179 | 7/1995 |
| JP | 10-132901 | 5/1998 |
| JP | 10-267999 | 10/1998 |
| WO | 96/08811 | 3/1996 |

* cited by examiner

*Primary Examiner*—Robert Beausoliel
*Assistant Examiner*—Yolanda L Wilson
(74) *Attorney, Agent, or Firm*—Wenderoth, Lind & Ponack, L.L.P.

(57) ABSTRACT

A display device comprises an inspection circuit for inspecting a data reception related circuit to generate inspection information, an inspection result image generation circuit for generating image data indicating the inspection information, a display switching circuit for superimposing inspection result image data on test video data, and a display unit for displaying the test video data superimposing the inspection result image data. As a result, it is possible to carry out inspection after assembly of the display device without disassembling the display device. This in turn makes it possible to carry out a test in a simple manner on the data reception related circuit inside the display device without changing noise environment inside the display device.

63 Claims, 21 Drawing Sheets clock signal clk1
$= Ac \times \sin(2 \times \pi \times fc \times t)$ jitter signal clk2
$= Aj \times \sin(2 \times \pi \times fj \times t)$ output signal clk3
$= Ac \times \sin(2 \times \pi \times fc \times t + Aj \times \sin(2 \times \pi \times fj \times t))$ Ac : clock amplitude
Aj : jitter amplitude
fc : clock frequency
fj : jitter frequency

Fig. 14

| jitter frequency | PLL | data error rate |
|---|---|---|
| 10kHz | OK | $1 \times 10^{-12}$ |
| 20kHz | OK | $2 \times 10^{-12}$ |
| 50kHz | NG | $2 \times 10^{-3}$ |
| 100kHz | OK | $3 \times 10^{-13}$ |
| 200kHz | OK | $4 \times 10^{-14}$ |
| ......... | ......... | ......... |
| ......... | ......... | ......... |

| jitter frequency | PLL | data error rate |
|---|---|---|
| 10kHz | OK | $1 \times 10^{-12}$ |
| 20kHz | OK | $2 \times 10^{-12}$ |
| 50kHz | NG | $2 \times 10^{-3}$ |
| 100kHz | OK | $3 \times 10^{-13}$ |
| 200kHz | OK | $4 \times 10^{-14}$ |
| ......... | ......... | ......... |
| ......... | ......... | ......... | inspection result image B main screen 310 main screen 310 test image A

DISPLAY DEVICE, RECEIVER, AND TEST APPARATUS

BACKGROUND OF THE INVENTION

1. Field of the Invention

The present invention relates to display devices to be tested and their associated technologies.

2. Description of the Related Art

Conventionally known as a standard related to a technology for performing high-speed transmission of digital video data is a standard "Digital Visual Interface Revision 1.0" (hereinafter referred to as the DVI standard (see http://www.ddwg.org/)), published on Apr. 2, 1999.

FIG. 23 is a block diagram illustrating a typical digital video data transmit/receive system that is configured according to the DVI standard.

As shown in FIG. 23, this digital video data transmit/receive system comprises a video data transmitter 500, a cable 501, and a display device 502.

The video data transmitter 500 is connected to the display device 502 through the cable 501.

The video data transmitter 500 includes a video generation circuit 503, a data transmission circuit 504, a clock signal generation circuit 505, a control signal transmission circuit 506, and a control signal reception circuit 507.

The display device 502 includes a reception LSI (reception integrated circuit) 508 and a display unit 509. The reception LSI 508 includes a data reception circuit 510, a PLL circuit (Phase Locked Loop) 511, a control signal reception circuit 512, and a control signal transmission circuit 513.

Now, the operation of the system is briefly described below.

As shown in FIG. 23, the control signal transmission circuit 506 of the video data transmitter 500 sends a control signal informing of transmission of video data to the control signal reception circuit 512 of the display device 502 via the cable 501.

The control signal reception circuit 512 then receives the control signal.

The control signal transmission circuit 513 of the display device 502 transmits display control information such as resolutions of the display device 502 to the control signal reception circuit 507 of the video data transmitter 500 via the cable 501.

The clock signal generation circuit 505 of the video data transmitter 500 generates a clock signal and sends it to the video generation circuit 503 and the PLL circuit 511 of the display device 502.

The video generation circuit 503 outputs video data in sync with the clock signal supplied by the clock signal generation circuit 505.

Then, the data transmission circuit 504 transmits the video data outputted by the video generation circuit 503 to the data reception circuit 510 of the display device 502 via the cable 501.

The data reception circuit 510 of the display device 502 captures the video data in sync with a timing signal that is generated by the PLL circuit 511 in sync with the clock signal.

The data reception circuit 510 outputs the captured video data to the display unit 509, on which the video data is in turn displayed.

Conventionally, image disturbances appearing on the display unit 509 are visually inspected or data error rates are measured to check the operation of such the digital video data transmit/receive system.

OBJECTS AND SUMMARY OF THE INVENTION

However, there have been problems with such a visual inspection that different inspectors provide different results depending on their inspection capability, and even skilled inspectors may overlook slight or instantaneous disturbances.

On the other hand, data error rates have been measured with an error rate measurement board being connected to a prototype board that has a similar function to that of the circuit included in the reception LSI 508.

However, in the actual process of product development, tests have to be carried out for a prototype device of the final display device 502.

In this case, conventionally, prior to assembly of the display device 502, the error rate measurement board has been connected to an internal board to measure data error rates.

However, noise environments are different between before and after assembly of the display device 502. In particular, since the display device 502 receives data that is transmitted by the video data transmitter 500 at as high a rate as GHz, the circuits, such as the data reception circuit 510 provided in the display device 502 are significantly dependent on noise environments.

This may create different noise environments before and after assembly of the display device 502, thus making it inevitable to carry out inspection with better accuracy.

There has also been another problem that when some glitch is found and must be inspected again after assembly of the display device 502, the display device 502 must be disassembled to connect the error rate measurement board to the internal board of the display device 502 at much expense in time and manpower.

There has also been another problem that a separate connector must be mounted on the internal board of the display device 502 to be connected to the error rate measurement board, thereby causing an increase in packaging area and requiring additional fabrication time.

In addition, there has been another problem that testing conditions have been set manually at much expense in time and manpower.

On the other hand, it is important to check the operation of the PLL circuit 511. However, the method described in the DVI standard only allows for observing data error rates to indirectly estimate the possibility of the malfunctioning of the PLL circuit 511, providing no means for detecting a malfunction of the PLL circuit 511 itself.

This also provides another problem that when a malfunction of the display device 502 is found, it cannot be exactly determined whether the malfunction is caused by a malfunction of the PLL circuit 511 or other transmission degrading factors (such as an attenuation in cable or skew), resulting in time-consuming trial-and-error troubleshooting.

On the other hand, to measure data error rates or test the malfunction of the PLL circuit 511 after assembly of the display device 502, also available is to provide an output terminal for a signal indicating test results outside the display device 502.

However, given the trend that sales success also depends significantly on the outer appearance of the display device 502, it is not preferable to provide the display device with the aforementioned terminal that is not always necessary for general users but exposed on the device.

In the case where a circuit for generating a signal indicating test results is built in the reception LSI 508, it is also necessary to provide for a pin for outputting the signal indicating test results out of the reception LSI 508.

However, in this case, an additional pin to the reception LSI 508 causes an increase in packaging area or a loss in pin compatibility (loss in component compatibility) with LSIs that have been developed.

It is therefore an object of the present invention to provide a display device and its associated technology that enable tests in a simple manner on units that are involved in data reception inside the display device, without changing noise environments in the display device. It is another object of the present invention to provide a display device and its associated technology that require no additional component for outputting its test results outside of the display device and thus avoid disadvantages such as an increase in packaging area and a loss in component compatibility (loss in pin compatibility with other LSIs). It is still another object of the present invention to provide a display device and its associated technology that enables identifying the cause of a malfunction of the display device as specifically as possible.

A display device according to the first aspect of the invention comprises a data reception related unit for receiving video data in a normal mode and for receiving a test signal in a test mode, an inspection unit for inspecting the data reception related unit to generate inspection information in the test mode, an inspection result image generation unit for generating image data indicating the inspection information, and a display unit for displaying the image data generated by the inspection result image generation unit in the test mode and for displaying the video data in the normal mode.

In this arrangement, the data reception related unit is inspected and the inspection information is generated inside the display device.

Then, the generated inspection information is displayed on the display unit incorporated in the display device.

As a result, this makes it possible to carry out inspection after assembly of the display device without disassembling the display device. This in turn makes it possible to carry out a test in a simple manner on the data reception related unit inside the display device without changing noise environment inside the display device.

Furthermore, the image data indicating the inspection information is displayed on the display unit incorporated in the display device. This eliminates the need for providing an additional terminal for outputting the image data indicating the inspection information outside the display device.

In addition to the first aspect of the invention, a display device according to the second aspect of the invention further comprises a control signal reception unit for being capable of receiving and processing an external signal other than a test related signal via a component for receiving the test related signal. A mode of the display device changes the test mode after the control signal reception unit receives a control signal for instructing a commencement of the test as the test related signal.

This arrangement allows for receiving and processing the external signal other than the test related signal. This makes it possible to change to the normal mode by transmitting an external control signal for instructing the change back to the normal mode to the control signal reception unit. This also makes it possible to change to the test mode by only transmitting the external control signal for instructing the commencement of the test to the control signal reception unit.

In such a manner, it is possible to switch between modes by only the control signal external to the display device.

As a result, this makes it possible to carry out the test in a simpler manner on the data reception related unit inside the display device.

Furthermore, the control signal reception unit can receive and process the external signal other than the test related signal. This allows for receiving and processing a signal transmitted by an external video data transmitter.

This allows the external video data transmitter to transmit the signal as required to the control signal reception unit after changing to the normal mode.

As described above, the display device is provided with the control signal reception unit that can operate not only in the test mode but also in the normal mode.

Additionally, the control signal reception unit shares the common component in both the test mode and normal mode to receive the external signal.

As a result, it is not necessary to provide the display device with an additional component used for only receiving the test related control signal. This in turn makes it possible to avoid disadvantages such as an increase in packaging area and a loss in component compatibility (loss in pin compatibility with other LSIs).

In addition to the second aspect of the invention, a display device according to the third aspect of the invention further comprises a control signal transmission unit being capable of transmitting to the outside a signal other than a test related signal via a component for transmitting the test related signal to the outside.

This arrangement allows the control signal transmission unit to transmit the signal to the external video data transmitter via the component for transmitting the test related signal to the outside.

This allows the control signal transmission unit to transmit the signal as required to the external video data transmitter after changing to the normal mode.

As described above, the display device is provided with the control signal transmission unit that can operate not only in the test mode but also in the normal mode.

Additionally, the control signal transmission unit shares the common component in both the test mode and normal mode to transmit the signal to the outside.

As a result, it is not necessary to provide the display device with an additional component used for only transmitting the test related control signal. This in turn makes it possible to avoid disadvantages such as an increase in packaging area and a loss in component compatibility (loss in pin compatibility with other LSIs).

In addition to the first, second or third aspect of the invention, a display device according to the fourth aspect of the invention further comprises a display switching unit for receiving the video data from the data reception related unit in the normal mode to output the video data to the display unit and for receiving the image data generated by the inspection result image generation unit in the test mode to output the image data to the display unit.

This arrangement allows the display switching unit, depending on the mode, to output either one of the video data or the image data generated by the inspection result image generation unit to the display unit. This makes it possible to share the component for outputting the video data to the display unit and the component for outputting the image data generated by the inspection result image generation unit to the display unit.

As a result, it is not necessary to provide for an additional component used for only outputting the image data indicating the inspection information to the display unit. This in turn makes it possible to avoid disadvantages such as an increase in packaging area and a loss in component compatibility (loss in pin compatibility with other LSIs).

In addition to the fourth aspect of the invention, a display device according to the fifth aspect of the invention is characterized in that in the test mode, the display switching unit superimposes the image data generated by the inspection result image generation unit on the test signal inputted by the data reception related unit, thereby producing a signal, and then outputs the signal to the display unit.

This arrangement makes it possible at the display unit to check the inspection result of the data reception related unit and visually inspect the test video data as well by transmitting the test video data as the test signal from the outside.

In addition to the second or third aspect of the invention, a display device according to the sixth aspect of the invention further comprises a display switching unit for receiving the video data from the data reception related unit in the normal mode to output the video data to the display unit. The display device is characterized in that in the test mode, in accordance with a control signal for instructing a display switchover received by the control signal reception unit, the display switching unit receives the image data generated by the inspection result image generation unit to output the image data to the display unit, or receives test video data as the test signal to output the test video data to the display unit.

This arrangement allows the display switching unit, depending on the mode or in accordance with the control signal, to output any one of the video data, the image data generated by the inspection result image generation unit, and the test video data to the display unit. This makes it possible to share the component for outputting the video data to the display unit, the component for outputting the image data generated by the inspection result image generation unit to the display unit, and the component for outputting the test video data to the display unit.

As a result, it is not necessary to provide an additional component used for only outputting data (the image data indicating the inspection information or the test video data) in the test mode to the display unit. This in turn makes it possible to avoid disadvantages such as an increase in packaging area and a loss in component compatibility (loss in pin compatibility with other LSIs).

Furthermore, this eliminates the need for a superimposing function, thereby allowing for the display switching unit to be simplified.

In addition to the first, second, third, fourth, fifth or sixth aspect of the invention, a display device according to the seventh aspect of the invention is characterized in that the data reception related unit includes a data reception unit for receiving video data in the normal mode and for receiving a test pattern as the test signal in the test mode. The display device is further characterized in that the inspection unit includes an error information generation unit for generating error information on the test pattern received by the data reception unit in the test mode, and the inspection result image generation unit generates image data indicating the error information generated by the error information generation unit.

As a result, this arrangement makes it possible to carry out inspection after assembly of the display device without disassembling the display device. This in turn makes it possible to carry out a test in a simple manner on the data reception unit inside the display device without changing the noise environment inside the display device.

In addition to the first, second, third, fourth, fifth, sixth or seventh aspect of the invention, a display device according to the eighth aspect of the invention is characterized in that the data reception related unit includes a phase locked loop unit for generating a timing signal in sync with a received clock signal in the normal mode, and for receiving a clock signal containing jitter as the test signal in the test mode to generate a timing signal in sync with the received clock signal. The display device is further characterized in that the inspection unit includes a malfunction information generation unit for generating malfunction information on the phase locked loop unit in the test mode, and the inspection result image generation unit generates image data indicating the malfunction information generated by the malfunction information generation unit.

This arrangement makes it possible to carry out inspection after assembly of the display device without disassembling the display device. This in turn makes it possible to carry out a test in a simple manner on the phase locked loop unit inside the display device without changing the noise environment inside the display device.

A display device according to the ninth aspect of the invention comprises a data reception related unit for receiving video data in a normal mode and for receiving a test signal in a test mode, an inspection unit for inspecting the data reception related unit to generate inspection information in the test mode, a unit for transmitting the inspection information to the outside, and a display unit for displaying the video data in the normal mode. The data reception related unit receives image data indicating the inspection information from the outside in the test mode, and the display unit displays the image data indicating the inspection information in the test mode.

In this arrangement, inside the display device, the data reception related unit is inspected, and the inspection information is generated and transmitted to the outside.

Then, the image data indicating the inspection information generated externally is inputted by and displayed on the display unit incorporated in the display device.

As a result, this makes it possible to carry out inspection after assembly of the display device without disassembling the display device. This in turn makes it possible to carry out a test in a simple manner on the data reception related unit inside the display device without changing noise environment inside the display device.

Furthermore, since the image data indicating the inspection information is generated externally, it is not necessary to provide a unit for generating the image data indicating the inspection information inside the display device to be tested. This alleviates complication of the display device.

Additionally, the image data indicating the inspection information is generated externally, and the data reception related unit for receiving the video data receives the image data and then outputs the image data to the display unit.

This makes it possible to share a component for which the data reception unit outputs the video data to the display unit and a component for which the data reception related unit outputs the image data indicating the inspection information to the display unit.

As a result, it is not necessary to provide an additional component used for only outputting the image data indicating the inspection information from the data reception related unit to the display unit. This in turn makes it possible to avoid disadvantages such as an increase in packaging area and a loss in component compatibility (loss in pin compatibility with other LSIs).

In addition to the ninth aspect of the invention, a display device according to the tenth aspect of the invention further comprises a control signal reception unit for being capable of receiving and processing an external signal other than a test related signal via a component for receiving the test related signal. A mode of the display device changes to the test mode after the control signal reception unit receives a control signal for instructing a commencement of a test as the test related signal. The unit for transmitting the inspection information to the outside is a control signal transmission unit for transmitting the test related signal to the outside, and the control signal transmission unit can transmit a signal other than a test related signal outwardly via a component for transmitting the test related signal to the outside.

This arrangement allows the control signal reception unit to receive and process the external signal other than the test related signal. This makes it possible to change to the normal mode by transmitting an external control signal for instructing the change back to the normal mode to the control signal reception unit. This also makes it possible to change to the test mode by only transmitting the external control signal for instructing the commencement of the test to the control signal reception unit.

In such a manner, it is possible to switch between modes by only the control signal external to the display device.

As a result, this makes it possible to carry out the test in a simpler manner on the data reception related unit inside the display device.

Furthermore, the control signal reception unit can receive and process the external signal other than the test related signal. This allows for receiving and processing a signal transmitted by an external video data transmitter.

This allows the external video data transmitter to transmit the signal as required to the control signal reception unit after changing to the normal mode.

As described above, the display device is provided with the control signal reception unit that can operate not only in the test mode but also in the normal mode.

Additionally, the control signal reception unit shares the common component in both the test mode and normal mode to receive the external signal.

Furthermore, the control signal transmission unit can transmit the signal other than the test related signal via the component for transmitting the test related signal to the outside, thereby making it possible to transmit a signal to the external video data transmitter.

This allows the control signal transmission unit to transmit the signal as required to the external video data transmitter after changing to the normal mode.

As described above, the display device is provided with the control signal transmission unit that can operate not only in the test mode but also in the normal mode.

Additionally, the control signal transmission unit shares the common component in both the test mode and normal mode to transmit the signal to the outside.

This eliminates the need for providing the display device with additional components used for only input or output of the test related signal, such as a component used for only receiving the test related signal or transmitting the test related signal. This in turn makes it possible to avoid disadvantages such as an increase in packaging area and a loss in component compatibility (loss in pin compatibility with other LSIs).

As described above, the control signal transmission unit or the control signal reception unit are provided. This eliminates the need for an additional dedicated terminal for outputting the inspection information or a dedicated terminal for inputting the image data indicating the inspection information outside the display device.

In addition to the ninth or tenth aspect of the invention, a display device according to the eleventh aspect of the invention is characterized in that in the test mode, the data reception related unit receives from the outside image data generated by superimposing the image data indicating the inspection information on the test signal and then outputs the received image data to the display unit.

This arrangement makes it possible for the display unit to check the inspection result of the data reception related unit and visually inspect the test video data as well by transmitting from the outside to the display device the image data generated by superimposing the image data indicating the inspection information on the test video data as the test signal.

In addition to the ninth, tenth, or eleventh aspect of the invention, a display device according to the twelfth aspect of the invention is characterized in that the data reception related unit includes a data reception unit for receiving the video data in the normal mode and for receiving a test pattern as the test signal in the test mode. The display device is further characterized in that the inspection unit includes an error information generation unit for generating error information on the test pattern received by the data reception unit in the test mode, and the unit for transmitting the inspection information to the outside transmits the error information generated by the error information generation unit as the inspection information to the outside.

This arrangement makes it possible to carry out inspection after assembly of the display device without disassembling the display device. This in turn makes it possible to carry out a test in a simple manner on the data reception unit inside the display device without changing the noise environment inside the display device.

In addition to the ninth, tenth, eleventh or twelfth aspect of the invention, a display device according to the thirteenth aspect of the invention is characterized in that the data reception related unit includes a phase locked loop unit for generating a timing signal in sync with a received clock signal in the normal mode, and for receiving a clock signal containing jitter as the test signal in the test mode to generate a timing signal in sync with the received clock signal. The display device is further characterized in that the inspection unit includes a malfunction information generation unit for generating malfunction information on the phase locked loop unit in the test mode, and the unit for transmitting the inspection the information to the outside transmits the malfunction information generated by the malfunction information generation unit as the inspection information to the outside.

This arrangement makes it possible to carry out inspection after assembly of the display device without disassembling the display device. This in turn makes it possible to carry out a test in a simple manner on the phase locked loop unit inside the display device without changing the noise environment inside the display device.

In addition to the eighth or thirteenth aspect of the invention, a display device according to the fourteenth aspect of the invention is characterized in that the data reception related unit includes a data reception unit for receiving the video data in sync with the timing signal based on the clock signal in the normal mode, and for receiving a test pattern in the test mode as the test signal in sync with the timing signal based on the clock signal containing the jitter. The display device is further characterized in that the inspection unit includes an error information generation unit for generating, as the inspection information, error information on the test pattern received by the data reception unit in the test mode.

This arrangement allows both the phase locked loop unit and the data reception unit to be inspected. This makes it possible to determine whether malfunction of the display device is caused by either the phase locked loop unit or other transmission degradation factors, thereby identifying the cause of the malfunction of the display device as specifically as possible.

Additionally, it is possible to provide findings of the jitter effects in accordance with the error information on the test pattern received by the data reception unit.

In addition to the first, second, third, fourth, fifth, sixth, seventh, eighth, ninth, tenth, eleventh, twelfth, thirteenth or fourteenth aspect of the invention, a display device according to the fifteenth aspect of the invention is characterized in that the test signal is transmitted via a cable to the data reception related unit.

This arrangement makes it possible to provide findings on effects of the cable in the inspection of the data reception related unit.

In addition to the first or fifth aspect of the invention, a display device according to the sixteenth aspect of the invention further comprises an input unit for instructing a switchover between modes.

This arrangement makes it possible for the display device to move into the test mode in accordance with the instruction from the input unit provided in the display device.

This eliminates the need for preparing an additional test device, thereby making it possible to test the display device using the video data transmitter that transmits the video data to the display device in the normal mode.

As a result, the display device can be tested further in a simpler manner.

In addition to the sixteenth aspect of the invention, a display device according to the seventeenth aspect of the invention is characterized in that the input unit instructs the switchover between the modes utilizing an interface with the outside used in the normal mode.

This eliminates the need for providing the input unit with a dedicated interface with the outside for instructing the switchover between the modes.

A receiver according to the eighteenth aspect of the invention is configured to output received video data to a display unit of a display device for displaying the video data. The receiver comprises a data reception related unit for receiving the video data in a normal mode and for receiving a test signal in a test mode, an inspection unit for inspecting the data reception related unit to generate inspection information in the test mode, and an inspection result image generation unit for generating image data indicating the inspection information, wherein the image data generated by the inspection result image generation unit is outputted to the display unit in the test mode, and the video data received by the data reception related unit is outputted to the display unit in the normal mode.

This arrangement allows the receiver to be built in the display device incorporating the display unit, thereby making it possible to inspect the data reception related unit in the display device and generate the inspection information.

Then, the generated inspection information is displayed on the display unit incorporated into the display device.

As a result, this makes it possible to carry out inspection after assembly of the display device without disassembling the display device. This in turn makes it possible to carry out a test in a simple manner on the data reception related unit inside the display device without changing noise environment inside the display device.

Furthermore, the receiver is incorporated into the display device having the display unit. This allows the image data indicating the inspection information to be displayed on the display unit incorporated into the display device, thereby eliminating the need for providing an additional terminal for outputting the image data indicating the inspection information outside the display device.

In addition to the eighteenth aspect of the invention, a receiver according to the nineteenth aspect of the invention further comprises a control signal reception unit for being capable of receiving and processing an external signal other than a test related signal via a component for receiving the test related signal. A mode of the receiver changes to the test mode after the control signal reception unit receives a control signal for instructing a commencement of the test as the test related signal.

This arrangement allows for receiving and processing the external signal other than the test related signal. This makes it possible to change to the normal mode by transmitting to the control signal reception unit an external control signal for instructing change back to the normal mode. This also makes it possible to change to the test mode by only transmitting the external control signal for instructing the commencement of the test to the control signal reception unit from the outside.

This arrangement allows the receiver to be built in the display device incorporating a display unit, thereby making it possible to switch between modes by only the control signal external to the display device.

As a result, this makes it possible to carry out the test in a simpler manner on the data reception related unit inside the display device.

Furthermore, the control signal reception unit can receive and process the external signal other than the test related signal. This allows for receiving and processing a signal transmitted by an external video data transmitter.

This allows the external video data transmitter to transmit the signal as required to the control signal reception unit after changing to the normal mode.

As described above, the receiver is provided with the control signal reception unit that can operate not only in the test mode but also in the normal mode.

Additionally, the control signal reception unit shares the common component in both the test mode and normal mode to receive the external signal.

As a result, it is not necessary to provide the receiver with an additional component used for only receiving the test related control signal. This in turn makes it possible to avoid disadvantages such as an increase in packaging area and a loss in component compatibility (loss in pin compatibility with other LSIs).

In addition to the nineteenth aspect of the invention, a receiver according to the twentieth aspect of the invention further comprises a control signal transmission unit being capable of transmitting outwardly a signal other than a test related signal to the outside via a component for transmitting the test related signal.

This arrangement allows the control signal transmission unit to transmit the signal to the external video data transmitter via the component for transmitting the test related signal to the outside.

This allows the control signal transmission unit to transmit the signal as required to the external video data transmitter after having changed to the normal mode.

As described above, the receiver is provided with the control signal transmission unit that can operate not only in the test mode but also in the normal mode.

Additionally, the control signal transmission unit shares the common component in both the test mode and normal mode to transmit the signal to the outside.

As a result, it is not necessary to provide the receiver with an additional component used for only transmitting the test related control signal. This in turn makes it possible to avoid disadvantages such as an increase in packaging area and a loss in component compatibility (loss in pin compatibility with other LSIs).

In addition to the eighteenth, nineteenth, or twentieth aspect of the invention, a receiver according to the twenty-first aspect of the invention further comprises a display switching unit for receiving the video data from the data reception related unit in the normal mode to output the video data to the display unit and for receiving the image data generated by the inspection result image generation unit to output the image data to the display unit in the test mode.

This arrangement allows the display switching unit, depending on the mode, to output either one of the video data or the image data generated by the inspection result image generation unit to the display unit. This makes it possible to share the component for outputting the video data to the display unit and the component for outputting the image data generated by the inspection result image generation unit to the display unit.

As a result, it is not necessary to provide an additional component used for only outputting the image data indicating the inspection information to the display unit. This in turn makes it possible to avoid disadvantages such as an increase in packaging area and a loss in component compatibility (loss in pin compatibility with other LSIs).

In addition to the twenty-first aspect of the invention, a receiver according to the twenty-second aspect of the invention is characterized in that in the test mode, the display switching unit superimposes the image data generated by the inspection result image generation unit on the test signal received by the data reception related unit, thereby producing a signal, and then outputs the signal to the display unit.

This arrangement makes it possible for the display unit of the display device to check inspection result of the data reception related unit and visually inspect the test video data as well by transmitting the test video data as the test signal from the outside.

In addition to the nineteenth or twentieth aspect of the invention, a receiver according to the twenty-third aspect of the invention further comprises a display switching unit for receiving the video data from the data reception related unit in the normal mode to output the video data to the display unit. The receiver is characterized in that in the test mode, in accordance with a control signal for instructing a display switchover, received by the control signal reception unit, the display switching unit receives the image data generated by the inspection result image generation unit to output the image data to the display unit, or for receiving test video data as the test signal to output the test video data to the display unit.

This arrangement allows the display switching unit, depending on the mode or in accordance with the control signal, to deliver either of the video data, the image data generated by the inspection result image generation unit, and the test video data to the display unit. This makes it possible to share the component for outputting the video data to the display unit, the component for outputting the image data generated by the inspection result image generation unit to the display unit, and the component for outputting the test video data to the display unit.

As a result, it is not necessary to provide an additional component used for only outputting data (the image data indicating the inspection information or the test video data) in the test mode to the display unit. This in turn makes it possible to avoid disadvantages such as an increase in packaging area and a loss in component compatibility (loss in pin compatibility with other LSIs).

Furthermore, this eliminates the need for a superimposing function, thereby allowing for the display switching unit to be simplified.

In addition to any one of the eighteenth, nineteenth, twentieth, twenty-first, twenty-second or twenty-third aspect of the invention, a receiver according to the twenty-fourth aspect of the invention is characterized in that the data reception related unit includes a data reception unit for receiving the video data in the normal mode and for receiving a test pattern as the test signal in the test mode. The receiver is further characterized in that the inspection unit includes an error information generation unit for generating error information on the test pattern received by the data reception unit in the test mode, and the inspection result image generation unit generates image data indicating the error information generated by the error information generation unit.

This arrangement allows the receiver to be built in the display device incorporating a display unit, thereby making it possible to carry out inspection after assembly of the display device without disassembling the display device. This in turn makes it possible to carry out a test in a simple manner on the data reception unit inside the display device without changing the noise environment inside the display device.

In addition to the eighteenth, nineteenth, twentieth, twenty-second, twenty-third, or twenty-fourth aspect of the invention, a receiver according to the twenty-fifth aspect of the invention is characterized in that the data reception related unit includes a phase locked loop unit for generating a timing signal in sync with a received clock signal in the normal mode, and for receiving a clock signal containing jitter as the test signal in the test mode to generate a timing signal in sync with the received clock signal. The receiver is further characterized in that the inspection unit include a malfunction information generation unit for generating malfunction information on the phase locked loop unit in the test mode, and the inspection result image generation unit generates image data indicating the malfunction information generated by the malfunction information generation unit.

This arrangement allows the receiver to be built in the display device incorporating a display unit, thereby making it possible to carry out inspection after assembly of the display device without disassembling the display device. This in turn makes it possible to carry out a test in a simple manner on the phase locked loop unit inside the display device without changing the noise environment inside the display device.

A receiver according to the twenty-sixth aspect of the invention is configured to deliver received video data to a display unit of a display device for displaying the video data. The receiver comprises a data reception related unit for receiving the video data in a normal mode and for receiving a test signal in a test mode, an inspection unit for inspecting the data reception related unit to generate inspection information in the test mode, and a unit for transmitting the inspection information to the outside, wherein the data reception related unit receives image data indicating the inspection information from the outside in the test mode, the image data indicating the inspection information received by the data reception related unit is outputted to the display unit in the test mode, and the video data received by the data reception related unit is outputted to the display unit in the normal mode.

This arrangement allows the receiver to be built in the display device incorporating a display unit, thereby making it possible to inspect the data reception related unit in the display device and generate the inspection information to be transmitted to the outside.

Then, the externally generated image data indicating the inspection information is inputted to be displayed on the display unit incorporated into the display device.

As a result, this makes it possible to carry out inspection after assembly of the display device without disassembling the display device. This in turn makes it possible to carry out a test in a simple manner on the data reception related unit inside the display device without changing noise environment inside the display device.

Furthermore, since the image data indicating the inspection information is generated externally, it is not necessary to provide the receiver with a unit for generating the image data indicating the inspection information. This alleviates the complication of the receiver.

Additionally, the image data indicating the inspection information is generated externally, and the data reception related unit for receiving the video data receives the image data and then delivers the image data to the display unit.

This makes it possible to share a component for which the data reception related unit outputs the video data to the display unit and a component for which the data reception related unit outputs the image data indicating the inspection information to the display unit.

As a result, it is not necessary to provide for an additional component used for only outputting the image data indicating the inspection information from the data reception related unit to the display unit. This in turn makes it possible for the receiver to avoid disadvantages such as an increase in packaging area and a loss in component compatibility (loss in pin compatibility with other LSIs).

In addition to the twenty-sixth aspect of the invention, a receiver according to the twenty-seventh aspect of the invention further comprises a control signal reception unit capable of receiving and processing an external signal other than a test related signal via a component for receiving the test related signal, wherein a mode of the receiver changes to the test mode after the control signal reception unit receives a control signal for instructing a commencement of the test as the test related signal, the unit for transmitting the inspection information to the outside is a control signal transmission unit for transmitting the test related signal to the outside, and the control signal transmission unit can transmit a signal other than a test related signal to the outside via a component for transmitting the test related signal to the outside.

This arrangement allows the control signal reception unit to receive and process an external signal other than the test related signal. This makes it possible to change to the normal mode by transmitting to an external control signal for instructing change back to the normal mode the control signal reception unit. This also makes it possible to change to the test mode by only transmitting the external control signal for instructing the commencement of the test to the control signal reception unit.

This arrangement allows the receiver to be built in the display device incorporating a display unit, thereby making it possible to switch between modes by only the control signal external to the display device.[0149] As a result, this makes it possible to carry out the test in a simpler manner on the data reception related unit inside the display device.

Furthermore, the control signal reception unit can receive and process the external signal other than the test related signal. This allows for receiving and processing a signal transmitted by an external video data transmitter.

This allows the external video data transmitter to transmit the signal as required to the control signal reception unit after changing to the normal mode.

As described above, the receiver is provided with the control signal reception unit that can operate not only in the test mode but also in the normal mode.

Additionally, the control signal reception unit shares the common component in both the test mode and normal mode to receive the external signal.

Furthermore, the control signal transmission unit can transmit the signal other than the test related signal via the component for transmitting the test related signal to the outside, thereby making it possible to transmit a signal to the external video data transmitter.

This allows the control signal transmission unit to transmit the signal as required to the external video data transmitter after changing to the normal mode.

As described above, the receiver is provided with the control signal transmission unit that can operate not only in the test mode but also in the normal mode.

Additionally, the control signal transmission unit shares the common component in both the test mode and normal mode to transmit the signal to the outside.

This eliminates the need for providing the receiver with additional components used for only input or output of the test related signal, such as a component used for only receiving the test related signal or transmitting the test related signal. This in turn makes it possible to avoid disadvantages such as an increase in packaging area and a loss in component compatibility (loss in pin compatibility with other LSIs).

As described above, the control signal transmission unit or the control signal reception unit are provided, thereby eliminating the need for a additional dedicated terminal for outputting the inspection information or a dedicated terminal for inputting the image data indicating the inspection information outside the display device.

In addition to the twenty-sixth or twenty-seventh aspect of the invention, a receiver according to the twenty-eighth aspect of the invention is characterized in that in the test mode, the data reception related unit receives from outside image data generated by superimposing the image data indicating the inspection information on the test signal and then outputs the received image data to the display unit.

This arrangement makes it possible for the display unit to check inspection result of the data reception related unit and visually inspect the test video data as well by transmitting from the outside to the receiver the image data generated by superimposing the image data indicating the inspection information on the test video data acting as the test signal.

In addition to any one of the twenty-sixth or twenty-eighth aspect of the invention, a receiver according to the twenty-ninth aspect of the invention is characterized in that the data reception related unit includes a data reception unit for receiving the video data in the normal mode and for receiving a test pattern as the test signal in the test mode. The receiver is further characterized in that the inspection unit includes an error information generation unit for generating error information on the test pattern received by the data reception unit in the test mode, and the unit for transmitting the inspection information to the outside transmits the error information generated by the error information generation unit as the inspection information to the outside.

This arrangement allows the receiver to be built in the display device incorporating the display unit, thereby making it possible to carry out inspection after assembly of the display device without disassembling the display device. This in turn makes it possible to carry out a test in a simple manner on the data reception unit inside the display device without changing the noise environment inside the display device.

In addition to any one of the twenty-sixth, twenty-seventh, twenty-eighth or twenty-ninth aspect of the invention, a receiver according to the thirtieth aspect of the invention is characterized in that the data reception related unit includes a phase locked loop unit for generating a timing signal in sync with a received clock signal in the normal mode, and for receiving a clock signal containing jitter as the test signal in the test mode to generate a timing signal in sync with the received clock signal. The receiver is further characterized in that the inspection unit includes a malfunction information generation unit for generating malfunction information on the phase locked loop unit in the test mode, and the unit for transmitting the inspection information to the outside transmits the malfunction information generated by the malfunction information generation unit as the inspection information to the outside.

This arrangement allows the receiver to be built in the display device incorporating the display unit, thereby making it possible to carry out inspection after assembly of the display device without disassembling the display device. This in turn makes it possible to carry out a test in a simple manner on the phase locked loop unit inside the display device without changing the noise environment inside the display device.

In addition to any one of the twenty-fifth or thirtieth aspect of the invention, a receiver according to the thirty-first aspect of the invention is characterized in that the data reception related unit include a data reception unit for receiving the video data in sync with the timing signal based on the clock signal in the normal mode, and for receiving a test pattern as the test signal in sync with the timing signal based on the clock signal containing the jitter in the test mode. The receiver is further characterized in that the inspection unit includes an error information generation unit for generating, as the inspection information, error information on the test pattern received by the data reception unit in the test mode.

This arrangement allows both the phase locked loop unit and the data reception unit to be inspected. This makes it possible to determine whether malfunction of the display device is caused by either the phase locked loop unit or other transmission degradation factors, thereby allowing for identifying the cause of the malfunction of the display device as specifically as possible.

Additionally, it is possible to provide findings of the jitter effects in accordance with the error information on the test pattern received by the data reception unit.

In addition to any one of the eighteenth, nineteenth, twentieth, twenty-first, twenty-second, twenty-third, twenty-fourth, twenty-fifth, twenty-sixth, twenty-seventh, twenty-eighth, twenty-ninth, thirtieth, or thirty first aspect of the invention, a receiver according to the thirty-second aspect of the invention is characterized in that the test signal is transmitted via a cable to the data reception related unit.

This arrangement makes it possible to provide findings on the effects of the cable in the inspection of the data reception related unit.

A test apparatus according to the thirty-third aspect of the invention is configured to test a display device. The test apparatus comprises a control signal transmission unit for transmitting a control signal for instructing a commencement of a test to the display device, a control unit for commanding the control signal transmission unit to transmit the control signal for instructing the commencement of the test to the display device, a test signal generation unit for generating a test signal, and a test signal transmission unit for transmitting the test signal to the display device.

This arrangement can make the display device for receiving the test signal ready for the test in a simple manner by only transmitting the control signal to the display device.

A test apparatus according to the thirty-fourth aspect of the invention is configured to test a display device. The test apparatus comprises a control signal transmission unit for transmitting a control signal for instructing a commencement of a test to the display device, a control unit for commanding the control signal transmission unit to transmit the control signal for instructing the commencement of the test to the display device, a test signal generation unit for generating a test signal, and a test signal transmission unit for transmitting the test signal to the display device, a unit for receiving inspection information on the display device transmitted by the display device for which the test signal is received, an inspection information storage unit for storing the inspection information received by the unit for receiving inspection information, and an inspection result image generation unit for acquiring the inspection information from the inspection information storage unit to generate image data indicating the inspection information, wherein the test signal transmission unit transmits the image data generated by the inspection result image generation unit to the display device.

This arrangement can make the display device for receiving the test signal ready for the test in a simple manner by only transmitting the control signal to the display device. Furthermore, since the image data indicating the inspection information is generated in the test apparatus, it is not necessary to provide the display device to be tested with a unit for generating the image data indicating the inspection information. This alleviates the level of complication of the display device.

In addition to the thirty-fourth aspect of the invention, a test apparatus according to the thirty-fifth aspect of the invention is characterized in that the test signal generation unit comprises a test video data generation unit for generating test video data as the test signal, and a superimposition unit for superimposing the image data generated by the inspection result image generation unit on the test video data, thereby producing a signal, and then outputting the signal to the test signal transmission unit. The test apparatus is characterized in that the test signal transmission unit transmits the signal produced by the superimposition unit to the display device.

This arrangement makes it possible for the display device to check the inspection result of the display device and visually inspect the test video data as well.

In addition to the thirty-third, thirty-fourth, or thirty-fifth aspect of the invention, a test apparatus according to the thirty-sixth aspect of the invention is characterized in that the control unit instructs a test condition to the test signal generation unit.

This arrangement alleviates the time and manpower for setting the test condition that has been conventionally set manually.

In addition to the thirty-third, thirty-fourth, thirty-fifth or thirty-sixth aspect of the invention, a test apparatus according to the thirty seventh aspect of the invention is characterized in that the test signal generation unit includes a test pattern generation unit for generating a test pattern as the test signal, and the test signal transmission unit includes a data transmission unit for transmitting the test pattern to the display device.

This arrangement can make the display device for receiving the test pattern ready for the test in a simple manner by only transmitting the control signal to the display device.

In addition to the thirty-third, thirty-fourth, thirty-fifth, thirty-sixth, thirty-seventh aspect of the invention, a test apparatus according to the thirty-eighth aspect of the invention is characterized in that the test signal generation unit includes a clock signal generation unit for generating a clock signal, and a jitter signal generation unit for generating a jitter signal. The test apparatus is further characterized in that the test signal transmission unit includes a phase modulation unit for superimposing the jitter signal on the clock signal to generate a clock signal containing jitter and then transmits the clock signal containing the jitter as the test signal to the display device.

This arrangement can make the display device for receiving the clock signal containing the jitter ready for the test in a simple manner by only transmitting the control signal to the display device.

In addition to the thirty-eighth aspect of the invention, a test apparatus according to the thirty-ninth aspect of the invention is characterized in that the test signal generation unit includes a test pattern generation unit for generating a test pattern as the test signal, and the test signal transmission unit includes a data transmission unit for transmitting the test pattern to the display device. The test apparatus is further characterized in that the test pattern generation unit outputs the test pattern to the data transmission unit in sync with the clock signal containing the jitter generated by the phase modulation unit.

This arrangement can make the display device ready for the test in a simple manner by only transmitting the control signal to the display device for receiving the test pattern outputted in sync with the clock signal containing the jitter.

In addition to the thirty-third, thirty-fourth, thirty-fifth, thirty-sixth, thirty-seventh, thirty-eighth, or thirty-ninth aspect of the invention, a test apparatus according to the fortieth aspect of the invention is characterized in that the test signal transmission unit transmits the test signal to the display device via a cable.

This arrangement makes it possible to provide findings on the effects of the cable in the inspection of the display device.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 14 is an exemplary view illustrating an inspection result image;

DETAILED DESCRIPTION OF THE PREFERRED EMBODIMENTS

Now, the present invention will be explained below in more detail with reference to the accompanying drawings in accordance with Embodiments.

Embodiment 1

Figure 1:
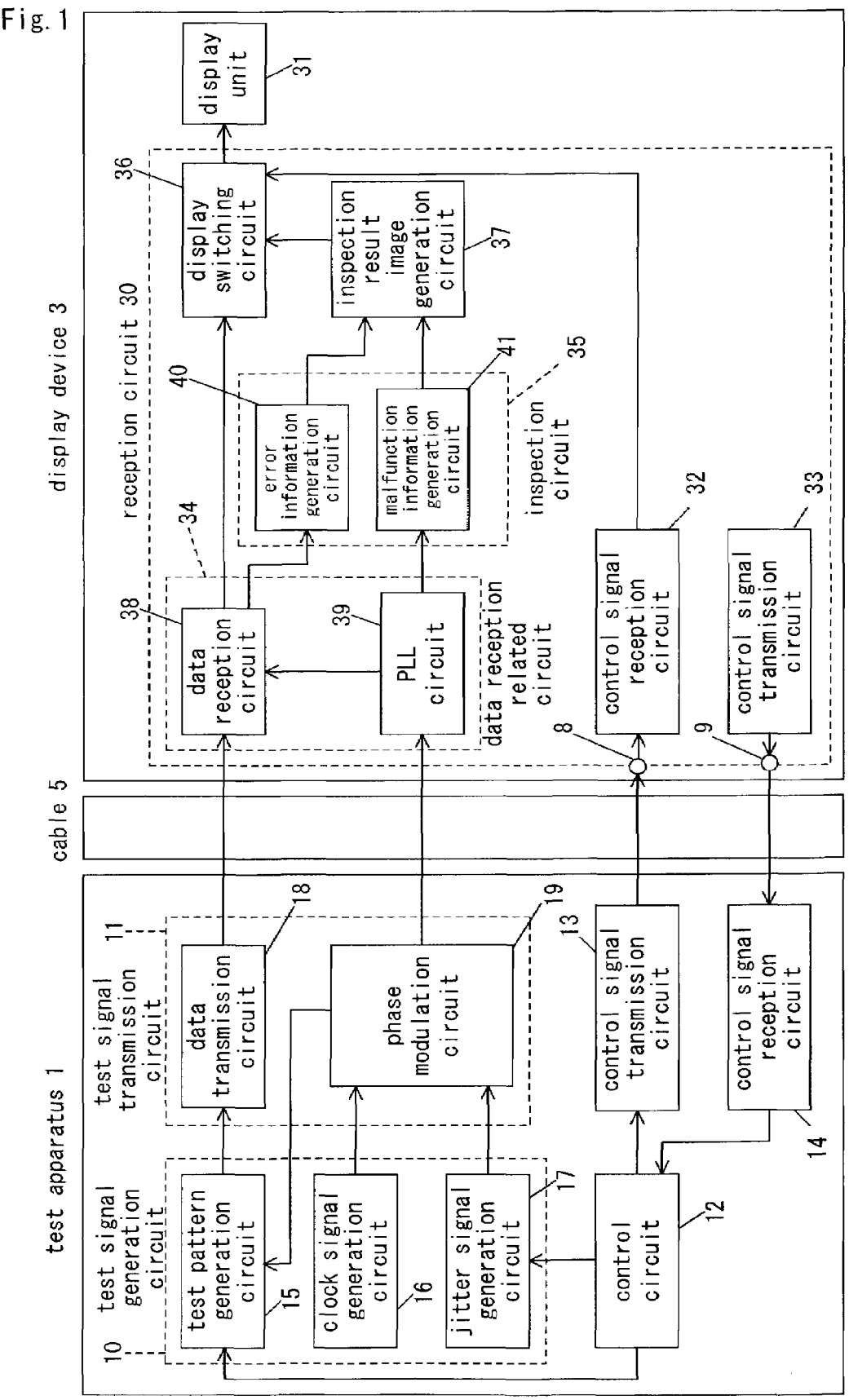
FIG. 1 is a block diagram illustrating an exemplary test apparatus and an exemplary display device according to Embodiment 1 of the present invention.

FIG. 1 is a block diagram illustrating an exemplary test apparatus and an exemplary display device according to Embodiment 1 of the present invention.

As shown in FIG. 1, the test apparatus 1 is connected to the display device 3 via a cable 5.

The test apparatus 1 comprises a test signal generation circuit 10, a test signal transmission circuit 11, a control circuit 12, a control signal transmission circuit 13, and a control signal reception circuit 14.

The test signal generation circuit 10 includes a test pattern generation circuit 15, a clock signal generation circuit 16, and a jitter signal generation circuit 17.

The test signal transmission circuit 11 includes a data transmission circuit 18 and a phase modulation circuit 19.

The display device 3 comprises a reception circuit 30 and a display unit 31.

The reception circuit 30 includes a data reception related circuit 34, an inspection circuit 35, a control signal reception circuit 32, a control signal transmission circuit 33, a display switching circuit 36, an inspection result image generation circuit 37.

The data reception related circuit 34 includes a data reception circuit 38 and a PLL (Phase Locked Loop) circuit 39.

The inspection circuit 35 includes an error information generation circuit 40 and a malfunction information generation circuit 41.

With this configuration, the test apparatus 1 of FIG. 1 sends a test signal via the cable 5 to carry out a test on the display device 3. The state in which the display device 3 is ready for the test or carrying out the test is called "test mode".

Typically, the display device 3 receives video data from a video data transmitter to display it on the display unit 31. This normal state of operations is called "normal mode".

Now, the configuration of the video data transmitter to be used in the normal mode is described below.

Figure 2:
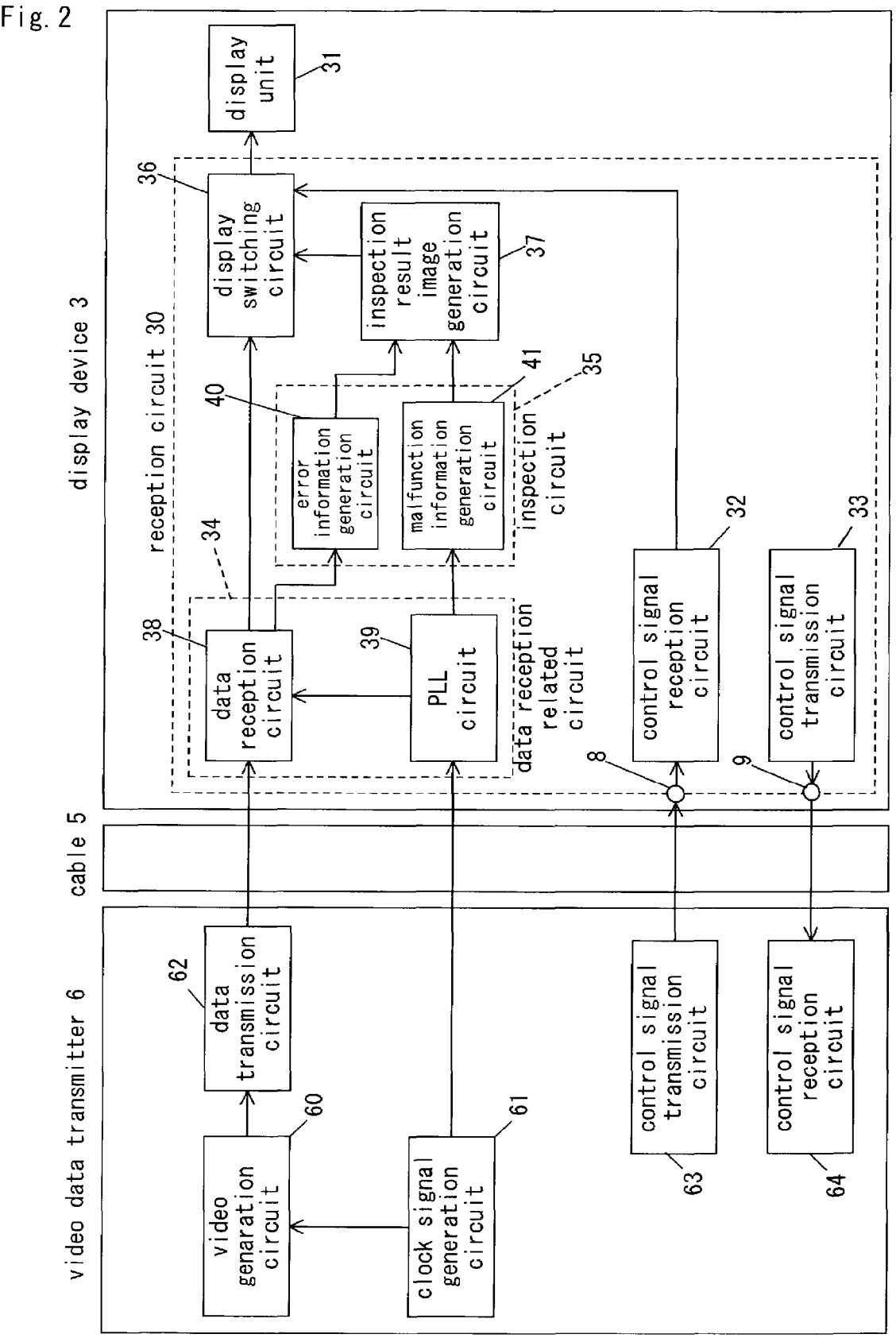
FIG. 2 is an explanatory view illustrating a normal mode of the display device of FIG. 1.

FIG. 2 is a block diagram illustrating the exemplary video data transmitter to be used in the normal mode. In FIG. 2, the same components as those of FIG. 1 are indicated by the same reference numerals.

As shown in FIG. 2, the video data transmitter 6 comprises a video generation circuit 60, a clock signal generation circuit 61, a data transmission circuit 62, a control signal transmission circuit 63, and control signal reception circuit 64.

For example, a video data transmitter such as the video data transmitter 6 includes a personal computer or a set top box (STB).

Returning to FIG. 1, the test signal generation circuit 10 in the test apparatus 1 of FIG. 1 is described below. The test signal generation circuit 10 generates a test signal and outputs it to the test signal transmission circuit 11.

More specifically, the test signal generation circuit 10, configured as mentioned above with reference to FIG. 1, is described in detail as below.

First, described is the test pattern generation circuit 15 of the test apparatus 1.

Figure 3:
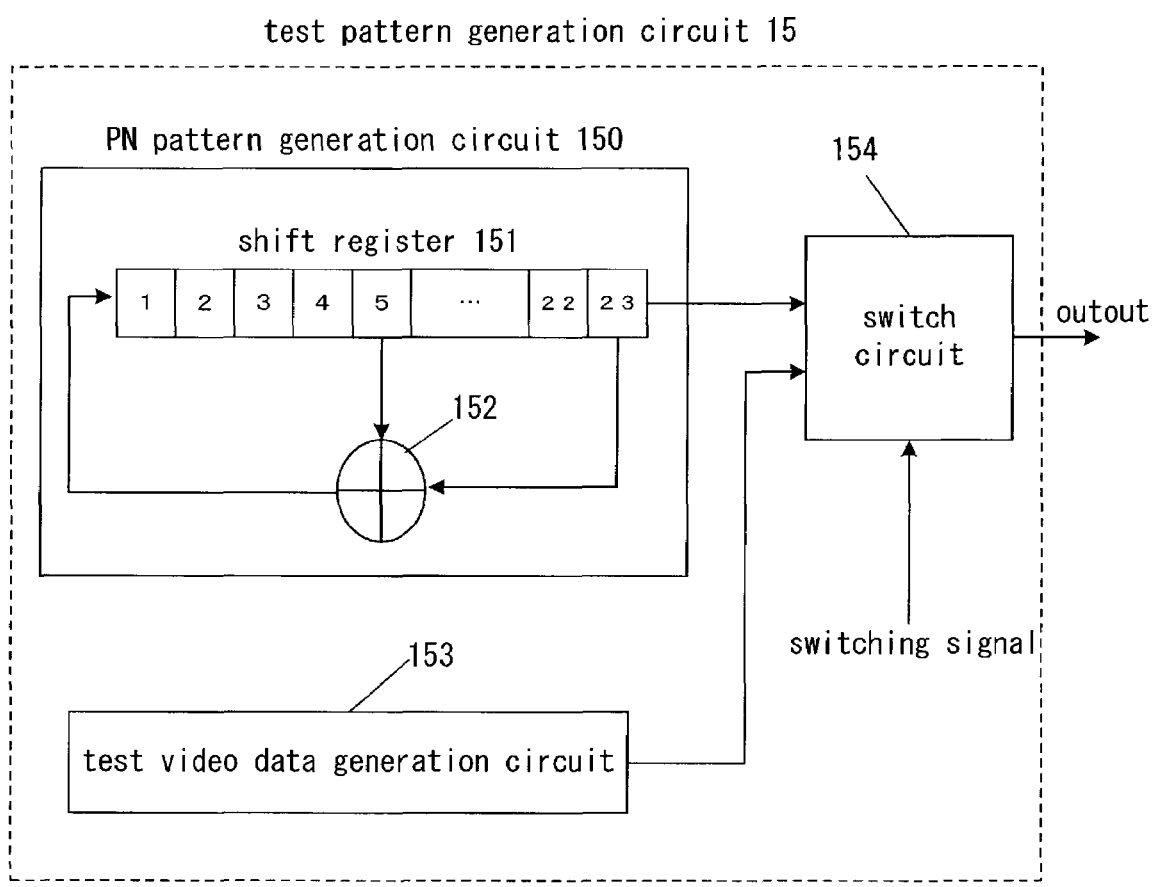
FIG. 3 is an exemplary diagram illustrating the test pattern generation circuit in the test apparatus of FIG. 1.

FIG. 3 is an exemplary diagram illustrating the test pattern generation circuit 15 of FIG. 1. As shown in FIG. 3, the test pattern generation circuit 15 includes a PN (Pseudo Noise) pattern generation circuit 150, a test video data generation circuit 153, and a switch circuit 154.

The PN pattern generation circuit 150 includes a shift register 151 and an exclusive OR circuit (EXOR circuit) 152.

The PN pattern generation circuit 150 generates a PN pattern as the test signal. A generation polynomial used by the PN pattern generation circuit 150 is ((x to the power of 23)+(x to the power of 5)+1) according to the DVI standard. The PN pattern is an example of a test pattern.

The test video data generation circuit 153 generates test video data as the test signal.

The switch circuit 154 outputs either one of the PN pattern or the test video data in accordance with a switching signal from the control circuit 12 of FIG. 1.

Now, the clock signal generation circuit 16 of the test apparatus 1 of FIG. 1 is described below. The clock signal generation circuit 16 generates a clock signal clk1 and outputs it to the phase modulation circuit 19.

Now, the jitter signal generation circuit 17 of the test apparatus 1 of FIG. 1 is described below. The jitter signal generation circuit 17 generates a jitter signal clk2 and outputs it to the phase modulation circuit 19.

Now, the test signal transmission circuit 11 of the test apparatus 1 of FIG. 1 is described below.

The test signal transmission circuit 11 sends as test signal outputted by the test signal generation circuit 10 to the display device 3 via the cable 5.

More specifically, the test signal transmission circuit 11, configured as mentioned above with reference to FIG. 1, is described in detail as below.

First, the data transmission circuit 18 of the test apparatus 1 of FIG. 1 is described below.

Figure 4:
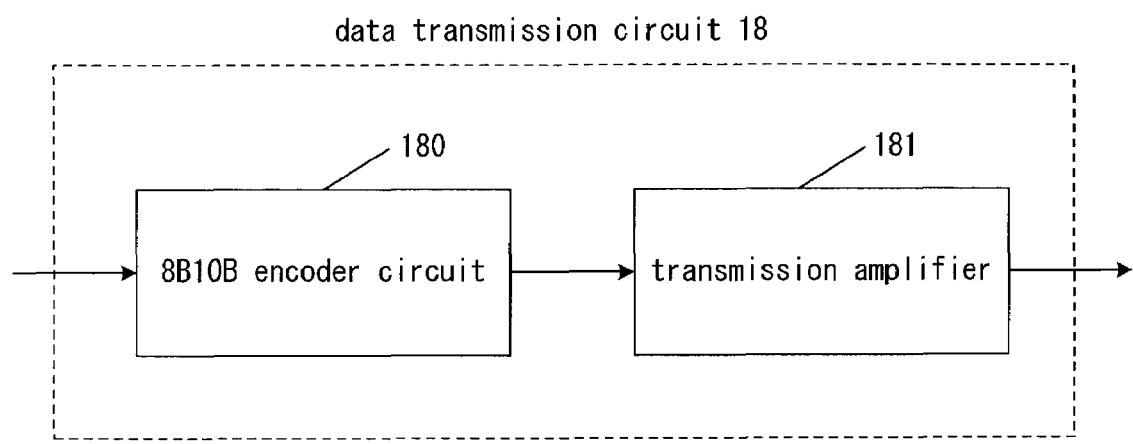
FIG. 4 is an exemplary diagram illustrating the data transmission circuit of the test apparatus of FIG. 1.

FIG. 4 is an exemplary diagram illustrating the data transmission circuit 18 of FIG. 1. As shown in FIG. 4, the data transmission circuit 18 includes an 8B10B encoder circuit 180 and a transmission amplifier 181.

The 8B10B encoder circuit 180 encodes 8-bit data (the PN pattern or the test video data) outputted by the test pattern generation circuit 15 of FIG. 1 to generate a 10-bit redundant code (hereinafter referred to as an 8B10B code) including two redundant bits. The encoding algorithm used here is shown in the DVI standard.

The transmission amplifier 181 amplifies the 8B10B code generated by the 8B10B encoder circuit 180 and then transmits the resulting code to the data reception circuit 38 of the display device 3 of FIG. 1 via the cable 5 of FIG. 1.

Figure 5:
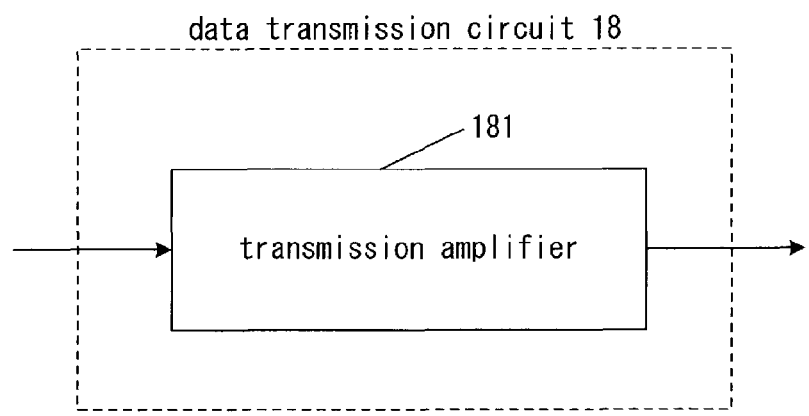
FIG. 5 is another exemplary diagram illustrating the data transmission circuit of the test apparatus of FIG. 1.

FIG. 5 is another exemplary diagram illustrating the data transmission circuit 18 of the test apparatus 1 of FIG. 1. As shown in FIG. 5, the data transmission circuit 18 includes the transmission amplifier 181.

The transmission amplifier 181 amplifies data (the PN pattern or the test video data) outputted by the test pattern generation circuit 15 of FIG. 1 and then transmits the resulting code to the data reception circuit 38 of the display device 3 of FIG. 1 via the cable 5 of FIG. 1.

When it is not necessary to follow the DVI standard, the one shown in FIG. 5 can be employed as the data transmission circuit 18.

Now, the phase modulation circuit 19 of the test apparatus 1 of FIG. 1 is described below.

Figure 6:
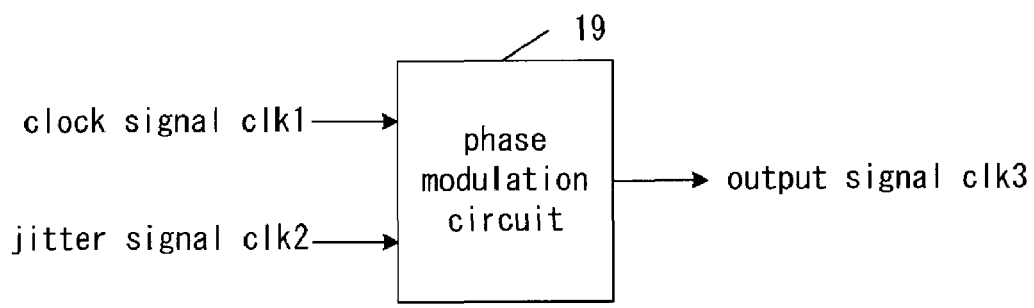
FIG. 6 is an exemplary diagram illustrating the phase modulation circuit of the test apparatus of FIG. 1.

FIG. 6 is an exemplary diagram illustrating the phase modulation circuit 19. As shown in FIG. 6, the phase modulation circuit 19 receives the clock signal clk1 outputted by the clock signal generation circuit 16 of FIG. 1 and the jitter signal clk2 outputted by the jitter signal generation circuit 17 of FIG. 1.

Then, the phase modulation circuit 19 outputs an output signal clk3 as a test signal to the test pattern generation circuit 15 of the test apparatus 1 of FIG. 1 and transmits it to the PLL circuit 39 of the display device 3 of FIG. 1 via the cable 5.

In this case, if the inputted jitter signal clk2 is not equal to "0", the output signal clk3 is a clock signal including jitter.

On the other hand, if the inputted jitter signal clk2 is equal to "0", or if the "Aj" and "fj" of the jitter signal clk2 are equal to "0", the output signal clk3 is a clock signal that does not contain the jitter.

The aforementioned PN pattern generation circuit 150 of FIG. 3 outputs the PN pattern to the data transmission circuit 18 of the test apparatus 1 of FIG. 1 in sync with the clock signal clk3 containing the jitter outputted by the phase modulation circuit 19.

On the other hand, the test video data generation circuit 153 of FIG. 3 outputs the test video data to the data transmission circuit 18 of the test apparatus 1 of FIG. 1 in sync with the clock signal clk3 that does not contain the jitter outputted by the phase modulation circuit 19.

Now, the control circuit 12 of the test apparatus 1 is described below.

The control circuit 12 controls each of the circuits in the test apparatus 1. This will be described later as appropriate together with an explanation of the entire test flow.

Now, the control signal transmission circuit 13 and the control signal reception circuit 14 of the test apparatus 1 of FIG. 1 are described below.

The control signal transmission circuit 13 receives a command from the control circuit 12 to transmit a test related control signal to the control signal reception circuit 32 of the display device 3 via the cable 5. This will be described later as appropriate together with the explanation of the entire test flow.

The control signal reception circuit 14 receives a test related control signal transmitted by the control signal transmission circuit 33 of the display device 3 via the cable 5. This will be described later as appropriate together with the explanation of the entire test flow.

Now, the reception circuit 30 of the display device 3 of FIG. 1 is described below.

The reception circuit 30 receives the video data transmitted by the video data transmitter 6 of FIG. 2 in the normal mode and then outputs it to the display unit 31 of the display device 3. On the other hand, the reception circuit 30 receives the test signal transmitted by the test apparatus 1 of FIG. 1 in the test mode.

More specifically, the reception circuit 30, configured as mentioned above with reference to FIG. 1, is described in detail as below.

First, the data reception related circuit 34 of the display device 3 of FIG. 1 is described below. The data reception related circuit 34 receives in the test mode the test signal transmitted by the test signal transmission circuit 11 of the test apparatus 1 of FIG. 1.

On the other hand, the data reception related circuit 34 receives in the normal mode the video data transmitted by the video data transmitter 6 of FIG. 2.

Now, the inspection circuit 35 of the display device 3 of FIG. 1 is described below. The inspection circuit 35 inspects the data reception related circuit 34 in the test mode, and generates the inspection information to output it to the inspection result image generation circuit 37.

Now, the inspection result image generation circuit 37 of the display device 3 of FIG. 1 is described below. The inspection result image generation circuit 37 receives in the test mode the inspection information generated by the inspection circuit 35.

Then, the inspection result image generation circuit 37 generates image data indicating the inputted inspection information.

The image data indicating the inspection information may hereinafter be referred to as "inspection result image data". On the other hand, an image indicating the inspection information may hereinafter be referred to as "inspection result image".

Now, the display switching circuit 36 of the display device 3 of FIG. 1 is described below. The display switching circuit 36 outputs in the normal mode the video data received by the data reception circuit 38 to the display unit 31.

On the other hand, in the test mode, the display switching circuit 36 superimposes the inspection result image data generated by the inspection result image generation circuit 37 on the test signal (the PN pattern) received by the data reception circuit 38 to output the resulting signal to the display unit 31.

Additionally, in the test mode, the display switching circuit 36 superimposes the inspection result image data generated by the inspection result image generation circuit 37 on the test signal (the test video data) received by the data reception circuit 38 to output the resulting signal to the display unit 31.

The display switching circuit 36 provides different operations between the normal mode (without the superimposition) and test mode (with the superimposition). The control signal reception circuit 32 receives a control signal from the test apparatus 1 and then outputs a display switching signal to the display switching circuit 36 to perform the switching between these operations.

Now, the control signal reception circuit 32 and the control signal transmission circuit 33 of the display device 3 of FIG. 1 are described below.

The control signal reception circuit 32 receives in the test mode the test related control signal transmitted by the control signal transmission circuit 13 of the test apparatus 1 via the cable 5. This will be described later as appropriate together with the explanation of the entire test flow.

On the other hand, using a component 8 for receiving the test related control signal (e.g., a pin for receiving the test related control signal when the reception circuit 30 is configured as an integrated circuit), the control signal reception circuit 32 receives in the normal mode a control signal transmitted via the cable 5 by the control signal transmission circuit 63 of the video data transmitter 6 of FIG. 2.

The control signal transmission circuit 33 transmits in the test mode the test related control signal to the control signal reception circuit 14 of the test apparatus 1 via the cable 5. This will be described later as appropriate together with the explanation of the entire test flow.

On the other hand, using a component 9 for transmitting the test related control signal (e.g., a pin for transmitting the test related control signal when the reception circuit 30 is configured as an integrated circuit), the control signal transmission circuit 33 transmits in the normal mode a control signal via the cable 5 to the control signal reception circuit 64 of the video data transmitter 6 of FIG. 2.

Now, the data reception related circuit 34 is described below in detail. The data reception related circuit 34, configured as mentioned above with reference to FIG. 1, is described as below.

First, the PLL circuit 39 of FIG. 1 is described below. The PLL circuit 39 generates in the test mode a timing signal in sync with the clock signal clk3 transmitted via the cable 5 by the phase modulation circuit 19 of the test apparatus 1.

Then, the timing signal is outputted to the data reception circuit 38 and the malfunction information generation circuit 41.

On the other hand, in the normal mode, the PLL circuit 39 generates a timing signal in sync with a clock signal transmitted via the cable 5 by the clock signal generation circuit 61 of the video data transmitter 6 of FIG. 2 and then outputs the timing signal to the data reception circuit 38.

Now, the data reception circuit 38 of FIG. 1 is described below. The data reception circuit 38 captures in the test mode the test signal transmitted by the data transmission circuit 18 of the test apparatus 1, in sync with the timing signal outputted by the PLL circuit 39.

Then, the test signal captured is outputted to the display switching circuit 36 and the error information generation circuit 40.

On the other hand, in the normal mode, the data reception circuit 38 captures the video data transmitted by the data transmission circuit 62 of the video data transmitter 6 of FIG. 2 in sync with the timing signal outputted by the PLL circuit 39 and then outputs the video data to the display switching circuit 36.

Now, the inspection circuit 35 of FIG. 1 is described below in detail. The inspection circuit 35, configured as mentioned above with reference to FIG. 1, is described as below.

First, the error information generation circuit 40 is described below. In the test mode, the error information generation circuit 40 generates data error information on the test signal (the PN pattern) received by the data reception circuit 38 and then outputs the resulting signal to the inspection result image generation circuit 37 as the inspection information.

By way of example, such a case where the "data error rate (bit error rate)" is generated as the data error information is described below.

Figure 7:
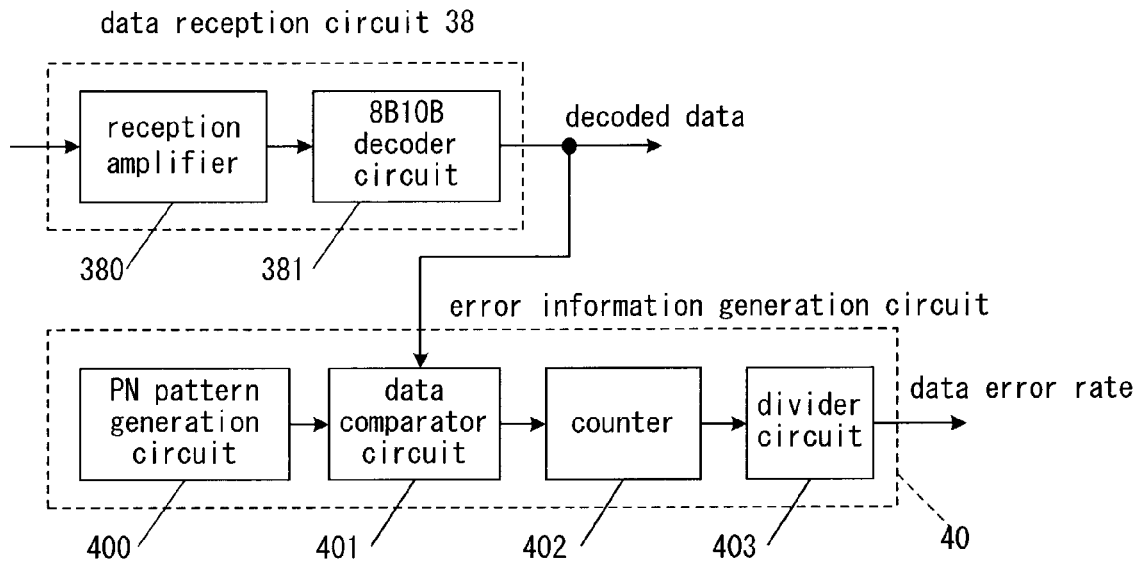
FIG. 7 is an exemplary diagram illustrating the data reception circuit and the error information generation circuit of the display device of FIG. 1.

FIG. 7 is an exemplary diagram illustrating the data reception circuit 38 and the error information generation circuit 40 of the display device 3 of FIG. 1.

As shown in FIG. 7, the data reception circuit 38 includes a reception amplifier 380 and an 8B10B decoder circuit 381.

The error information generation circuit 40 includes a PN pattern generation circuit 400, a data comparator circuit 401, a counter 402, and a divider circuit 403.

The reception amplifier 380 receives and amplifies the 8B10B code transmitted by the data transmission circuit 18 conforming to the DVI standard of FIG. 4 or by the data transmission circuit 62 of the video data transmitter 6 of FIG. 2, and then outputting the resulting signal to the 8B10B decoder circuit 381.

The 8B10B decoder circuit 381 decodes the inputted 8B10B code into the original 8-bit data and then outputs the resulting signal to the display switching circuit 36 of FIG. 1. This decoding algorithm is shown in the DVI standard.

In the test mode, the decoded 8-bit data is also outputted to the data comparator circuit 401 of FIG. 7. In the test mode, since the test apparatus 1 transmits the PN pattern generated by the PN pattern generation circuit 150 (FIG. 3), the decoded 8-bit data is the PN pattern.

The PN pattern generation circuit 400 of FIG. 7 generates the same PN pattern as that generated by the PN pattern generation circuit 150 (FIG. 3) of the test apparatus 1.

The data comparator circuit 401 compares the PN pattern generated by the PN pattern generation circuit 400 and the PN pattern outputted by the 8B10B decoder circuit 381. If any mismatched bits are detected, an inconsistency signal is outputted to the counter 402.

The counter 402 counts the inconsistency signal and then sends information indicating the number of counts to the divider circuit 403.

The divider circuit 403 divides the number of counts by the number of inspection bits to thereby determine the data error rate (the bit error rate).

In this case, the number of inspection bits is the number of bits per one loop of the inspection flow. This will be made clear in the explanation of the entire test flow described later.

Information indicating the data error rate determined in this manner is outputted to the inspection result image generation circuit 37 of FIG. 1 as the inspection information.

Figure 8:
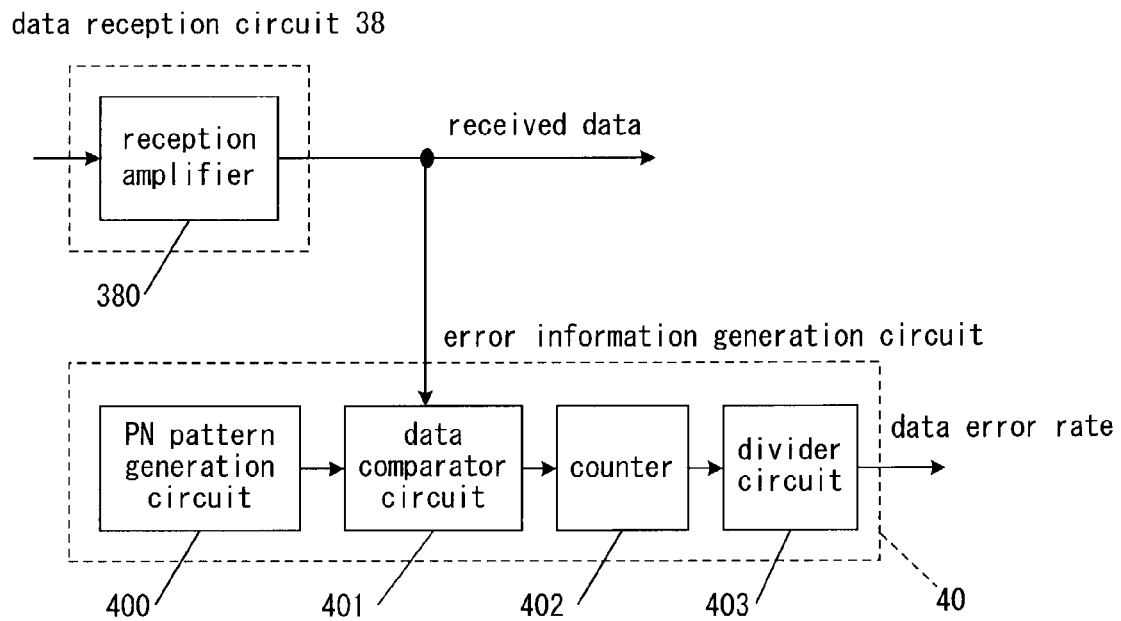
FIG. 8 is another exemplary diagram illustrating the data reception circuit and the error information generation circuit of the display device of FIG. 1.

FIG. 8 is another exemplary diagram illustrating the data reception circuit 38 and the error information generation circuit 40 of the display device 3 of FIG. 1. In FIG. 8, the same components as those of FIG. 7 are indicated by the same reference numerals.

As shown in FIG. 8, the data reception circuit 38 includes the reception amplifier 380.

The error information generation circuit 40 includes the PN pattern generation circuit 400, the data comparator circuit 401, the counter 402, and the divider circuit 403.

The reception amplifier 380 receives and amplifies data transmitted by the typical data transmission circuit 18 of FIG. 5 or by the data transmission circuit 62 of the video data transmitter 6 of FIG. 2, and then sends the resulting signal to the display switching circuit 36 of FIG. 1.

In the test mode, the amplified data is also outputted to the data comparator circuit 401 of FIG. 8. In the test mode, since the test apparatus 1 transmits the PN pattern generated by the PN pattern generation circuit 150 (FIG. 3), this amplified data is the PN pattern.

The error information generation circuit 40 of FIG. 8 is the same as the error information generation circuit 40 of FIG. 7.

Now, the malfunction information generation circuit 41 of FIG. 1 is described below. In the test mode, the malfunction information generation circuit 41 receives the timing signal that is generated by the PLL circuit 39 in accordance with the clock signal clk3 containing the jitter, and then generates malfunction information of the PLL circuit 39 to deliver the resulting signal to the inspection result image generation circuit 37 as the inspection information.

By way of example, such a case where a lock loss signal of the PLL circuit is generated as the malfunction information is described below in detail.

The loss of lock (the lock loss) of the PLL circuit is described below in a general manner. The PLL circuit generates an output clock (timing signal) in sync with an input clock. The loss of lock (the lock loss) means the state in which the PLL circuit cannot generate the output clock (timing signal) in sync with the input clock with the phase being kept unstable.

On the other hand, the state in which the PLL circuit is generating the output clock (timing signal) in sync with the input clock is referred to as the PLL circuit being "locked", whereas the state in which the PLL circuit locking is lost is referred to as the "loss of lock (lock loss)".

Now, in this Embodiment, the PLL circuit 39 may be unable to generate the timing signal in sync with the clock signal clk3 containing the jitter received by the phase modulation circuit 19 of the test apparatus 1, thereby causing the timing signal to be unstable in phase. In this case, the malfunction information generation circuit 41 outputs the lock loss signal to the inspection result image generation circuit 37 as the inspection information.

For example, a device for detecting the loss of lock (the lock loss) of the PLL circuit is disclosed in Japanese Unexamined Patent Publication No. Hei-7-170179. In this Embodiment, it is possible to employ this device as the malfunction information generation circuit 41.

The inspection result image generation circuit 37 generates information indicating the presence or absence of the loss of lock of the PLL circuit 39 in accordance with the lock loss signal outputted by the malfunction information generation circuit 41.

Then, the inspection result image generation circuit 37 generates image data (inspection result image data) indicating the data error rate and the presence or absence of the loss of lock.

The aforementioned reception circuit 30 of FIG. 1 can be configured as an integrated circuit (LSI).

A term "component" may be used below. For the reception circuit 30 being configured as an LSI, this "component" means "pin" for inputting/outputting a signal in the LSI. As a matter of course, even in the case of the reception circuit 30 being configured as an LSI, the "component" includes other known terminals.

Now, the display unit 31 of the display device 3 of FIG. 1 is described below. The display unit 31 displays in the normal mode the video data outputted by the display switching circuit 36.

On the other hand, in the test mode, the display unit 31 displays image data, outputted by the display switching circuit 36, which is generated by superimposing the inspection result image data on the test signal (the PN pattern or the test video data).

Now, the entire test flow according to this Embodiment is described below with reference to FIG. 1 and the flowcharts.

Figure 9:
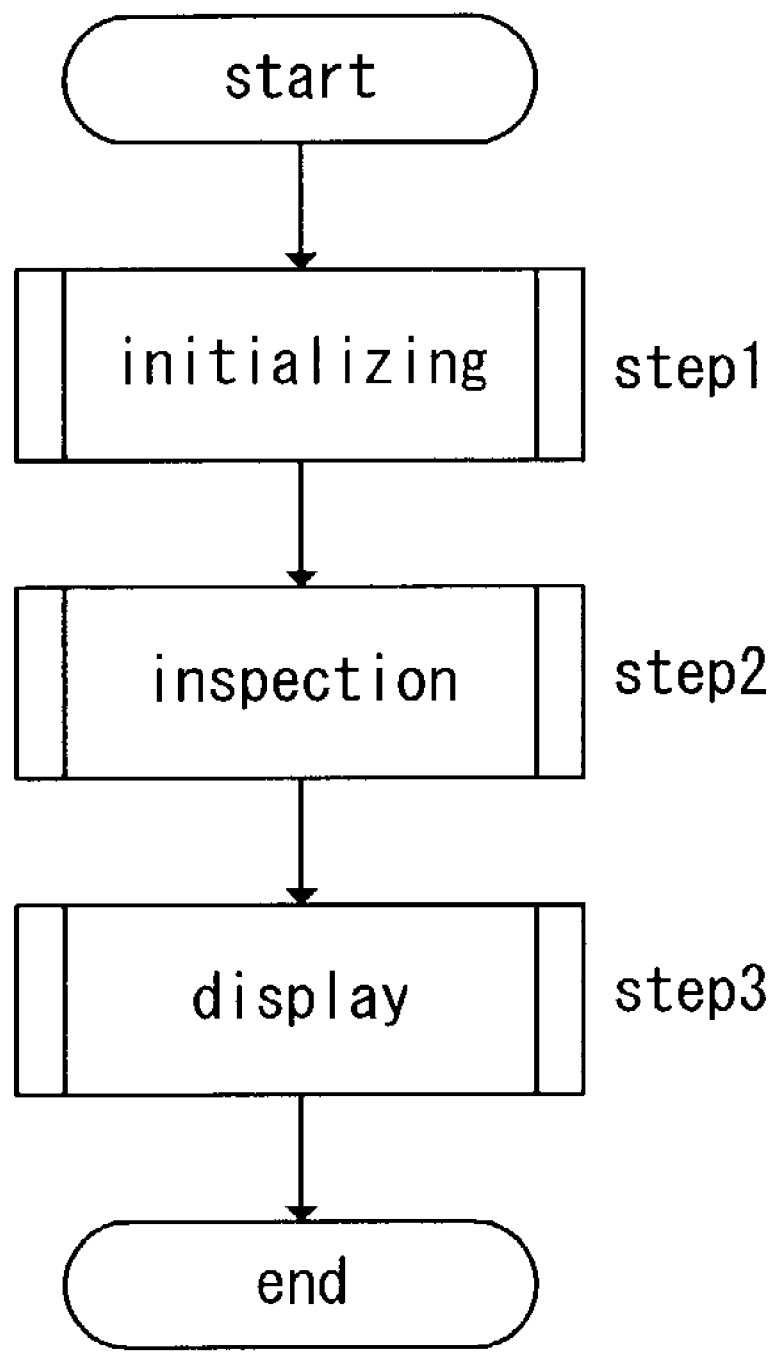
FIG. 9 is a flowchart illustrating the entire test procedure according to Embodiment 1 of the present invention.

FIG. 9 is a flowchart for use with the test apparatus 1 and the display device 3 according to this Embodiment.

As shown in FIG. 9, first, in step 1, the test apparatus 1 is initialized. Then, in step 2, the display device 3 is inspected. Then, in step 3, the inspection result image data is displayed on the display unit 31 of the display device 3.

Now, the processing in each step of FIG. 9 is described below in detail.

Figure 10:
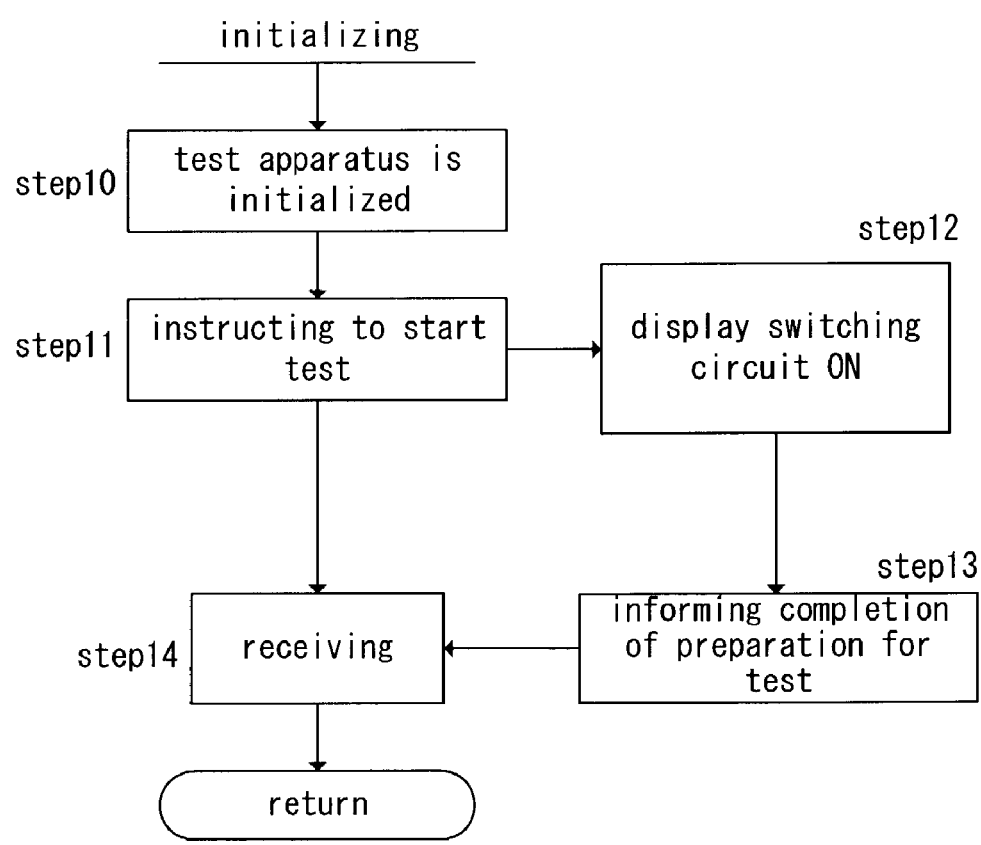
FIG. 10 is an explanatory view illustrating the initializing flow in step 1 of FIG. 9 according to Embodiment 1 of the present invention.

FIG. 10 illustrates an initializing flowchart in step 1 of FIG. 9. Referring to FIG. 10, the processing at the left shows the processing for the test apparatus 1, while the processing at the right indicates the processing for the display device 3.

As shown in FIG. 10, first, in step 10, the test apparatus 1 is initialized. More specifically, this step can be described as below.

The control circuit 12 outputs a switching signal to the switch circuit 154 (FIG. 3) of the test pattern generation circuit 15 to switch the test pattern generation circuit 15 so as to output the PN pattern. Additionally, the control circuit 12 initializes the jitter signal generation circuit 17.

Then, in step 11, the test apparatus 1 instructs the display device 3 to start the test. More specifically, this step can be described as below.

The control circuit 12 of the test apparatus 1 commands the control signal transmission circuit 13 to send a control signal for commanding the commencement of the test to the control signal reception circuit 32 of the display device 3.

In response to this, the control signal transmission circuit 13 of the test apparatus 1 sends the control signal for commanding the commencement of the test to the control signal reception circuit 32 of the display device 3.

In response to this, in step 12, the control signal reception circuit 32 of the display device 3 outputs the display switching signal to the display switching circuit 36 to turn on the display switching circuit 36.

In response to this, in step 13, the control signal transmission circuit 33 of the display device 3 transmits a control signal for informing the completion of preparation for the test to the control signal reception circuit 14 of the test apparatus 1.

This causes the display device 3 to be placed in the test mode.

In response to this, in step 14, the control signal reception circuit 14 of the test apparatus 1 receives the control signal for informing the completion of preparation for the test and then informs this to the control circuit 12.

Then, the process proceeds to step 2 of FIG. 9.

Figure 11:
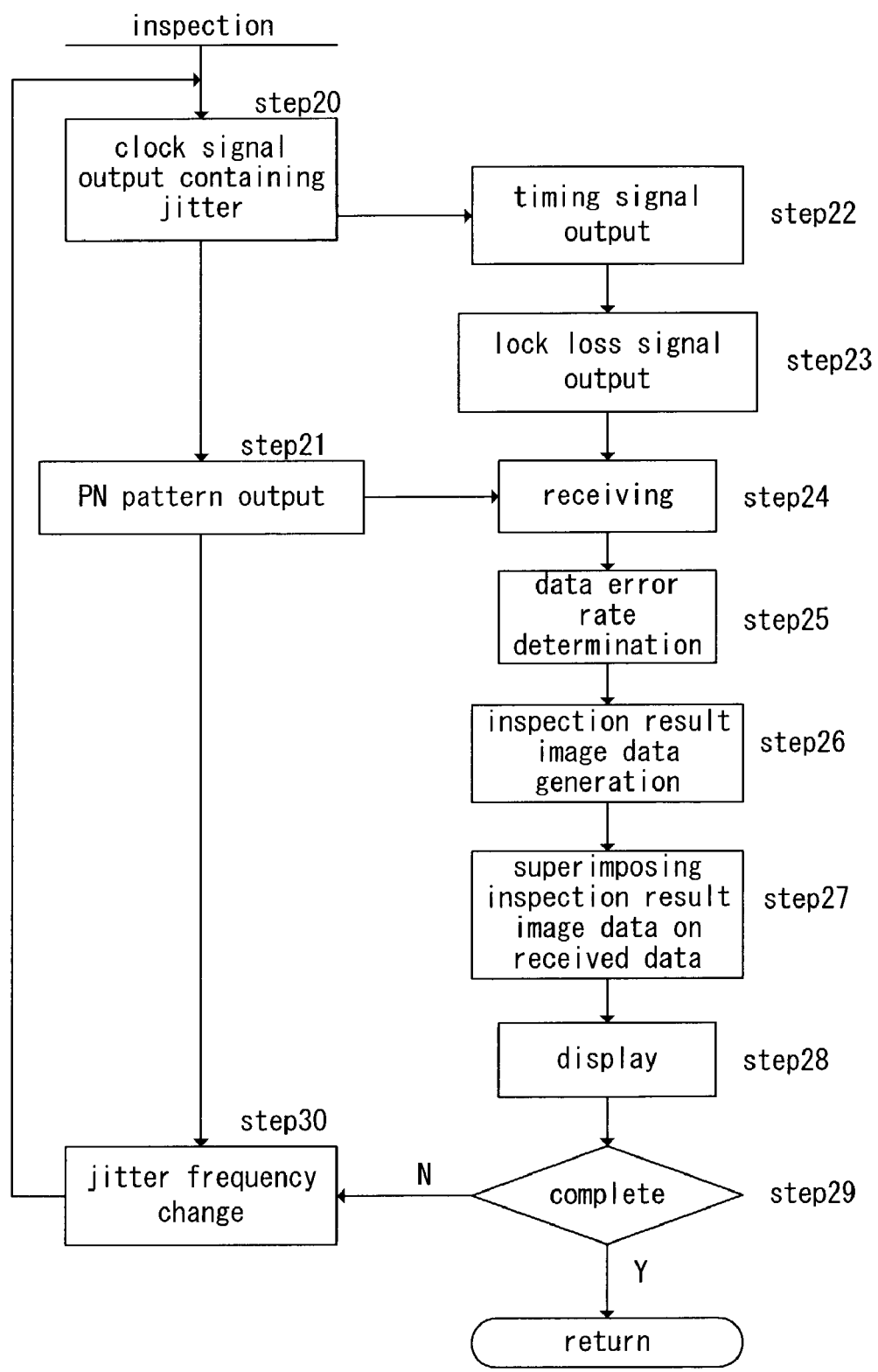
FIG. 11 is an explanatory view illustrating the inspection flow in step 2 of FIG. 9 according to Embodiment 1 of the present invention.

FIG. 11 illustrates an inspection flowchart in step 2 of FIG. 9. Referring to FIG. 11, the processing at the left shows the processing for the test apparatus 1, while the processing at the right indicates the processing for the display device 3.

As shown in FIG. 11, first, in step 20, the phase modulation circuit 19 of the test apparatus 1 outputs the clock signal clk3 containing the jitter to the test pattern generation circuit 15 and the PLL circuit 39 of the display device 3.

In response to this, in step 21, the test pattern generation circuit 15 of the test apparatus 1 outputs the PN pattern having a constant number of bits in sync with the clock signal containing the jitter supplied by the phase modulation circuit 19.

Then, the data transmission circuit 18 of the test apparatus 1 transmits the PN pattern to the data reception circuit 38 of the display device 3.

On the other hand, in step 22, the PLL circuit 39 of the display device 3 generates the timing signal in sync with the received clock signal clk3 containing the jitter. Subsequently, the PLL circuit 39 outputs the generated timing signal to the data reception circuit 38 and the malfunction information generation circuit 41.

In response to this, in step 23, when the PLL circuit 39 is in the lock loss state, the malfunction information generation circuit 41 which inputted the timing signal generates the lock loss signal and then outputs it to the inspection result image generation circuit 37 as the inspection information.

On the other hand, in step 24, the data reception circuit 38 of the display device 3 captures the PN pattern transmitted by the data transmission circuit 18 of the test apparatus 1 in sync with the timing signal supplied by the PLL circuit 39.

Then, the data reception circuit 38 outputs the received PN pattern as received data to the display switching circuit 36 and the error information generation circuit 40.

In response to this, in step 25, the error information generation circuit 40 determines the data error rate of the received data and then outputs the resulting signal to the inspection result image generation circuit 37 as the inspection information.

Then, in step 26, the inspection result image generation circuit 37 of the display device 3 adds one line of the inspection information (the jitter frequency, the presence or absence of the loss of lock of the PLL circuit 39, and the data error rate) to generate the image data (the inspection result image data) indicating the inspection information, which is in turn outputted to the display switching circuit 36.

This inspection information (the jitter frequency, the presence or absence of the loss of lock of the PLL circuit 39, and the data error rate) is stored in a storage circuit (not shown).

Then, in step 27, the display switching circuit 36 superimposes the inspection result image data outputted by the inspection result image generation circuit 37 on the received data (the PN pattern) outputted by the data reception circuit 38 and then outputs the resulting signal to the display unit 31.

Then, in step 28, the display unit 31 displays the received data (the PN pattern) on which the inspection result image data is superimposed.

Then, if the inspection has been completed, the process proceeds to step 3 of FIG. 9, and if not, the process proceeds to step 30 (step 29).

In step 30, the control circuit 12 of the test apparatus 1 changes the jitter frequency of the jitter signal generation circuit 17. Then, at this jitter frequency, the process performs processing from step 20 to step 29.

The number of bits per one loop in the inspection flow shown in FIG. 11 is the number of inspection bits. The error information generation circuit 40 of FIG. 7 and FIG. 8 divides the number of inconsistent bits in the PN pattern by the number of inspection bits to thereby determine the data error rate (the bit error rate).

Now, the processing of step 3 of FIG. 9 is described below in detail.

Figure 12:
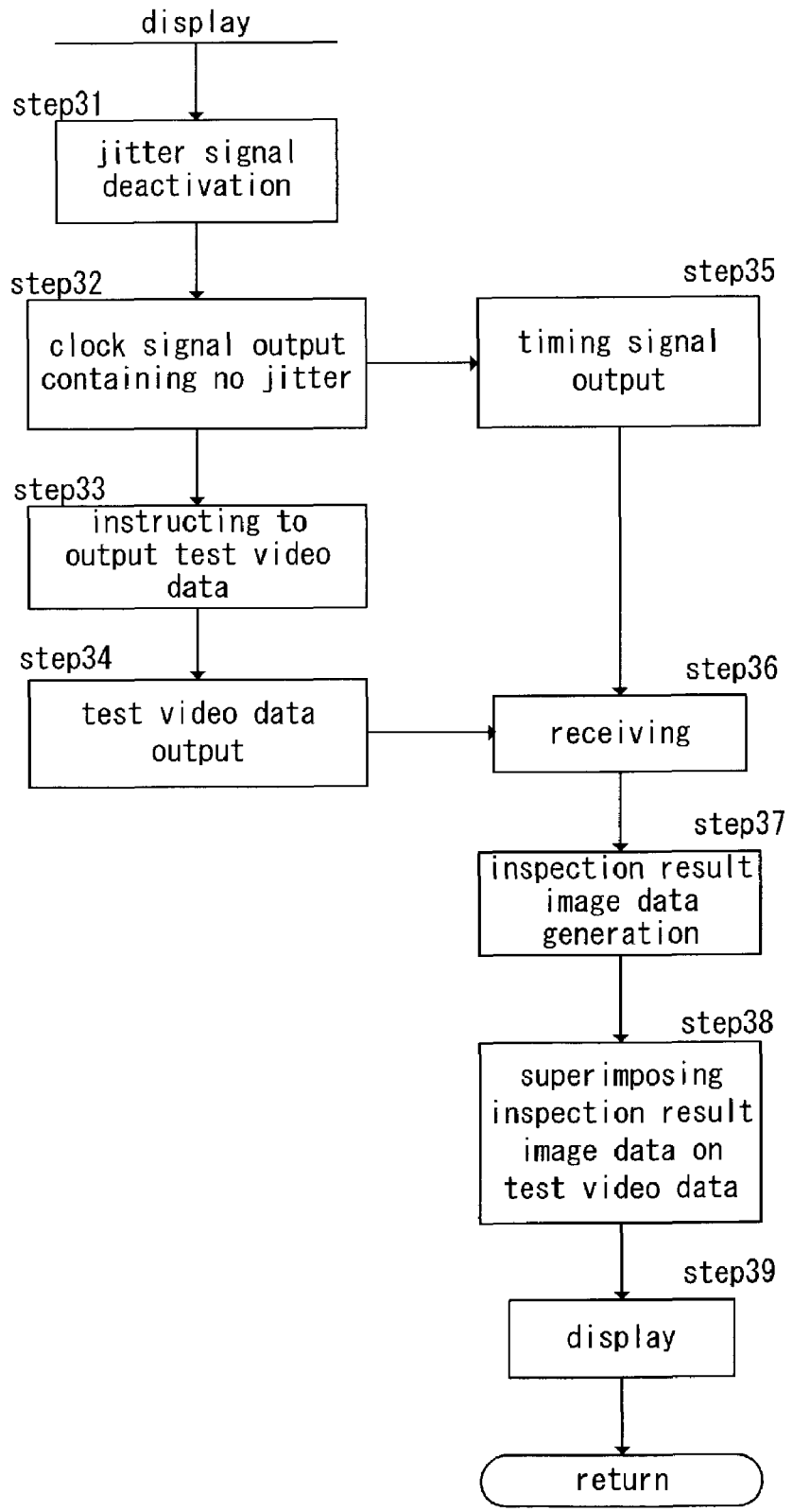
FIG. 12 is an explanatory view illustrating the display flow in step 3 of FIG. 9 according to Embodiment 1 of the present invention.

FIG. 12 illustrates a display flow in step 3 of FIG. 9. Referring to FIG. 12, the processing at the left shows the processing for the test apparatus 1, while the processing at the right indicates the processing for the display device 3.

As shown in FIG. 12, first, in step 31, the control circuit 12 of the test apparatus 1 commands the jitter signal generation circuit 17 to deactivate the generation of the jitter signal.

In response to this, the jitter signal generation circuit 17 deactivates the generation of the jitter signal clk2 by zeroing the jitter amplitude Aj and the jitter frequency fj of the jitter signal clk2.

In response to this, in step 32, the phase modulation circuit 19 of the test apparatus 1 outputs the clock signal clk3 containing no jitter to the test pattern generation circuit 15 and the PLL circuit 39 of the display device 3.

In step 33, the control circuit 12 of the test apparatus 1 outputs a switching signal to the switch circuit 154 (FIG. 3) of the test pattern generation circuit 15, thereby switching the test pattern generation circuit 15 to output test video data.

In response to this, in step 34, the test pattern generation circuit 15 outputs the test video data in sync with the clock signal containing no jitter outputted by the phase modulation circuit 19.

Then, the data transmission circuit 18 of the test apparatus 1 transmits the test video data to the data reception circuit 38 of the display device 3.

On the other hand, in step 35, the PLL circuit 39 of the display device 3 generates a timing signal in sync with the clock signal containing no jitter transmitted by the phase modulation circuit 19 of the test apparatus 1.

Then, the PLL circuit 39 outputs the generated timing signal to the data reception circuit 38.

In response to this, in step 36, the data reception circuit 38 of the display device 3 captures the test video data transmitted by the data transmission circuit 18 of the test apparatus 1, in sync with the timing signal outputted by the PLL circuit 39.

Then, the data reception circuit 38 outputs the received test video data as received data to the display switching circuit 36.

On the other hand, in step 37, the inspection result image generation circuit 37 of the display device 3 acquires the inspection information (the jitter frequency, the presence or absence of the loss of lock of the PLL circuit 39, and the data error rate) from the storage circuit (not shown) to generate the image data (the inspection result image data) indicating the inspection information.

Then, the inspection result image generation circuit 37 outputs the generated inspection result image data to the display switching circuit 36.

Then, in step 38, the display switching circuit 36 of the display device 3 superimposes the inspection result image data outputted by the inspection result image generation circuit 37 on the received data (the test video data) outputted by the data reception circuit 38 and then outputs the resulting signal to the display unit 31.

In response to this, in step 39, the display unit 31 of the display device 3 displays the test video data on which the inspection result image data is superimposed.

Now, an example of the display is shown below.

Figure 13:
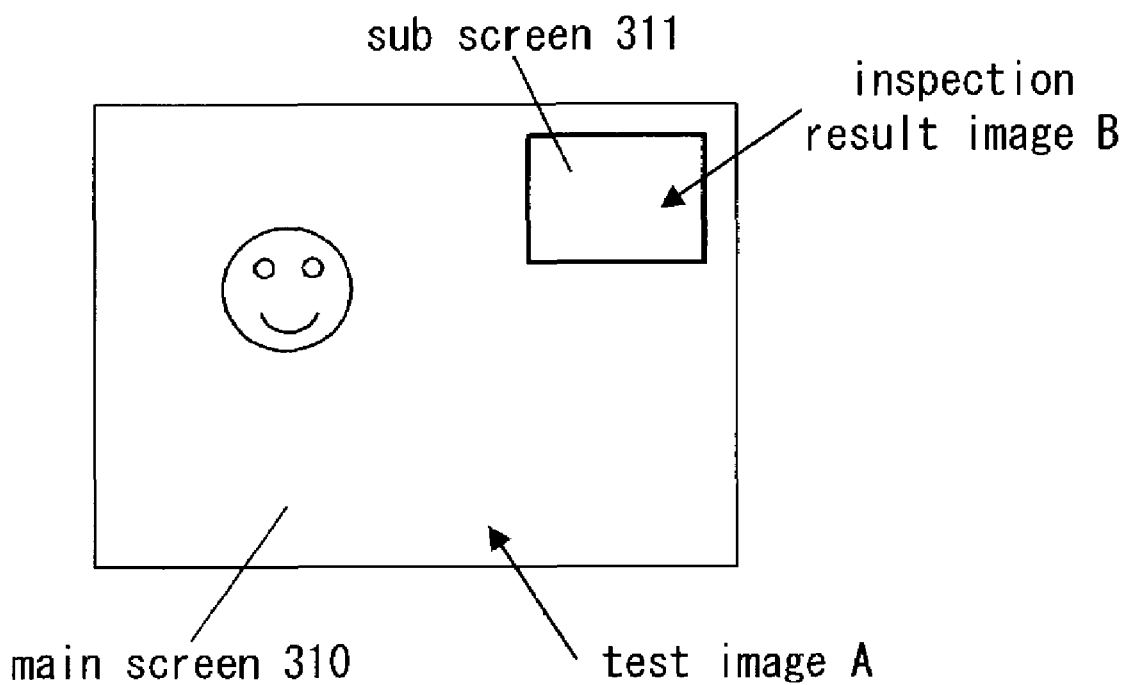
FIG. 13(a) is an exemplary view illustrating a representation of test video data superimposing inspection result image data.
FIG. 13(b) is an exemplary view illustrating a representation of the test video data.
Figure 13:
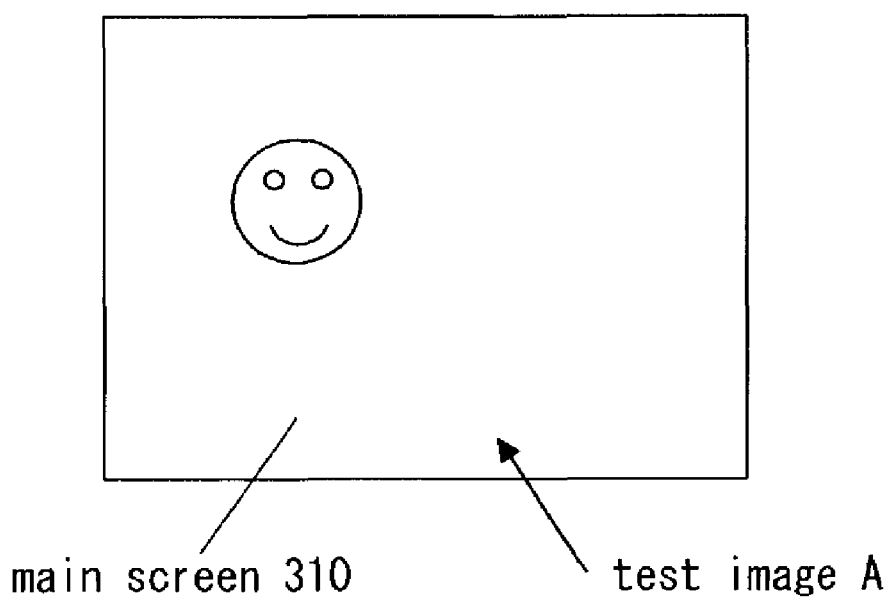

FIG. 13 shows exemplary views of image data to be displayed on the display unit 31 of the display device 3 in step 39 of FIG. 12.

FIG. 13(*a*) is an example of the display provided when the display switching signal from the control signal reception circuit 32 of FIG. 1 is on, whereas FIG. 13(*b*) is an example of the display provided when the display switching signal from the control signal reception circuit 32 of FIG. 1 is off.

In step 12 of FIG. 10, the control signal reception circuit 32 enables the display switching signal to turn on the display switching circuit 36.

As shown in FIG. 13(*a*), this causes the test video data superimposing the inspection result image data to be displayed on the display unit 31 of the display device 3.

More specifically, a test image A is displayed on a main screen 310 of the display unit 31, while an inspection result image B is displayed on a sub screen 311.

On the other hand, suppose that the control signal reception circuit 32 of the display device 3 has received the control signal transmitted by the control signal transmission circuit 13 of the test apparatus 1 and has thus been commanded to turn off the switching signal. In this case, the display switching circuit 36 is turned off, thereby causing the test video data to be outputted on the display unit 31.

In this case, as shown in FIG. 13(*b*), only the test image A is displayed on the main screen 310 of the display unit 31.

FIG. 14 is an exemplary view illustrating the inspection result image B to be displayed on the sub screen 311 of the display unit 31 of FIG. 13.

As shown in FIG. 14, the jitter frequency, the presence or absence of the loss of lock of the PLL circuit 39, and the data error rate are displayed on the sub screen 311 of the display unit 31 as the inspection result image. In the representation of the presence or absence of the loss of lock of the PLL circuit, "OK" indicates the locked state of the PLL circuit, while "NG" indicates the lock loss state of the PLL circuit.

Now, an alternative method of display is described below.

The display switching circuit 36 of the test apparatus 1 of FIG. 1 superimposes the inspection result image data on the test video data and then outputs the resulting signal to the display unit 31. However, the display switching circuit 36 can be employed as a simple switching circuit without this type of superimposition.

That is, suppose that in step 12 of FIG. 10, the control signal reception circuit 32 has activated the display switching signal to thereby turn on the display switching circuit 36. In this case, the display switching circuit 36 outputs the inspection result image data outputted by the inspection result image generation circuit 37 onto the display unit 31 without the superimposition in step 38 of FIG. 12.

On the other hand, suppose that the control signal reception circuit 32 of the display device 3 has received the control signal transmitted by the control signal reception circuit 14 of the test apparatus 1 and has thus been instructed to turn off the display switching signal. In this case, the display switching circuit 36 is turned off causing the test video data to be outputted onto the display unit 31.

These points are described below with reference to the drawings.

Figure 15:
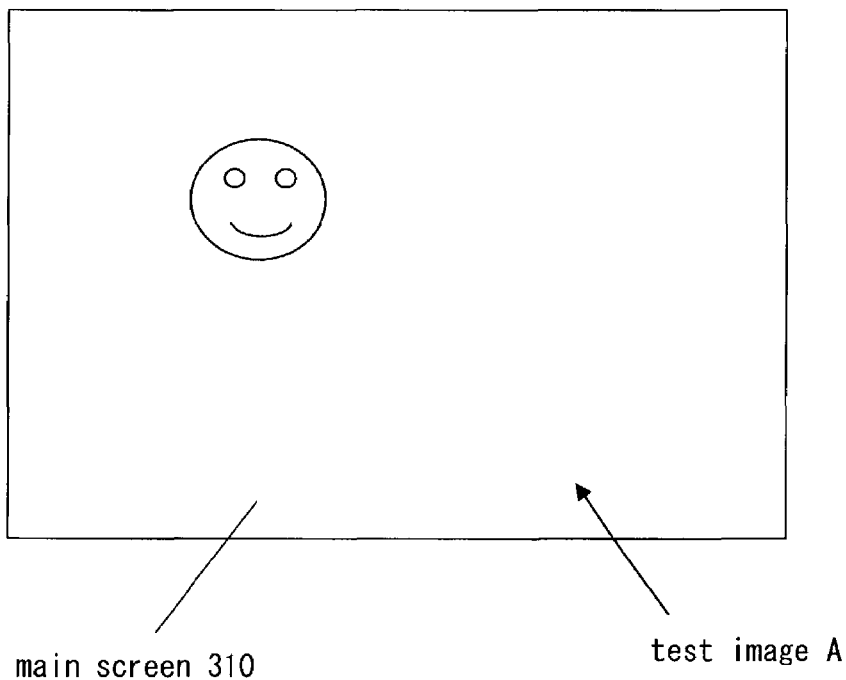
FIG. 15(a) is an exemplary view illustrating a representation of inspection result image data.
FIG. 15(b) is an exemplary view illustrating a representation of the test video data.

FIG. 15 shows other exemplary views of image data to be displayed on the display unit 31 of the display device 3 in step 39 of FIG. 12.

FIG. 15(*a*) shows an exemplary representation provided when the display switching signal from the control signal reception circuit 32 of FIG. 1 is turned on, while FIG. 15(*b*) shows an exemplary representation provided when the display switching signal from the control signal reception circuit 32 of FIG. 1 is turned off.

As shown in FIG. 15(*a*), to employ the display switching circuit 36 simply as the switching circuit, in step 39 of FIG. 12, the inspection result image B is displayed on the main screen 310 of the display unit 31. For example, the inspection result image B displayed here is an image as shown in FIG. 14.

On the other hand, suppose that the display switching signal is off and the display switching circuit 36 is also off. In this case, as shown in FIG. 15(*b*), the test image A is displayed on the main screen 310 of the display unit 31.

In this embodiment, the timing signal is supplied to the data reception circuit 38 of the display device 3 of FIG. 1 in sync with the clock signal containing the jitter (see steps 20 and 22 of FIG. 11). This makes it possible to know the effects of the jitter by measuring the data error rate. Other main factors that affect the data error rate include noise from other circuits, and thus the data error rate includes the influence caused by the noise.

Additionally, in this embodiment, the clock signal containing the jitter is supplied to the PLL circuit 39 of the display device 3 of FIG. 1 (see steps 20 and 22 of FIG. 11). This makes it possible to know the effects of the jitter on the PLL circuit 39 by detecting the lock loss signal. Other main factors that affect the PLL circuit 39 include noise from other circuits, and thus the loss of lock of the PLL circuit 39 includes the influence caused by the noise.

The operation of the test mode has been described. Now, with reference to FIG. 2, the operation in the normal mode will be briefly described below.

As shown in FIG. 2, the control signal transmission circuit 63 of the video data transmitter 6 transmits a control signal for informing of the transmission of the video data to the control signal reception circuit 32 of the display device 3 via the cable 5.

In response to this, using the component 8 for receiving the test related control signal (e.g., a pin provided in the case of the reception circuit 30 comprising an integrated circuit), the control signal reception circuit 32 receives the control signal.

In response to this, using the component 9 for transmitting the test related control signal (e.g., a pin provided in the case of the reception circuit 30 comprising an integrated circuit), the control signal transmission circuit 33 of the display device 3 transmits display control information, such as the resolution of the display device 3, to the control signal reception circuit 64 of the video data transmitter 6 via the cable 5.

The clock signal generation circuit 61 of the video data transmitter 6 generates a clock signal to transmit it to the video generation circuit 60 and the PLL circuit 39 of the display device 3.

The video generation circuit 60 outputs the video data in sync with the clock signal supplied by the clock signal generation circuit 61.

Then, the data transmission circuit 62 transmits the video data outputted by the video generation circuit 60 to the data reception circuit 38 of the display device 3 via the cable 5.

The data reception circuit 38 of the display device 3 captures the video data in sync with the timing signal that is generated by the PLL circuit 39 in sync with the clock signal.

The data reception circuit 38 outputs the captured video data to the display switching circuit 36.

At this time, since the display switching circuit 36 is in an off state, the video data is outputted to the display unit 31 for display.

As described above, the following holds true for the display device 3 according to this embodiment.

That is, in this embodiment, the inspection circuit 35 is provided inside the display device 3 of FIG. 1. Thus, inside the display device 3, the data reception related circuit 34 is inspected and the inspection information (the data error rate and the lock loss signal) is generated.

Then, the inspection result image generation circuit 37 generates the image data (the inspection result image data) indicating the inspection information, and the inspection result image data is displayed on the display unit 31 provided with the display device 3 (FIG. 13 through FIG. 15).

As a result, this makes it possible to carry out inspection after assembly of the display device 3 without disassembling the display device 3. This in turn makes it possible to carry out the test in a simple manner on the data reception related circuit 34 inside the display device 3 without changing noise environment inside the display device 3.

Additionally, since the inspection result image data is displayed on the display unit 31 incorporated into the display device 3, it is not required to provide an additional terminal outside the display device 3 to output the inspection result image data.

Furthermore, the control signal reception circuit 32 of the display device 3 receives the test related control signal from the test apparatus 1. Additionally, the control signal reception circuit 32 can receive and process an external signal other than the test related control signal via the component 8 for receiving the test related control signal.

Subsequently, after the control signal reception circuit 32 has received the control signal for instructing the commencement of the test from the test apparatus 1 as the test related control signal, the display device 3 proceeds to the test mode.

As described above, the control signal reception circuit 32 of the display device 3 can receive and process the external signal other than the test related control signal. This makes it possible for the display device 3 to change to the normal mode by transmitting to the control signal reception circuit 32 an external control signal for instructing it to return to the normal mode. Additionally, the display device 3 can proceed to the test mode by only transmitting the control signal for instructing the commencement of the test to the control signal reception circuit 32 from the test apparatus 1 external thereto.

That is, modes can be switched only with the control signal outside the display device 3.

As a result, this makes it possible to carry out the test on the data reception related circuit 34 inside the display device 3 in a simpler manner.

Additionally, since the control signal reception circuit 32 of the display device 3 can receive and process an external signal other than the test related control signal, control signal reception circuit 32 can receive and process the signal transmitted by the video data transmitter 6 external thereto.

This makes it possible for the external video data transmitter 6 to transmit signals as required to the control signal reception circuit 32 after it proceeds to the normal mode.

As described above, the present invention provides the control signal reception circuit 32 that can operate not only in the test mode but also in the normal mode.

Furthermore, when receiving the external signal, the control signal reception circuit 32 uses the common component 8 in either the test mode or normal mode.

This eliminates the need for an additional component for only receiving the test related control signal, thereby making it possible to avoid disadvantages such as an increase in packaging area and a loss in component compatibility (loss in pin compatibility with other LSIs).

On the other hand, the control signal transmission circuit 33 of the display device 3 can transmit the test related control signal. Additionally, the control signal transmission circuit 33 can transmit a signal other than the test related control signal via the component 9 for transmitting the test related control signal to the outside.

This makes it possible for the control signal transmission circuit 33 to transmit a signal to the external video data transmitter 6 via the component 9 for transmitting the test related control signal to the outside.

This makes it possible for the control signal transmission circuit 33 to transmit signals as required to the external video data transmitter 6 after it proceeds to the normal mode.

As described above, the present invention provides the control signal transmission circuit 33 that can operate not only in the test mode but also in the normal mode.

Furthermore, when transmitting signals to the outside, the control signal transmission circuit 33 uses the common component 9 in either the test mode or normal mode.

This eliminates the need for providing the display device 3 with an additional component for only transmitting the test related control signal, thereby making it possible to avoid disadvantages such as an increase in packaging area and a loss in component compatibility (loss in pin compatibility with other LSIs).

On the other hand, in the test mode, the display switching circuit 36 of the display device 3 superimposes the inspection result image data generated by the inspection result image generation circuit 37 on the test signal (test video data) inputted by the data reception circuit 38 and then outputs the resulting signal to the display unit 31.

This makes it possible to check the inspection result of the data reception related circuit 34 in the display unit 31 of the display device 3. It is also made possible to perform visual inspection on the test video data by externally transmitting the test video data as the test signal (see FIG. 13(a)).

Furthermore, depending on the mode, the display switching circuit 36 outputs either one of the video data or the test video data superimposing the inspection result image data to the display unit 31. This makes it possible to share the component for outputting the video data to the display unit 31 and the component for outputting the test video data superimposing the inspection result image data to the display unit 31.

This eliminates the need for providing an additional component used for only outputting the test video data superimposing the inspection result image data from the display switching circuit 36 to the display unit 31. This makes it possible to avoid disadvantages such as an increase in packaging area and a loss in component compatibility (loss in pin compatibility with other LSIs).

On the other hand, when the display switching circuit 36 is employed simply as the switching circuit, the display switching circuit 36 receives the video data from the data reception circuit 38 to output it to the display unit 31 in the normal mode. In the test mode, the display switching circuit 36 receives the inspection result image data generated by the inspection result image generation circuit 37 and then outputs it to the display unit 31.

This makes it possible to check the inspection result of the data reception related circuit 34 in the display unit 31 of the display device 3 (see FIG. 15(a)).

Additionally, the function for enabling superimposition can be eliminated when the display switching circuit 36 is used simply as the switching circuit, thereby making it possible to simplify the display switching circuit 36.

Furthermore, depending on the mode, the display switching circuit 36 employed simply as the switching circuit outputs either one of the video data or the inspection result image data generated by the inspection result image generation circuit 37 to the display unit 31. This makes it possible to share the component for outputting the video data to the display unit 31 and the component for outputting the inspection result image data generated by the inspection result image generation circuit 37 to the display unit 31.

This eliminates the need for providing an additional component used for only outputting the inspection result image data from the display switching circuit 36 employed simply as the switching circuit to the display unit 31. This makes it possible to avoid disadvantages such as an increase in packaging area and a loss in component compatibility (loss in pin compatibility with other LSIs).

Additionally, in the test mode, the display switching circuit 36 employed simply as the switching circuit receives the inspection result image data generated by the inspection result image generation circuit 37 in accordance with the control signal for instructing a display switchover received by the control signal reception circuit 32 to output the data to the display unit 31. Alternatively, the display switching circuit 36 receives the test video data as the test signal and then outputs the test video data to the display unit 31.

As described above, in the test mode, the display switching circuit 36 employed simply as the switching circuit outputs either one of the inspection result image data or the test video data to the display unit 31 in accordance with the control signal. This makes it possible to share the component for outputting the inspection result image data to the display unit 31 and the component for outputting the test video data to the display unit 31.

This eliminates the need for providing an additional component used for only outputting the data in the test mode (inspection result image data and test video data) from the display switching circuit 36 employed simply as the switching circuit to the display unit 31. This makes it possible to avoid disadvantages such as an increase in packaging area and a loss in component compatibility (loss in pin compatibility with other LSIs).

It is also made possible to perform visual inspection on the test video data at the display unit 31 of the display device 3 by externally transmitting the control signal (see FIGS. 13(*a*) and 15(*b*)).

On the other hand, the data reception circuit 38 of the display device 3 receives the video data in the normal mode, while receiving the PN pattern as the test signal in the test mode.

Then, in the test mode, the error information generation circuit 40 of the display device 3 generates the data error rate of the PN pattern received by the data reception circuit 38. The data error rate is then displayed on the display unit 31 (see FIG. 14).

As a result, this makes it possible to carry out inspection after assembly of the display device 3 without disassembling the display device 3. This in turn makes it possible to carry out the test (the measurement of the data error rate) in a simple manner on the data reception circuit 38 inside the display device 3 without changing the noise environment inside the display device 3.

On the other hand, the PLL circuit 39 receives the clock signal in the normal mode, while receiving the clock signal containing the jitter as the test signal, generating the timing signal in sync therewith.

Then, in the test mode, the malfunction information generation circuit 41 generates the lock loss signal when the PLL circuit 39 locking is lost. The presence or absence of the loss of lock is displayed on the display unit 31 (see FIG. 14).

As a result, this makes it possible to carry out inspection after assembly of the display device 3 without disassembling the display device 3. This in turn makes it possible to carry out the test (the detection of the lock loss signal) in a simple manner on the PLL circuit 39 inside the display device 3 without changing the noise environment inside the display device 3.

Since both the PLL circuit 39 and the data reception circuit 38 are inspected, it can be determined whether the malfunction of the display device 3 is caused by either the PLL circuit 39 or other transmission degradation factors. This makes it possible to specifically identify the cause of the malfunction of the display device 3.

On the other hand, the data reception circuit 38 of the display device 3 receives the video data in sync with the timing signal based on the clock signal in the normal mode, while receiving the PN pattern as the test signal in sync with the timing signal based on the clock signal containing the jitter.

The data error rate can be determined on the PN pattern received in sync with the timing signal in this manner, thereby providing the findings on the effects of the jitter.

On the other hand, in this embodiment, the inspection circuit 35 inspects the data reception related circuit 34 to generate the inspection information, and the image data (the inspection result image data) indicating the inspection information is displayed on the display unit 31.

As a result, this makes it possible to provide more precise objective inspection results when compared with the case of carrying out visual inspection by only human eyesight.

As described above, the following holds true for the test apparatus 1 according to this embodiment.

That is, in this embodiment, the control signal transmission circuit 13 of the test apparatus 1 receives the command from the control circuit 12 and then transmits the control signal for instructing the commencement of the test to the display device 3.

In such a manner, the display device 3 for receiving the test signal can be made ready for the test in a simple manner by only transmitting the control signal to the display device 3.

On the other hand, the control circuit 12 of the test apparatus 1 instructs the jitter frequency as a test condition to the jitter signal generation circuit 17 of the test signal generation circuit 10.

This alleviates the time and manpower for setting the jitter frequency that has been conventionally set manually.

The test pattern generation circuit 15 of the test apparatus 1 generates the PN pattern as the test signal. The PN pattern is then transmitted to the display device 3.

This makes it possible to determine the data error rate of the PN pattern received by the data reception circuit 38 in the display device 3.

Additionally, the phase modulation circuit 19 of the test apparatus 1 superimposes the jitter signal clk2 on the clock signal clk1 to generate the clock signal clk3 containing the jitter, and then transmits the clock signal clk3 containing the jitter as the test signal to the PLL circuit 39 of the display device 3.

This makes it possible to know the effects of the jitter on the PLL circuit 39 in the display device 3 by detecting the lock loss signal of the PLL circuit 39.

The test pattern generation circuit 15 of the test apparatus 1 outputs the PN pattern to the data transmission circuit 18 in sync with the clock signal containing the jitter generated by the phase modulation circuit 19.

This makes it possible in the display device 3 to know the effects of the jitter on the data error rate of the PN pattern received by the data reception circuit 38.

The test apparatus 1 transmits the test signal (the PN pattern, the test video data, and the clock signal clk3 containing jitter) to the display device 3 via the cable 5.

This makes it possible to provide findings on the effects of the cable in the inspection on the data reception related circuit 34 (the data reception circuit 38 and the PLL circuit 39) of the display device 3.

The test can be carried out with the test apparatus 1 being connected not via the cable 5 but directly to the display device 3.

Additionally, when there is no need for visual inspection of the test video data at the display unit 31 of the display device 3, the test video data generation circuit 153 of FIG. 3 can be eliminated.

In this case, the display switching circuit 36 of the display device 3 of FIG. 1 is employed simply as a switching circuit.

Embodiment 2

In this embodiment, unlike Embodiment 1, a test apparatus receives inspection information from a display device to generate inspection result image data, which is in turn transmitted to the display device. This will be described below in detail.

Figure 16:
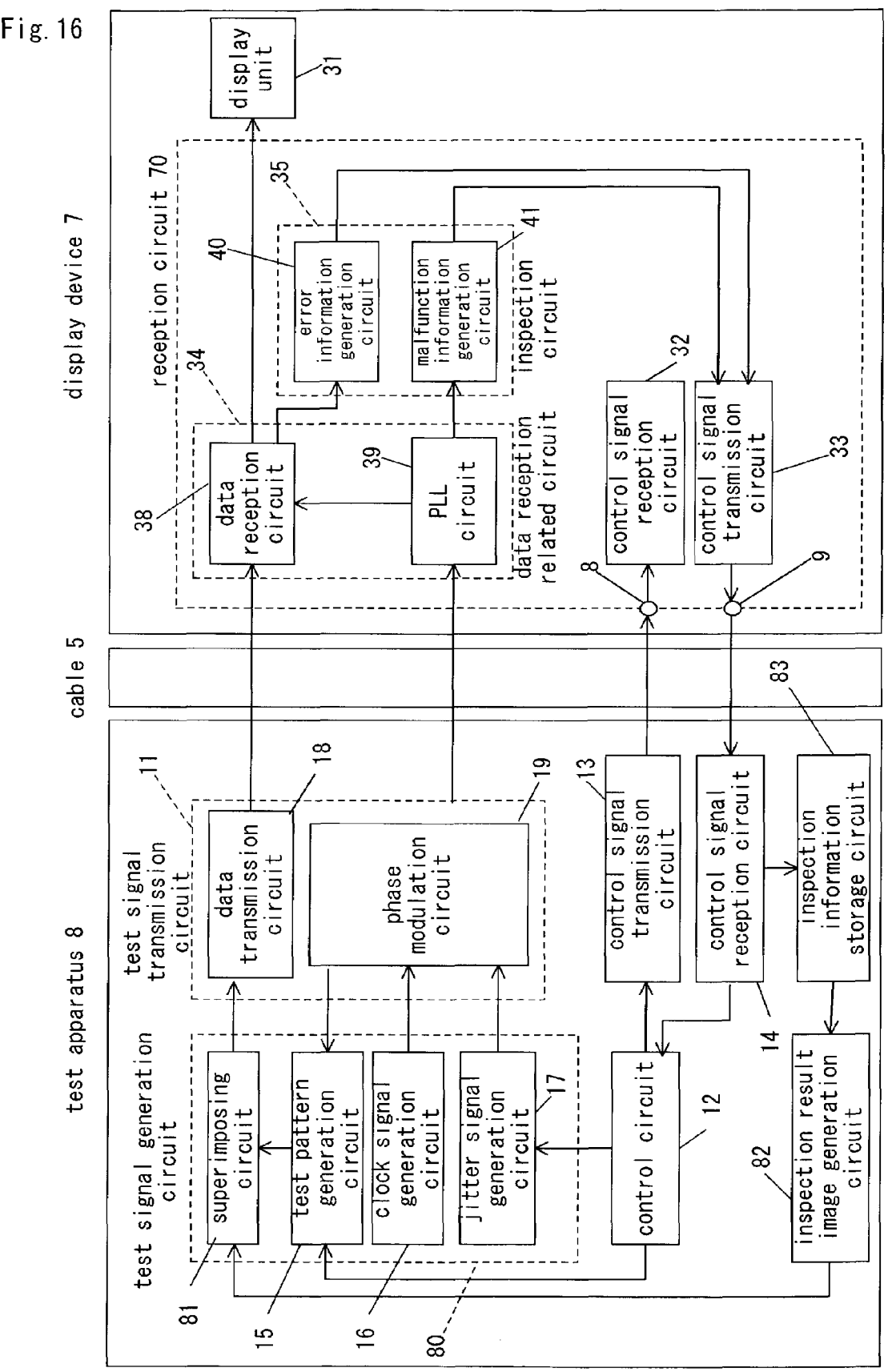
FIG. 16 is a block diagram illustrating an exemplary test apparatus and an exemplary display device according to Embodiment 2 of the present invention.

FIG. 16 is a block diagram illustrating an exemplary test apparatus 1 and an exemplary display device according to Embodiment 2 of the present invention. Referring to FIG. 16, the same components as those of FIG. 1 are indicated with the same reference numerals, and their descriptions will be omitted as appropriate.

As shown in FIG. 16, the test apparatus 8 is connected to the display device 7 via a cable 5.

The test apparatus 8 comprises a test signal generation circuit 80, a test signal transmission circuit 11, a control circuit 12, a control signal transmission circuit 13, a control signal reception circuit 14, an inspection result image generation circuit 82, and an inspection information storage circuit 83.

The test signal generation circuit 80 includes a test pattern generation circuit 15, a clock signal generation circuit 16, a jitter signal generation circuit 17, and a superimposition circuit 81.

The test signal transmission circuit 11 includes a data transmission circuit 18 and a phase modulation circuit 19.

The display device 7 comprises a reception circuit 70 and a display unit 31.

The reception circuit 70 includes a data reception related circuit 34, an inspection circuit 35, a control signal reception circuit 32, and a control signal transmission circuit 33.

The data reception related circuit 34 includes a data reception circuit 38 and a PLL (Phase Locked Loop) circuit 39.

The inspection circuit 35 includes an error information generation circuit 40 and a malfunction information generation circuit 41.

Like the reception circuit 30 of FIG. 1, the reception circuit 70 may be configured as an integrated circuit (LSI).

The term "component" may be used below. For the reception circuit 70 being configured as an LSI, this "component" means a signal input/output "pin" of the LSI. As a matter of course, even in the case of the reception circuit 70 being configured as an LSI, the "component" includes other known terminals.

With this configuration, the test apparatus 8 of FIG. 16 sends the test signal via the cable 5 to carry out the test on the display device 7. The state in which the display device 7 is ready for the test or carrying out the test is called the "test mode".

Typically, the display device 7 receives the video data from the video data transmitter 6 of FIG. 2 to display it on the display unit 31. This normal state of operation is called "normal mode". The operation in the normal mode is the same as in Embodiment 1.

Now, when compared with the display device 3 of FIG. 1, the display device 7 of FIG. 16 is not provided with the display switching circuit 36 and the inspection result image generation circuit 37. The other components are provided for the display device 7 of FIG. 16 as well as for the display device 3 of FIG. 1, and thus their descriptions are omitted.

In this configuration, however, the information indicating the data error rate generated by the error information generation circuit 40 and the lock loss signal generated by the malfunction information generation circuit 41 are outputted to the control signal transmission circuit 33.

The test apparatus 8 has the test pattern generation circuit 15, the clock signal generation circuit 16, the jitter signal generation circuit 17, the test signal transmission circuit 11, the control circuit 12, the control signal transmission circuit 13, and the control signal reception circuit 14, which are the same as the test pattern generation circuit 15, the clock signal generation circuit 16, the jitter signal generation circuit 17, the test signal transmission circuit 11, the control circuit 12, the control signal transmission circuit 13, and the control signal reception circuit 14 of the test apparatus 1 of FIG. 1, respectively. Thus, the descriptions of these components are omitted.

With this arrangement, however, the control signal reception circuit 14 receives the inspection information (the presence or absence of the loss of lock of the PLL circuit 39, and the information indicating the data error rate) transmitted by the control signal transmission circuit 33 of the display device 7, and then outputs the information to the inspection information storage circuit 83.

The inspection information storage circuit 83 stores the inspection information. The inspection result image generation circuit 82 acquires the inspection information from the inspection information storage circuit 83 to generate the image data indicating the inspection information.

The image data indicating inspection information may hereinafter be referred to as "inspection result image data". On the other hand, an image indicating the inspection information may hereinafter be referred to as "inspection result image".

The inspection result image generation circuit 82 outputs the generated inspection result image data to the superimposition circuit 81.

The superimposition circuit 81 superimposes the inspection result image data on the test signal (the PN pattern or the test video data) generated by the test pattern generation circuit 15, and then outputs the resulting signal to the data transmission circuit 18.

Then, the data reception circuit 38 of the display device 7 receives the test signal superimposing the inspection result image data from the data transmission circuit 18 of the test apparatus 8, and then outputs the resulting signal to the display unit 31. The display unit 31 displays the test signal superimposing the inspection result image data.

Now, the entire test flow according to this embodiment is described below with reference to FIG. 16 and the flowcharts.

The entire test flow according to this embodiment is the same as that of the flowchart shown in FIG. 9, and thus the following description will be made with reference to FIG. 9.

As shown in FIG. 9, first, in step 1, the test apparatus 8 is initialized. Then, in step 2, the display device 7 is inspected. Then, in step 3, the inspection result image data is displayed on the display unit 31 of the display device 7.

Now, the processing in each step of FIG. 9 is described below in detail.

Figure 17:
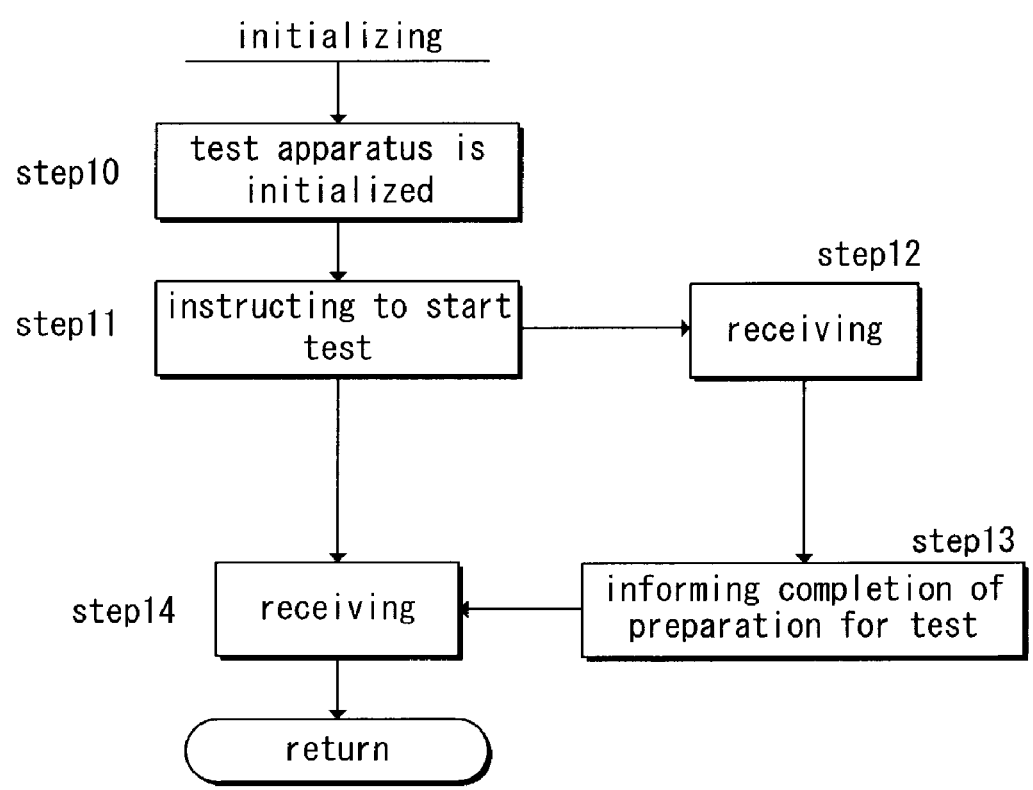
FIG. 17 is an explanatory view illustrating the initializing flow in step 1 of FIG. 9 according to Embodiment 2 of the present invention.

FIG. 17 illustrates the initializing flow in step 1 of FIG. 9. Referring to FIG. 17, the processing at the left shows the processing for the test apparatus 8, while the processing at the right indicates the processing for the display device 7.

As shown in FIG. 17, first, in step 10, the test apparatus 8 is initialized. More specifically, this step can be described as below.

The control circuit 12 of the test apparatus 8 outputs the switching signal to the switch circuit 154 (FIG. 3) of the test pattern generation circuit 15 to switch the test pattern generation circuit 15 so as to output the PN pattern. Additionally, the control circuit 12 initializes the jitter signal generation circuit 17.

Then, in step 11, the test apparatus 8 instructs the display device 7 to start test. More specifically, this step can be described as below.

The control circuit 12 of the test apparatus 8 commands the control signal transmission circuit 13 to send the control signal for the commencement of the test to the control signal reception circuit 32 of the display device 7.

In response to this, the control signal transmission circuit 13 of the test apparatus 8 sends the control signal for commanding the commencement of the test to the control signal reception circuit 32 of the display device 7.

Then, in step 12, the control signal reception circuit 32 of the display device 7 receives the control signal for instructing the commencement of the test.

This causes the control signal transmission circuit 33 of the display device 7 to start transmitting the inspection information (the information indicating the presence or absence of the loss of lock of the PLL circuit 39 and the information indicating the data error rate) to the test apparatus 8.

In response to this, in step 13, the control signal transmission circuit 33 of the display device 7 transmits the control signal for informing the completion of preparation for the test to the control signal reception circuit 14 of the test apparatus 8.

This causes the display device 7 to be placed in the test mode.

In response to this, in step 14, the control signal reception circuit 14 of the test apparatus 8 receives the control signal for informing the completion of preparation for the test and then informs the control circuit 12 of it.

Then, the process proceeds to step 2 of FIG. 9.

Figure 18:
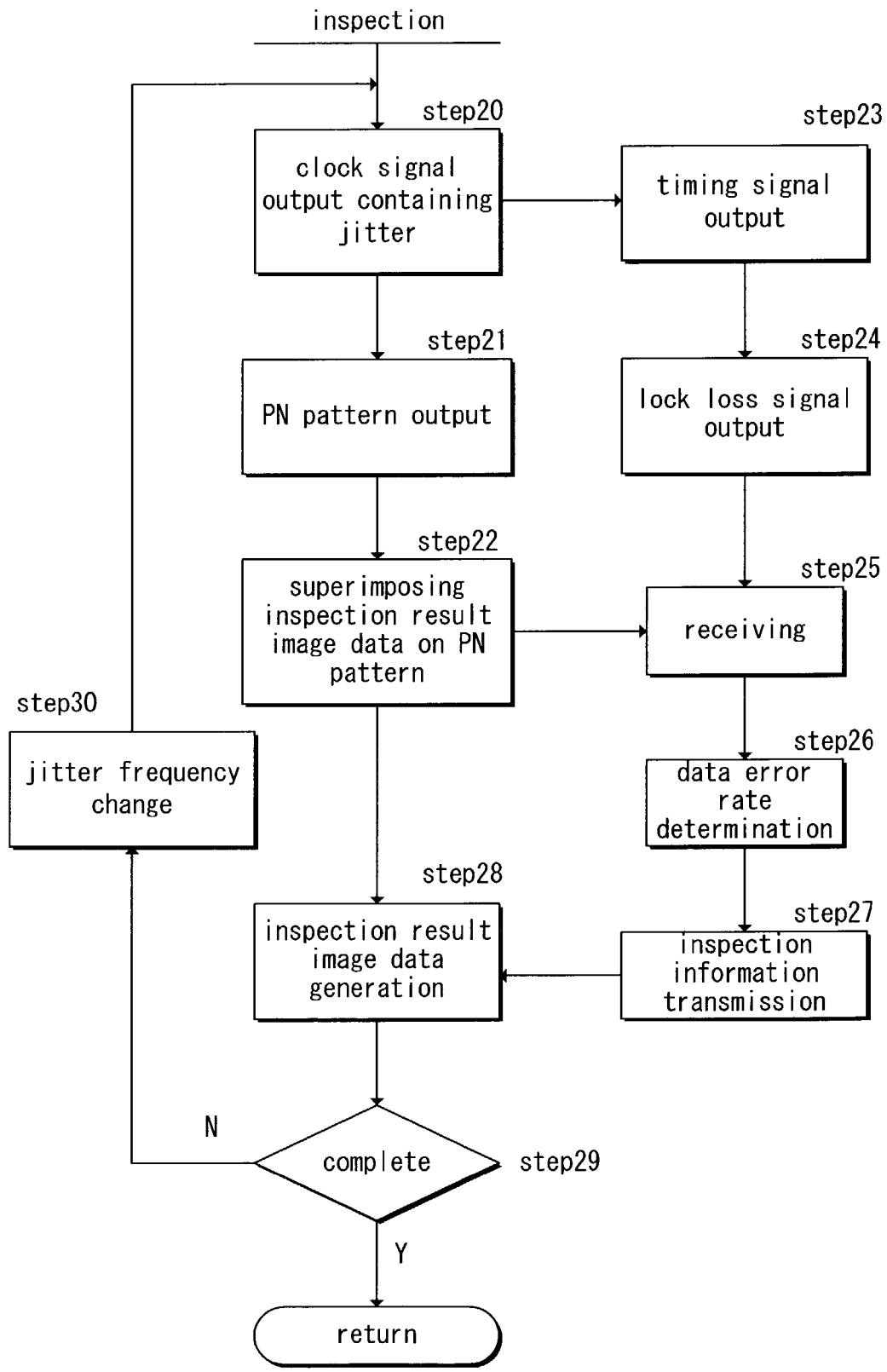
FIG. 18 is an explanatory view illustrating the inspection flow in step 2 of FIG. 9 according to Embodiment 2 of the present invention.

FIG. 18 illustrates the inspection flow in step 2 of FIG. 9. Referring to FIG. 18, the processing at the left shows the processing for the test apparatus 8, while the processing at the right indicates the processing for the display device 7.

As shown in FIG. 18, first, in step 20, the phase modulation circuit 19 of the test apparatus 8 outputs the clock signal clk3 containing the jitter to the test pattern generation circuit 15 and the PLL circuit 39 of the display device 7.

In response to this, in step 21, the test pattern generation circuit 15 of the test apparatus 8 outputs the PN pattern having the constant number of bits in sync with the clock signal containing the jitter supplied by the phase modulation circuit 19.

In response to this, in step 22, the superimposition circuit 81 of the test apparatus 8 superimposes the inspection result image data generated by the inspection result image generation circuit 82 of the test apparatus 8 on the PN pattern, and then outputs the resulting signal to the data transmission circuit 18, with the inspection result image being blank at first.

Then, the data transmission circuit 18 of the test apparatus 8 transmits the PN pattern superimposing the inspection result image data to the data reception circuit 38 of the display device 7.

On the other hand, in step 23, the PLL circuit 39 of the display device 7 generates the timing signal in sync with the received clock signal clk3 containing the jitter. Subsequently, the PLL circuit 39 outputs the generated timing signal to the data reception circuit 38 and the malfunction information generation circuit 41.

In response to this, in step 24, when the PLL circuit 39 is in the lock loss state, the malfunction information generation circuit 41 having inputted the timing signal generates the lock loss signal and then outputs it to the control signal transmission circuit 33 as the inspection information.

In response to this lock loss signal, the control signal transmission circuit 33 generates the information indicating the presence or absence of the loss of lock of the PLL circuit 39.

On the other hand, in step 25, the data reception circuit 38 of the display device 7 captures the PN pattern superimposing the inspection result image data, in sync with the timing signal supplied by the PLL circuit 39. The PN pattern superimposing the inspection result image data is transmitted to the data reception circuit 38 by the data transmission circuit 18 of the test apparatus 8.

Then, the data reception circuit 38 outputs the received PN pattern as the received data to the display unit 31 and the error information generation circuit 40.

In response to this, in step 25, the error information generation circuit 40 determines the data error rate of the received data and then outputs the resulting signal to the control signal transmission circuit 33 as the inspection information.

Then, in step 27, the control signal transmission circuit 33 of the display device 7 transmits the inspection information (the information indicating the presence or absence of the loss of lock of the PLL circuit 39 and the information indicating the data error rate) to the control signal reception circuit 14 of the test apparatus 8.

Then, in step 28, the control signal reception circuit 14 outputs the received inspection information to the inspection information storage circuit 83.

Then, the inspection result image generation circuit 82 acquires the inspection information from the inspection information storage circuit 83 to generate the inspection result image data, and then outputs the data to the superimposition circuit 81.

Then, if the inspection has been completed, the process proceeds to step 3 of FIG. 9, and if not, the process proceeds to step 30 (step 29).

In step 30, the control circuit 12 of the test apparatus 8 changes the jitter frequency of the jitter signal generation circuit 17. Then, at that jitter frequency, processing 20 through 29 are performed.

The number of bits per one loop in the inspection flow shown in FIG. 18 is the number of inspection bits. The error information generation circuit 40 of FIG. 7 and FIG. 8 divides the number of inconsistent bits in the PN pattern by the number of inspection bits to thereby determine the data error rate.

Now, the processing of step 3 of FIG. 9 is described below in detail.

Figure 19:
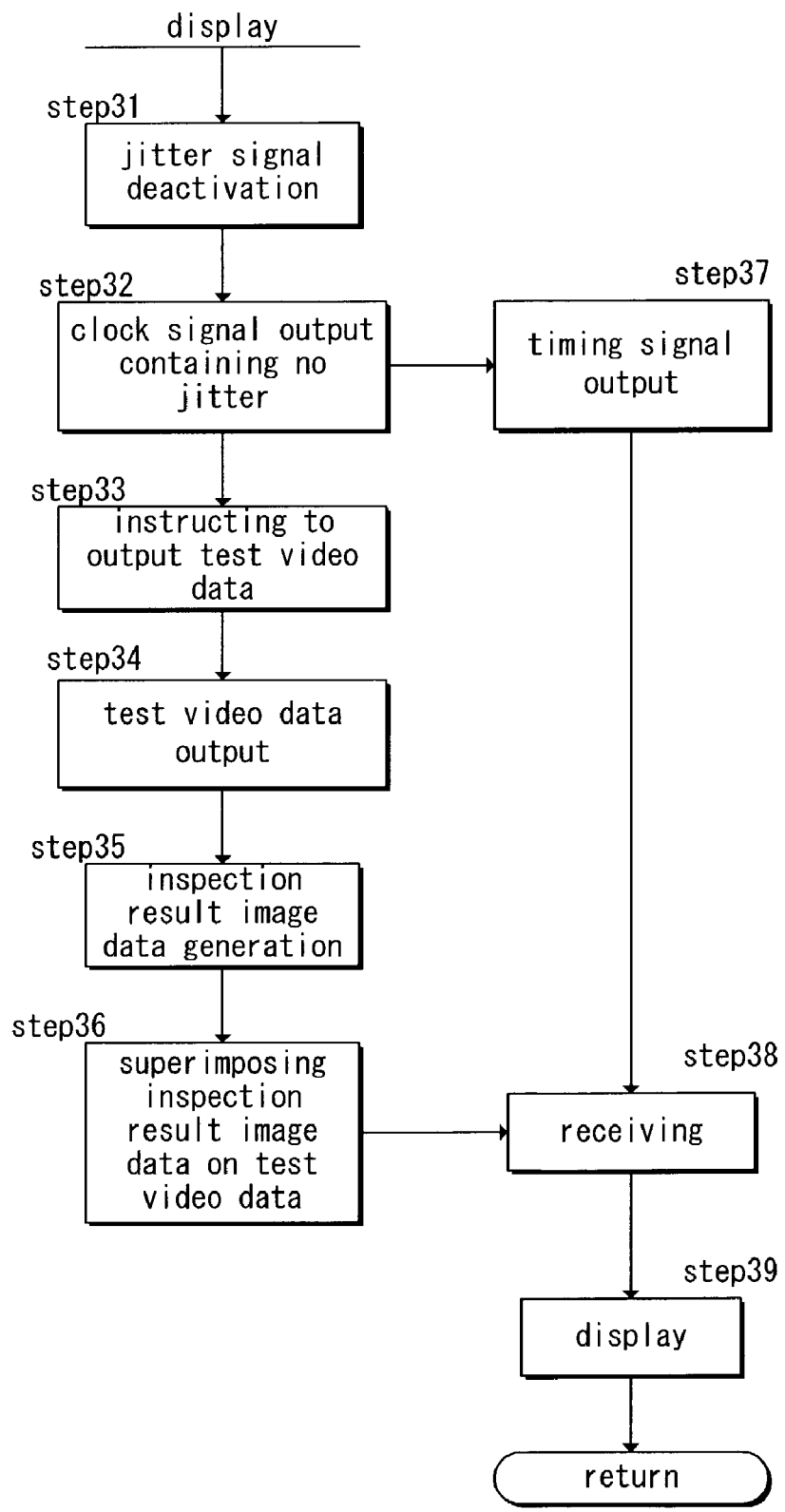
FIG. 19 is an explanatory view illustrating the display flow in step 3 of FIG. 9 according to Embodiment 2 of the present invention.

FIG. 19 illustrates the display flowchart in step 3 of FIG. 9. Referring to FIG. 19, the processing at the left shows the processing for the test apparatus 8, while the processing at the right indicates the processing for the display device 7.

As shown in FIG. 19, first, in step 31, the control circuit 12 of the test apparatus 8 commands the jitter signal generation circuit 17 to deactivate the generation of the jitter signal.

In response to this, the jitter signal generation circuit 17 deactivates the generation of the jitter signal clk2 by zeroing the jitter amplitude Aj and the jitter frequency fj of the jitter signal clk2.

In response to this, in step 32, the phase modulation circuit 19 of the test apparatus 8 outputs the clock signal clk3 containing no jitter to the test pattern generation circuit 15 and the PLL circuit 39 of the display device 7.

In step 33, the control circuit 12 of the test apparatus 8 outputs the switching signal to the switch circuit 154 (FIG. 3) of the test pattern generation circuit 15, thereby switching the test pattern generation circuit 15 so as to output the test video data.

In response to this, in step 34, the test pattern generation circuit 15 outputs the test video data in sync with the clock signal containing no jitter outputted by the phase modulation circuit 19.

On the other hand, in step 35, the inspection information storage circuit 83 of the test apparatus 8 outputs the stored inspection information to the inspection result image generation circuit 82, while the inspection result image generation circuit 82 generates the inspection result image data.

Then, in step 36, the superimposition circuit 81 of the test apparatus 8 superimposes the inspection result image data generated by the inspection result image generation circuit 82 on the test video data outputted by the test pattern generation circuit 15, and then outputs the resulting signal to the data transmission circuit 18.

On the other hand, in step 37, the PLL circuit 39 of the display device 7 generates the timing signal in sync with the clock signal containing no jitter transmitted by the phase modulation circuit 19 of the test apparatus 8.

Then, the PLL circuit 39 outputs the generated timing signal to the data reception circuit 38.

In response to this, in step 38, the data reception circuit 38 of the display device 7 captures the test video data superimposing the inspection result image data, in sync with the timing signal outputted by the PLL circuit 39. The test video data superimposing the inspection result image data is transmitted to the data reception circuit 38 by the data transmission circuit 18 of the test apparatus 8.

Then, the data reception circuit 38 outputs the test video data superimposing the inspection result image data to the display unit 31 as the received data.

In response to this, in step 39, the display unit 31 of the display device 7 displays the test video data on which the inspection result image data is superimposed. This display example is the same as that in FIG. 13(*a*) and FIG. 14.

As described above, the following holds true for the display device 7 according to this embodiment.

That is, in this embodiment, the inspection circuit 35 is provided inside the display device 7 of FIG. 16. Thus, inside the display device 7, the data reception related circuit 34 is inspected and the inspection information (the data error rate and the lock loss signal) is generated.

Then, the control signal transmission circuit 33 transmits the inspection information (the data error rate and the presence or absence of loss of lock) to the test apparatus 8, and the inspection result image generation circuit 82 of the test apparatus 8 generates the inspection result image data.

The test apparatus 8 then transmits the test video data superimposing the inspection result image data to the display device 7, allowing the display unit 31 of the display device 7 to display it.

As a result, this makes it possible to carry out inspection after assembly of the display device 7 without disassembling the display device 7. This in turn makes it possible to carry out the test in a simple manner on the data reception related circuit 34 inside the display device 7 without changing the noise environment inside the display device 7.

Furthermore, since the inspection result image data is generated in the test apparatus 8, it is not necessary to provide a circuit for generating the inspection result image data inside the display device 7 to be tested. This alleviates the level of complication of the display device 7 when compared with Embodiment 1.

Additionally, by transmitting the test video data superimposing the inspection result image data to the display device 7 from the test apparatus 8 external thereto, it is possible to check the inspection result of the data reception related circuit 34 at the display unit 31 of the display device 7 and visually inspect the test video data as well.

Furthermore, the inspection result image data is generated externally and then the data reception circuit 38 that receives the video data in the normal mode receives the test video data superimposing the inspection result image data to output the data to the display unit 31.

This makes it possible to share the component for which the data reception circuit 38 outputs the video data in the normal mode to the display unit 31 and the component for which the data reception circuit 38 outputs the test video data superimposing the inspection result image data to the display unit 31.

This eliminates the need for providing an additional component used for only outputting the test video data superimposing the inspection result image data from the data reception circuit 38 to the display unit 31. This in turn makes it possible to avoid disadvantages such as an increase in packaging area and a loss in component compatibility (loss in pin compatibility with other LSIs).

Furthermore, the control signal reception circuit 32 of the display device 7 receives the test related control signal. Additionally, the control signal reception circuit 32 can receive and process the external signal other than the test related control signal via the component 8 for receiving the test related control signal.

This makes it possible for the display device 7 to change to the normal mode by transmitting to the control signal reception circuit 32 the external control signal for instructing it to return to the normal mode.

On the other hand, the display device 7 can proceed to the test mode by only transmitting the control signal for instructing the commencement of the test to the control signal reception circuit 32 from the test apparatus 8 external thereto.

That is, the modes can be switched only with the control signal outside the display device 7.

As a result, this makes it possible to carry out the test on the data reception related circuit 34 inside the display device 7 in a simple manner.

Additionally, since the control signal reception circuit 32 can receive and process the external signal other than the test related control signal, the control signal reception circuit 32 can receive and process the control signal transmitted by the video data transmitter 6 external thereto.

This makes it possible for the external video data transmitter 6 to transmit signals as required to the control signal reception circuit 32 in the normal mode.

As described above, the present invention provides the control signal reception circuit 32 that can operate not only in the test mode but also in the normal mode.

Furthermore, when receiving the external control signal, the control signal reception circuit 32 uses the common component 8 in either the test mode or the normal mode.

On the other hand, the control signal transmission circuit 33 can transmit the control signal other than the test related control signal via the component 9 for transmitting the test related control signal to the outside. This makes it possible to transmit signals to the external video data transmitter 6.

This in turn makes it possible for the control signal transmission circuit 33 to transmit signals as required to the external video data transmitter 6 after it proceeds to the normal mode.

As described above, the present invention provides the control signal transmission circuit 33 that can operate not only in the test mode but also in the normal mode.

Furthermore, when transmitting the control signal to the outside, the control signal transmission circuit 33 uses the common component 9 in either the test mode or the normal mode.

This eliminates the need for providing the display device 7 with an additional component for only use in input or output of the test related control signal, or for only transmitting or receiving the test related control signal, thereby making it possible to avoid disadvantages such as an increase in packaging area and a loss in component compatibility (loss in pin compatibility with other LSIs).

As described above, the control signal transmission circuit 33 and the control signal reception circuit 32 are provided, thereby eliminating the need for providing the display device 7, on its exterior, with an additional dedicated terminal for the output of the inspection information or an additional dedicated terminal for the input of the inspection result image data.

On the other hand, the data reception circuit 38 of the display device 7 receives the video data in the normal mode, while receiving the PN pattern as the test signal in the test mode.

Then, in the test mode, the error information generation circuit 40 of the display device 7 generates the data error rate of the PN pattern received by the data reception circuit 38.

The control signal transmission circuit 33 inside the display device 7 then transmits the information indicating the data error rate generated by the error information generation circuit 40 to the outside as the inspection information.

As a result, this makes it possible to carry out inspection after assembly of the display device 7 without disassembling the display device 7. This in turn makes it possible to carry out the test (the measurement of the data error rate) in a simple manner on the data reception circuit 38 inside the display device 7 without changing the noise environment inside the display device 7.

On the other hand, the PLL circuit 39 of the display device 7 receives the clock signal in the normal mode, while receiving the clock signal containing the jitter as the test signal, generating the timing signal in sync therewith.

Then, in the test mode, the malfunction information generation circuit 41 generates the lock loss signal when the PLL circuit 39 locking is lost.

Then, the control signal transmission circuit 33 transmits the information indicating the presence or absence of the loss of lock of the PLL circuit 39 as the inspection information to the outside.

As a result, this makes it possible to carry out inspection after assembly of the display device 7 without disassembling the display device 7. This in turn makes it possible to carry out the test (the detection of the presence or absence of the lock loss signal) in a simple manner on the PLL circuit 39 inside the display device 7 without changing the noise environment inside the display device 7.

Since both the PLL circuit 39 and the data reception circuit 38 are inspected, it can be determined whether the malfunction of the display device 7 is caused by either the PLL circuit 39 or other transmission degradation factors. This makes it possible to specifically identify the cause of the malfunction of the display device 7.

On the other hand, the data reception circuit 38 of the display device 7 receives the video data in sync with the timing signal based on the clock signal in the normal mode, while receiving the PN pattern in the test mode in sync with the timing signal based on the clock signal containing the jitter.

The error information generation circuit 40 of the display device 7 determines the data error rate of the PN pattern received in sync with the timing signal in this manner, thereby making it possible to provide the findings on the effects of the jitter.

On the other hand, in this embodiment, the inspection circuit 35 inspects the data reception related circuit 34 to generate the inspection information, and the image data (the inspection result image data) indicating the inspection information is displayed on the display unit 31.

As a result, this makes it possible to provide more precise objective inspection results when compared with the case of carrying out visual inspection by only human eyesight.

As described above, the following holds true for the test apparatus 8 according to this embodiment.

That is, in this embodiment, the control signal transmission circuit 13 of the test apparatus 8 receives the command from the control circuit 12 and then transmits the control signal for instructing the commencement of the test to the display device 7.

In such a manner, the display device 7 for receiving the test signal can be made ready for the test in a simple manner by only transmitting the control signal to the display device 7.

Furthermore, since the inspection result image data is generated in the test apparatus 8, it is not necessary to provide a circuit for generating the inspection result image data inside the display device 7 to be tested. This alleviates the level of complication of the display device 7.

Furthermore, the superimposition circuit 81 of the test apparatus 8 superimposes the inspection result image data on the test video data and then outputs the resulting data to the data transmission circuit 18.

Thus, the data transmission circuit 18 of the test apparatus 8 transmits the test video data superimposing the inspection result image data to the display device 7.

This makes it possible in the display device 7 to check the inspection result of the display device 7 and carry out visual inspection for the test video data.

On the other hand, the test apparatus 8 is provided with the control circuit 12. As in Embodiment 1, this alleviates the time and manpower for setting the test condition that has been conventionally set manually.

The test pattern generation circuit 15 of the test apparatus 8 generates the PN pattern as the test signal. The PN pattern is then transmitted to the display device 7.

This makes it possible in the display device 7 to determine the data error rate of the PN pattern received by the data reception circuit 38.

Additionally, the phase modulation circuit 19 of the test apparatus 8 superimposes the jitter signal clk2 on the clock signal clk1 to generate the clock signal clk3 containing the jitter, and then transmits the clock signal clk3 containing the jitter as the test signal to the PLL circuit 39 of the display device 7.

This makes it possible to know the effects of the jitter on the PLL circuit 39 in the display device 7 by detecting the lock loss signal of the PLL circuit 39.

The test pattern generation circuit 15 of the test apparatus 8 outputs the PN pattern to the data transmission circuit 18 in sync with the clock signal containing the jitter generated by the phase modulation circuit 19.

This makes it possible in the display device 7 to know the effects of the jitter on the data error rate of the PN pattern received by the data reception circuit 38.

The test apparatus 8 transmits the test signal (the PN pattern, the test video data, and the clock signal clk3 containing jitter) to the display device 7 via the cable 5.

This makes it possible to provide findings on the effects of the cable in the inspection of the data reception related circuit 34 (the data reception circuit 38 and the PLL circuit 39) of the display device 7.

The test can also be carried out with the test apparatus 8 being connected not via the cable 5 but directly to the display device 7.

Additionally, when there is no need for visual inspection of the test video data, the test video data generation circuit 153 of FIG. 3 can be eliminated.

In this case, the superimposition circuit 81 of FIG. 16 is replaced with a switching circuit. With this configuration, when the control circuit 12 commands the switching circuit to display the inspection result image data on the display device 7, the data transmission circuit 18 outputs the inspection result image data, whereas the PN pattern is outputted to the data transmission circuit 18 when the inspection is carried out for the data reception related circuit 34 of the display device 7.

Finally, the difference between the method for measuring PLL jitter and an integrated circuit disclosed in Japanese Patent No. 2950370 and the present invention will be briefly mentioned below.

In that literature, such a technique is disclosed which enables jitter information of the PLL circuit to output to the outside the integrated circuit with no damage to the integrated circuit.

The technique of the literature aiming not to damage the integrated circuit is significantly different from the present invention in that the object of the present invention is to inspect the display device without having to disassemble the display device and without changing the noise environment thereof.

Additionally, the technique of the literature is to connect a known IC tester to the test input pins and output pins of the integrated circuit to measure the jitter of the PLL circuit. Accordingly, in consideration of the integrated circuit being built in the display device, the display device must be disassembled to inspect the integrated circuit, thereby making it impossible to address the object of the present invention.

Furthermore, the technique of the literature is limited to jitter information, and never refers to the data error rate and the lock loss signal of the PLL circuit.

Still furthermore, the literature does not disclose any specific means for outputting signals to outside the integrated circuit, such as the display switching circuit 36 according to this embodiment.

As described above, the literature includes nothing that suggests the present invention.

Embodiment 3

Figure 20:
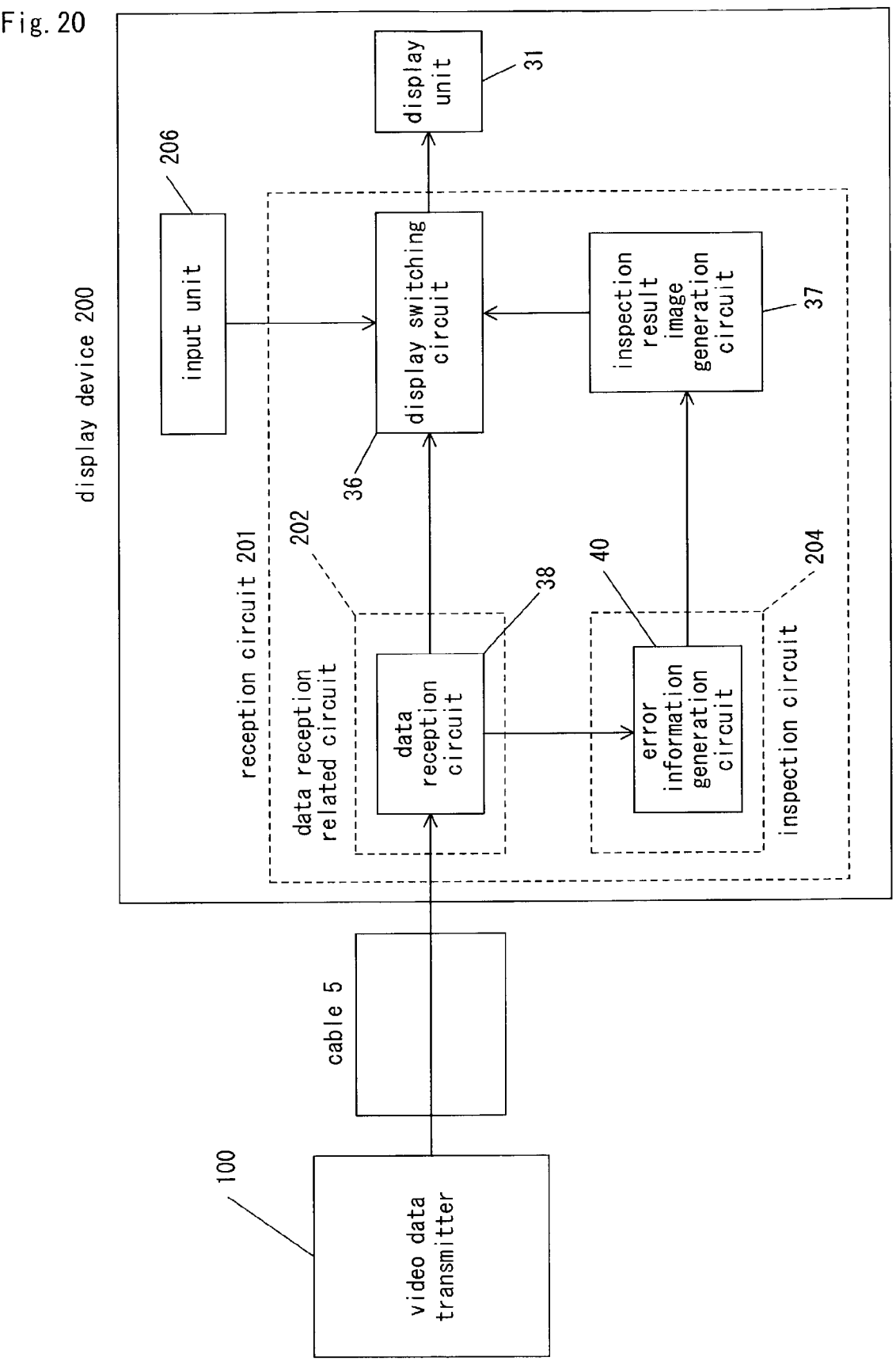
FIG. 20 is a block diagram illustrating an exemplary video data transmitter and an exemplary display device according to Embodiment 3 of the present invention.

FIG. 20 is a block diagram illustrating a video data transmitter and a display device according to Embodiment 3 of the present invention. In FIG. 20, the same components as those of FIG. 1 are indicated with the same reference numerals.

As shown in FIG. 20, the video data transmitter 100 is connected to the display device 200 via a cable 5.

The display device 200 comprises a reception circuit 201, an input unit 206, and a display unit 31.

The reception circuit 201 includes a data reception related circuit 202, an inspection circuit 204, a display switching circuit 36, and an inspection result image generation circuit 37.

The data reception related circuit 202 includes a data reception circuit 38. The inspection circuit 204 includes an error information generation circuit 40.

First, the video data transmitter 100 is described below. The video data transmitter 100 transmits video data such as movies to the display device 200 via the cable 5 when the display device 200 is in the normal mode.

The video data transmitter 100 is the same as the video data transmitter 6 of FIG. 2 and, for example, incorporated into a personal computer, a set top box (STB), a DVD (Digital Video Disc) player or the like.

On the other hand, the video data transmitter 100 transmits a test signal to the display device 200 via the cable 5 when the display device 200 is in the test mode.

For example, the test signal includes test video data or a PN pattern. For example, the test video data includes test image data or a color pattern or both the test image data and the color pattern. For example, the test image data includes test moving image data or test static image data.

The test image data is an image produced by photographing an object while the color pattern is a patterned image.

The state in which the display device 200 is ready for a test or carrying out the test is called hereafter the "test mode".

Suppose that the video data transmitter 100 is able to read video data stored on a storage medium. When the display device 200 is in the test mode, the video data transmitter 100 is allowed to read out the test signal by setting thereto a storage medium having the test signal recorded thereon, and then transmits the test signal to the display device 200.

For example, suppose that the video data transmitter 100 is the DVD player. In this case, when the display device 200 is in the test mode, the video data transmitter 100 is allowed to read out the test signal by setting thereto a DVD having the test signal recorded thereon, and then transmits the test signal to the display device 200.

On the other hand, suppose that the video data transmitter 100 is provided with a storage device having the test signal recorded therein. In this case, when the display device 200 is in the test mode, the video data transmitter 100 is allowed to read out the test signal from the storage device and then transmits it to the display device 200.

For example, suppose that the video data transmitter 100 is the set top box equipped with a ROM (Read Only Memory) having the test signal recorded thereon. In this case, when the display device 200 is in the test mode, the video data transmitter 100 is allowed to read out the test signal from the ROM and then transmits the signal to the display device 200.

It is also possible to provide the storage device having test signals recorded therein even when the video data transmitter 100 is capable of reading out the video data stored on the storage medium.

Now, the input unit 206 of the display device 200 is described below. The input unit 206 instructs the display switching circuit 36 to move into the test mode or move out of the test mode.

When the input unit 206 instructs the display switching circuit 36 to move into the test mode, the display device 200 is placed in the test mode.

On the other hand, when the input unit 206 instructs the display switching circuit 36 to move out of the test mode, the display device 200 is switched from the test mode into the normal mode.

For example, the input unit 206 includes an interface with the outside such as a button, a switch, a sensor for receiving a signal from an infrared remote controller, or a terminal other than a terminal for inputting the video data. Via this interface, the input unit 206 receives an instruction (to move into or out of the test mode) from the outside.

As the interface with the outside included in the input unit 206, it is not always necessary to provide a dedicated interface used for only placing the display device 200 in the test mode. It is possible to use an interface (e.g., a button, a switch, a sensor for receiving a signal from an infrared remote controller, or a terminal other than a terminal for inputting the video data) that can be used in the normal mode.

For example, it is also possible to place the display device 200 in the test mode by pressing a plurality of buttons simultaneously that are used in the normal mode, by pressing the button used in the normal mode for more than a certain period of time, or by pressing a plurality of buttons used in the normal mode in a certain order.

In the normal mode, the reception circuit 201 receives the video data transmitted by the video data transmitter 100 and then outputs the data to the display unit 31.

On the other hand, in the test mode, the reception circuit 201 receives the test signal transmitted by the video data transmitter 100.

More specifically, the reception circuit 201, configured as mentioned above with reference to FIG. 20, is described in detail as below.

First, the data reception related circuit 202 of the display device 200 is described below. In the test mode, the data reception related circuit 202 receives the test signal transmitted by the video data transmitter 100.

On the other hand, in the normal mode, the data reception related circuit 202 receives the video data transmitted by the video data transmitter 100.

Now, the inspection circuit 204 of the display device 200 is described below. In the test mode, the inspection circuit 204 inspects the data reception related circuit 202 to generate inspection information and then outputs the information to the inspection result image generation circuit 37.

Next, the inspection result image generation circuit 37 of the display device 200 is described below. In the test mode, the inspection result image generation circuit 37 receives the inspection information generated by the inspection circuit 204.

Then, the inspection result image generation circuit 37 generates image data indicating the inspection information received.

The image data indicating the inspection information may hereinafter be referred to as "inspection result image data". On the other hand, an image indicating the inspection information may hereinafter be referred to as "inspection result image".

Now, the display switching circuit 36 of the display device 200 is described below. In the normal mode, the display switching circuit 36 outputs the video data received by the data reception related circuit 202 to the display unit 31.

On the other hand, in the test mode, the display switching circuit 36 superimposes the inspection result image data generated by the inspection result image generation circuit 37 on the test signal received by the data reception related circuit 202 and then outputs the resulting signal to the display unit 31.

The display switching circuit 36 provides different operations between the normal mode (without the superimposition) and test mode (with the superimposition). The switching between the operations is performed in accordance with the instructions from the input unit 206.

That is, after the input unit 206 has instructed the display switching circuit 36 to move into the test mode, the display switching circuit 36 superimposes the inspection result image data generated by the inspection result image generation circuit 37 on the test signal received by the data reception related circuit 202 and then outputs the resulting signal to the display unit 31.

On the other hand, after the input unit 206 has instructed the display switching circuit 36 to move out of the test mode, the display switching circuit 36 outputs the video data received by the data reception related circuit 202 to the display unit 31.

Now, the data reception related circuit 202 is described below in detail. In the test mode, the data reception circuit 38 of the data reception related circuit 202 receives the test signal transmitted by the video data transmitter 100.

Then, the data reception circuit 38 outputs the received test signal to the display switching circuit 36 and the error information generation circuit 40 of the inspection circuit 204.

On the other hand, in the normal mode, the data reception circuit 38 receives the video data transmitted by the video data transmitter 100 and then outputs the data to the display switching circuit 36.

Now, the inspection circuit 204 of FIG. 20 is described below in detail. In the test mode, the error information generation circuit 40 of the investigation circuit 204 generates data error information on the test signal received by the data reception circuit 38 and then outputs the data error information as the inspection information to the inspection result image generation circuit 37.

For example, the error information generation circuit 40 generates a "data error rate (bit error rate)" as the data error information.

In this case, it is possible to use the error information generation circuit 40 of FIG. 7 as the error information generation circuit 40 of the inspection circuit 204, while the data reception circuit 38 of FIG. 7 can be used as the data reception circuit 38 of the data reception related circuit 202.

It is also possible to use the error information generation circuit 40 of FIG. 8 as the error information generation circuit 40 of the inspection circuit 204, while the data reception circuit 38 of FIG. 8 can be used as the data reception circuit 38 of the data reception related circuit 202.

The reception circuit 201 of FIG. 20 described above can be configured as an integrated circuit (LSI).

The term "component" may be used below. For the reception circuit 201 being configured as the LSI, this "component" means a signal input/output "pin" of the LSI. As a matter of course, even in the case of the reception circuit 201 being configured as the LSI, the "component" includes other known terminals.

Now, the display unit 31 of the display device 200 of FIG. 20 is described below. In the normal mode, the display unit 31 displays the video data outputted by the display switching circuit 36.

On the other hand, in the test mode, the display unit 31 displays image data generated by superimposing the inspection result image data on the test signal. The image data is outputted to the display unit 31 by the display switching circuit 36 in the test mode.

Now, the entire test flow according to this embodiment is described below with reference to FIG. 20 and the flowcharts.

Figure 21:
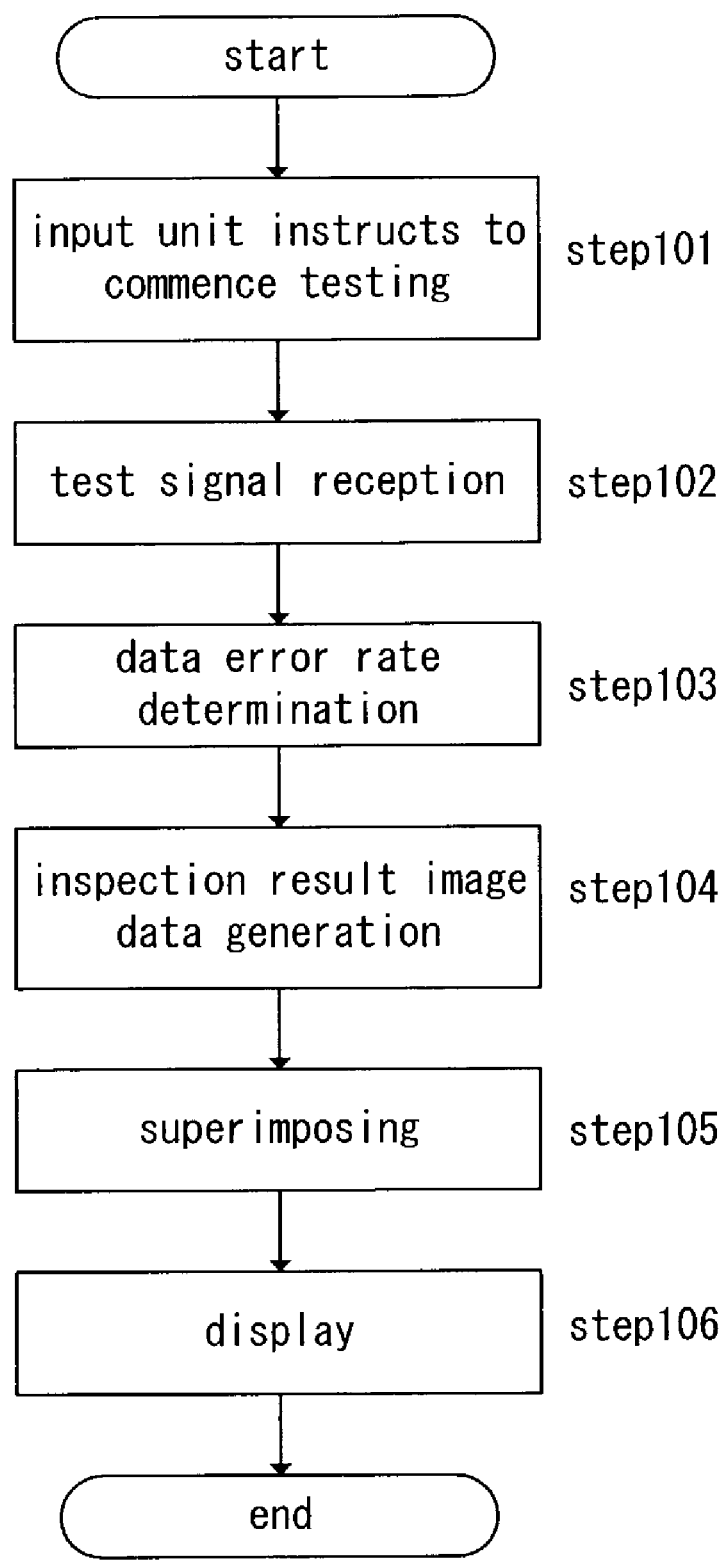
FIG. 21 is a flowchart illustrating the display device in a test mode according to Embodiment 3 of the present invention.

FIG. 21 is a flowchart for use with the display device 200 in the test mode according to this embodiment.

As shown in FIG. 21, first, in step 101, the input unit 206 instructs the display switching circuit 36 to commence testing.

In other words, the input unit 206 instructs the display switching circuit 36 to move into the test mode.

This causes the display device 200 to be placed in the test mode.

In step 102, the data reception circuit 38 receives the test signal (the test video data and the PN pattern) from the video data transmitter 100.

Then, the data reception circuit 38 outputs the received test signal as received data to the display switching circuit 36 and the error information generation circuit 40.

In response to this, in step 103, the error information generation circuit 40 determines the data error rate of the received data and then outputs the resulting signal as the inspection information to the inspection result image generation circuit 37.

In step 104, the inspection result image generation circuit 37 generates the image data (the inspection result image data) indicating the inspection information (the data error rate) and then outputs the data to the display switching circuit 36.

In step 105, the display switching circuit 36 superimposes the inspection result image data outputted by the inspection result image generation circuit 37 on the received data outputted by the data reception circuit 38 and then outputs the resulting data to the display unit 31.

In step 106, the display unit 31 displays the received data superimposing the inspection result image data.

Now, an example of the display is shown below.

Figure 22:
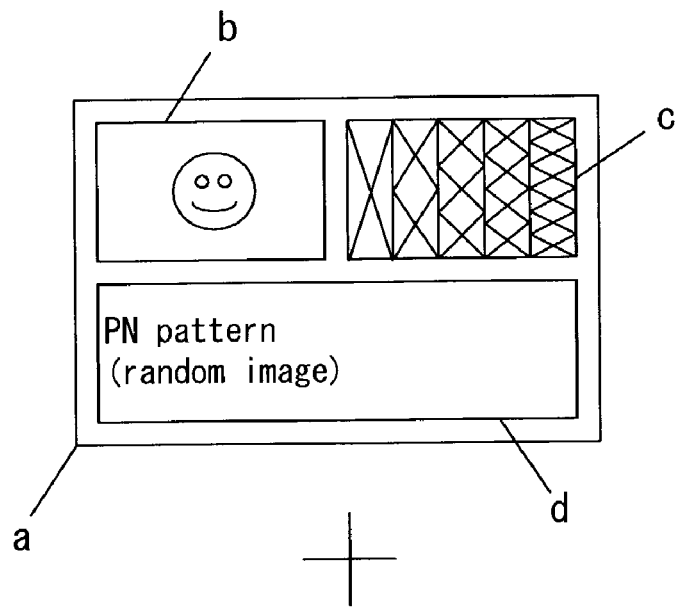
FIG. 22(a) is an exemplary view illustrating a test signal received in the test mode by a data reception circuit.
FIG. 22(b) is an exemplary view illustrating inspection result image data generated in the test mode by an inspection result image generation circuit.
FIG. 22(c) is an exemplary view illustrating image data to be displayed in the test mode by a display unit.
Figure 22:
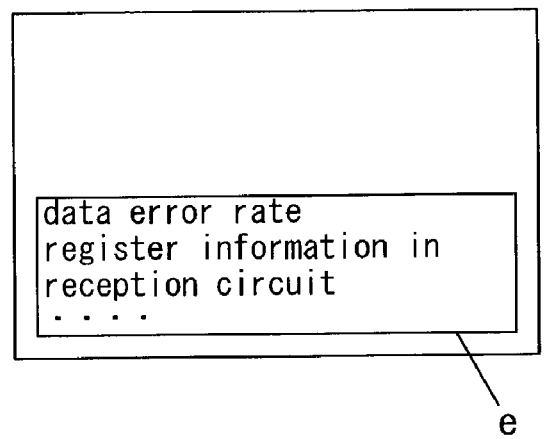
Figure 22:
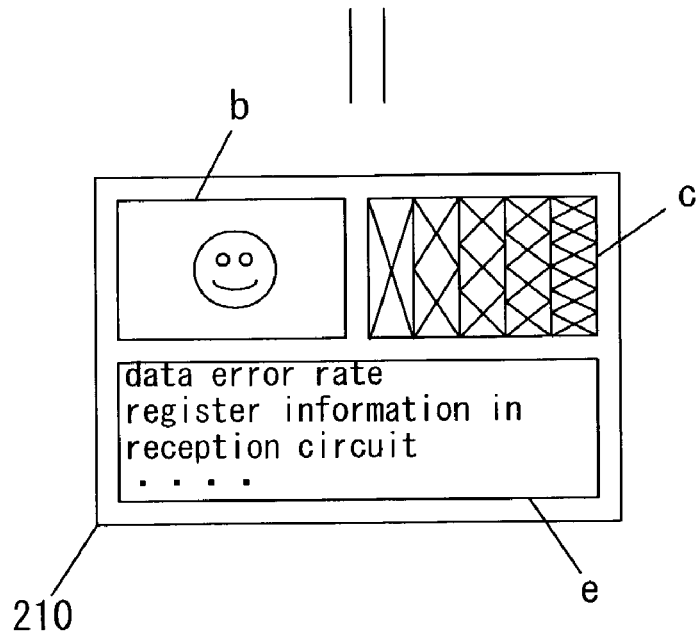
Figure 23:
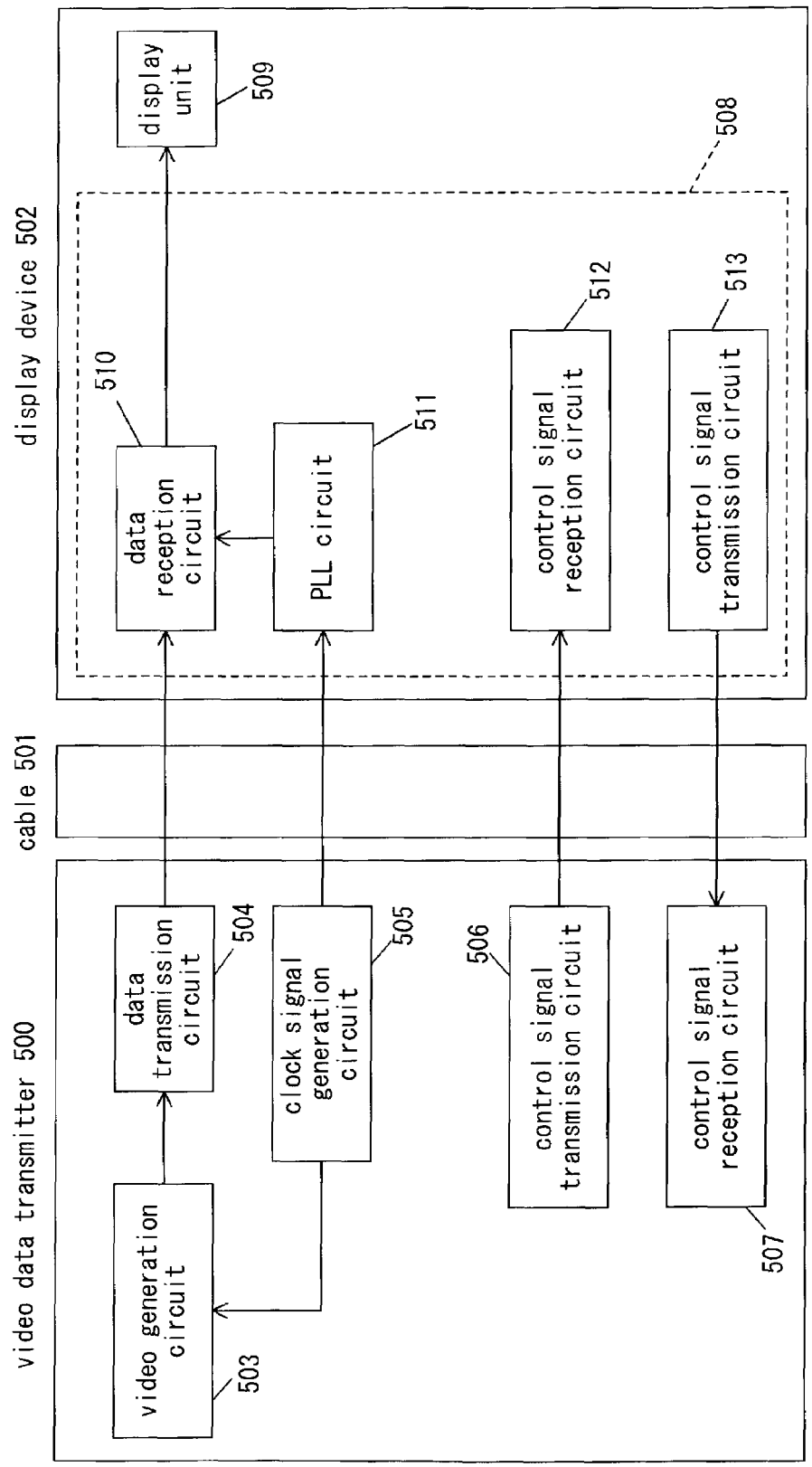
FIG. 23 is a block diagram illustrating a prior-art digital video data transmit/receive system.

FIG. 22(*a*) is an exemplary view illustrating the test signal received in the test mode by the data reception circuit 38.

FIG. 22(*b*) is an exemplary view illustrating the inspection result image data generated in the test mode by the inspection result image generation circuit 37.

FIG. 22(*c*) is an exemplary view illustrating the image data to be displayed in the test mode on the display unit 31.

Suppose that the data reception circuit 38 has received the test signal "a" of FIG. 22 from the video data transmitter 100 in the test mode.

The test signal "a" is comprised of the test moving image data "b", the color pattern "c", and the PN pattern (random image) "d". The test moving image data "b" and the color pattern "c" constitute the test video data.

The test signal "a" received by the data reception circuit 38 is outputted to the display switching circuit 36 and the error information generation circuit 40.

Such the test signal "a" is stored on the storage medium to be set in the video data transmitter 100 or in the storage device provided in the video data transmitter 100.

As shown in FIG. 22(*b*), the inspection result image generation circuit 37 generates the image data "e" indicating the data error rate of the PN pattern "d". The error information generation circuit 40 generates the data error rate of the PN pattern "d".

The image data "e" indicating the data error rate generated by the inspection result image generation circuit 37 is outputted to the display switching circuit 36.

Then, the display switching circuit 36 superimposes the inspection result image data "e" on the PN pattern "d" of the test signal "a" inputted from the data reception circuit 38.

The display switching circuit 36 outputs the image data superimposing the inspection result image data "e" on the PN pattern "d" of the test signal "a" to the display unit 31.

As shown in FIG. 22(*c*), the display unit 31 then displays, on a screen 210 of the display unit 31, the image data generated by superimposing the inspection result image data "e" on the PN pattern "d" of the test signal "a", or the image data formed of the test moving image data "b", the color pattern "c", and the inspection result image data "e".

In the test mode, the display switching circuit 36 can also output any one of the test signal "a" and the inspection result image data "e" to the display unit 31 in accordance with the instructions from the input unit 206.

Alternatively, in the test mode, in accordance with the instructions from the input unit 206, the display switching circuit 36 can also output any one piece of data selected from the group of the test moving image data "b", the color pattern "c", and the inspection result image data "e" to the display unit 31.

Alternatively, in the test mode, in accordance with the instructions from the input unit 206, the display switching circuit 36 can also output any two pieces of data selected from the group of the test moving image data "b", the color pattern "c", and the inspection result image data "e" to the display unit 31.

In the example shown in FIG. 22(*a*), the test signal "a" includes the test moving image data "b". However, the test signal "a" may be formed of the color pattern "c" and the PN pattern "d".

In the example shown in FIG. 22(*a*), the test signal "a" includes the color pattern "c". However, the test signal "a" may be formed of the test moving image data "b" and the PN pattern "d".[0670]

In the example shown in FIG. 22(*a*), the test moving image data "b" is employed as the test signal "a". However, the test static image data may also be employed.

The operations of the test mode have been described. Now, with reference to FIG. 20, the operations in the normal mode will be briefly described below.

In the normal mode, the video data transmitter 100 transmits the video data such as the movies to the display device 200 via the cable 5.

The data reception circuit 38 of the display device 200 receives the video data from the video data transmitter 100 and then provides the video data to the display switching circuit 36.

In the normal mode, the display switching circuit 36 supplies the video data inputted from the data reception circuit 38 to the display unit 31.

Then, the display unit 31 displays the video data inputted from the display switching circuit 36.

As described above, the following holds true for the display device 200 according to this embodiment.

That is, in this embodiment, the inspection circuit 204 is provided inside the display device 200 of FIG. 20. Thus, inside the display device 200, the data reception related circuit 202 is inspected and the inspection information (the data error rate) is generated.

Then, the inspection result image generation circuit 37 generates the image data (the inspection result image data) indicating the inspection information and the inspection result image data is displayed on the display unit 31 provided with the display device 200 (FIG. 22(*c*)).

As a result, this makes it possible to carry out inspection after assembly of the display device 200 without disassembling the display device 200. This in turn makes it possible to carry out test in a simple manner on the data reception related circuit 202 inside the display device 200 without changing the noise environment inside the display device 200.

Furthermore, since the inspection result image data is displayed in the display unit 31 provided with the display device 200, it is not necessary to provide a terminal for outputting the inspection result image data outside the display device 200.

Additionally, in the test mode, the display switching circuit 36 of the display device 200 superimposes the inspection result image data generated by the inspection result image generation circuit 37 on the test signal inputted from the data reception circuit 38 and then outputs the resulting signal to the display unit 31.

This makes it possible to check the inspection result of the data reception related circuit 202 at the display unit 31 of the display device 200 and visually inspect the test video data as well (FIG. 22(c)).

Furthermore, depending on the mode, the display switching circuit 36 outputs any one of the video data or the test signal superimposing the inspection result image data to the display unit 31. This makes it possible to share a component for outputting the video data to the display unit 31 and a component for outputting the test signal superimposing the inspection result image data to the display unit 31.

This eliminates the need for providing an additional component used for only outputting the test signal superimposing the inspection result image data from the display switching circuit 36 to the display unit 31. This in turn makes it possible to avoid disadvantages such as an increase in packaging area and a loss in component compatibility (loss in pin compatibility with other LSIs).

On the other hand, in this embodiment, the inspection circuit 204 inspects the data reception related circuit 202 to generate the inspection information and then the image data (the inspection result image data) indicating the inspection information is displayed on the display unit 31.

As a result, this makes it possible to provide more precise objective inspection results when compared with the case of carrying out visual inspection by only human eyesight.

In this embodiment, the test signal is also transmitted to the data reception related circuit 202 via the cable 5.

This makes it possible to provide findings on the effects of the cable in the inspection of the data reception related circuit 202.

In this embodiment, the display device 200 is provided with the input unit 206 for instructing a switchover between the modes.

Therefore, the input unit 206 provided in the display device 200 can instruct the display device 200 to move into the test mode.

This eliminates the need for preparing an additional test device (e.g., the test apparatus 1 of FIG. 1 and the test apparatus 8 of FIG. 16). Using the video data transmitter 100, which transmits the video data to the display device 200 in the normal mode, the display device 200 can be tested.

As a result, when compared with Embodiments 1 and 2, the display device 200 can be tested in a simpler manner.

In this embodiment, the input unit 206 can instruct a switchover between the modes using the interface with the outside that is used in the normal mode.

This eliminates the need for providing the input unit 206 with a dedicated interface with the outside for instructing the switchover between the modes.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A display device comprising:
    a data reception related unit operable to receive video data in a normal mode and to receive a test signal in a test mode;
    an inspection unit operable to inspect said data reception related unit and to generate inspection information in the test mode;
    an inspection result image generation unit operable to generate image data indicating the inspection information; and
    a display unit operable to display the image data generated by said inspection result image generation unit in the test mode and to display the video data in the normal mode.

2. The display device according to claim 1, further comprising:
    a control signal reception unit operable to receive and process an external signal other than a test related signal via a component operable to receive the test related signal,
    wherein said display device is operable to operate in the test mode after said control signal reception unit receives a control signal for instructing a commencement of a test as the test related signal.

3. The display device according to claim 2, further comprising a control signal transmission unit operable to transmit to the outside of said display device, a signal other than a test related signal via a component operable to transmit the test related signal.

4. The display device according to claim 2, further comprising:
    a display switching unit operable to receive the video data from said data reception related unit in the normal mode to output the video data to said display unit,
    wherein in the test mode, said display switching unit is operable to receive the image data generated by said inspection result image generation unit to output the image data to said display unit, in accordance with a control signal that is received by said control signal reception unit for instructing a display switchover, and,
    wherein said display switching unit is operable to receive test video data as the test signal to output the test video data to said display unit.

5. The display device according to claim 1, further comprising a display switching unit operable to receive the video data from said data reception related unit in the normal mode to output the video data to said display unit and to receive the image data generated by said inspection result image generation unit in the test mode to output the image data to said display unit.

6. The display device according to claim 5, wherein in the test mode, said display switching unit is operable to superimpose the image data generated by said inspection result image generation unit onto the test signal inputted by said data reception related unit to thereby produce a signal, and is operable to subsequently output the signal to said display unit.

7. The display device according to claim 6,
wherein said data reception related unit includes a data reception unit operable to receive the video data in the normal mode and to receive a test pattern as the test signal in the test mode,
wherein said inspection unit includes an error information generation unit operable to generate error information on the test pattern received by said data reception unit in the test mode, and
wherein said inspection result image generation unit is operable to generate image data indicating the error information generated by said error information generation unit.

8. The display device according to claim 7,
wherein said data reception related unit further includes a phase locked loop unit operable to generate a timing signal in sync with a received clock signal in the normal mode, and to receive a clock signal containing jitter as the test signal in the test mode to generate a timing signal in sync with the received clock signal,
wherein said inspection unit further includes a malfunction information generation unit operable to generate malfunction information on said phase locked loop unit in the test mode, and
wherein said inspection result image generation unit is operable to generate image data indicating the malfunction information generated by said malfunction information generation unit.

9. The display device according to claim 6,
wherein said data reception related unit includes a phase locked loop unit operable to generate a timing signal in sync with a received clock signal in the normal mode, and to receive a clock signal containing jitter as the test signal in the test mode to generate a timing signal in sync with the received clock signal,
wherein said inspection unit includes a malfunction information generation unit operable to generate malfunction information on said phase locked loop unit in the test mode, and
wherein said inspection result image generation unit is operable to generate image data indicating the malfunction information generated by said malfunction information generation unit.

10. The display device according to claim 9,
wherein said data reception related unit further includes a data reception unit operable to receive the video data in sync with the timing signal based on the clock signal in the normal mode, and to receive a test pattern as the test signal in sync with the timing signal based on the clock signal containing the jitter in the test mode, and
wherein said inspection unit further includes an error information generation unit operable to generate, as the inspection information, error information on the test pattern received by said data reception unit.

11. The display device according to claim 6, further comprising an input unit operable to instruct a switchover between modes.

12. The display device according to claim 11, wherein said input unit is operable to instruct the switchover between the modes by utilizing an interface with the outside of said display device, the interface being used in the normal mode.

13. The display device according to claim 1,
wherein said data reception related unit includes a data reception unit operable to receive the video data in the normal mode and to receive a test pattern as the test signal in the test mode,
wherein said inspection unit includes an error information generation unit operable to generate error information on the test pattern received by said data reception unit in the test mode, and
wherein said inspection result image generation unit is operable to generate image data indicating the error information generated by said error information generation unit.

14. The display device according to claim 13,
wherein said data reception related unit further includes a phase locked loop unit operable to generate a timing signal in sync with a received clock signal in the normal mode, and to receive a clock signal containing jitter as the test signal in the test mode to generate a timing signal in sync with the received clock signal,
wherein said inspection unit further includes a malfunction information generation unit operable to generate malfunction information on said phase locked loop unit in the test mode, and
wherein said inspection result image generation unit is operable to generate image data indicating the malfunction information generated by said malfunction information generation unit.

15. The display device according to claim 1,
wherein said data reception related unit includes a phase locked loop unit operable to generate a timing signal in sync with a received clock signal in the normal mode, and operable to receive a clock signal containing jitter as the test signal in the test mode to generate a timing signal in sync with the received clock signal,
wherein said inspection unit includes a malfunction information generation unit operable to generate malfunction information on said phase locked loop unit in the test mode, and
wherein said inspection result image generation unit is operable to generate image data indicating the malfunction information generated by said malfunction information generation unit.

16. The display device according to claim 15,
wherein said data reception related unit further includes a data reception unit operable to receive the video data in sync with the timing signal based on the clock signal in the normal mode, and to receive a test pattern as the test signal in sync with the timing signal based on the clock signal containing the jitter in the test mode, and
wherein said inspection unit further includes an error information generation unit operable to generate, as the inspection information, error information on the test pattern received by said data reception unit.

17. The display device according to claim 1, further comprising a cable in communication with said data reception related unit,
wherein the test signal is transmitted via said cable to said data reception related unit.

18. The display device according to claim 1, further comprising an input unit operable to instruct a switchover between modes.

19. The display device according to claim 18, wherein said input unit is operable to instruct the switchover between the modes by utilizing an interface with the outside of said display device, the interface being used in the normal mode.

20. A display device comprising:
a data reception related unit operable to receive video data in a normal mode and to receive a test signal in a test mode;
an inspection unit operable to inspect said data reception related unit to generate inspection information in the test mode;
a transmission unit operable to transmit the inspection information to the outside of said display device; and
a display unit operable to display the video data in the normal mode,
wherein said data reception related unit is operable to receive external image data indicating the inspection information from the outside of said display device in the test mode, and
wherein said display unit is operable to display the image data indicating the inspection information in the test mode.

21. The display device according to claim 20, further comprising:
a control signal reception unit operable to receive and process an external signal other than a test related signal via a component operable to receive the test related signal,
wherein said display device is operable to operate in the test mode after said control signal reception unit receives a control signal for instructing a commencement of a test as the test related signal,
wherein said transmission unit is a control signal transmission unit operable to transmit a test related signal to the outside of said display device, and
wherein said transmission unit is operable to transmit a signal other than the test related signal outside of said display device via a component operable to transmit the test related signal to the outside of said display device.

22. The display device according to claim 20, wherein in the test mode, said data reception related unit is operable to receive external image data generated by a superimposition of the image data indicating the inspection information on the test signal and is operable to subsequently output the received image data to said display unit.

23. The display device according to claim 22,
wherein said data reception related unit includes a data reception unit operable to receive the video data in the normal mode and to receive a test pattern as the test signal in the test mode,
wherein said inspection unit includes an error information generation unit operable to generate error information on the test pattern received by said data reception unit in the test mode, and
wherein said transmission unit is operable to transmit the error information generated by said error information generation unit as the inspection information to the outside of said display device.

24. The display device according to claim 23,
wherein said data reception related unit further includes a phase locked loop unit operable to generate a timing signal in sync with a received clock signal in the normal mode, and to receive a clock signal containing jitter as the test signal in the test mode to generate a timing signal in sync with the received clock signal,
wherein said inspection unit further includes a malfunction information generation unit operable to generate malfunction information on said phase locked loop unit in the test mode, and
wherein said transmission unit is further operable to transmit the malfunction information generated by said malfunction information generation unit as the inspection information to the outside of said display device.

25. The display device according to claim 22,
wherein said data reception related unit includes a phase locked loop unit is operable to generate a timing signal in sync with a received clock signal in the normal mode, and to receive a clock signal containing jitter as the test signal in the test mode to generate a timing signal in sync with the received clock signal,
wherein said inspection unit includes a malfunction information generation unit operable to generate malfunction information on said phase locked loop unit in the test mode, and
wherein said transmission unit is operable to transmit the malfunction information generated by said malfunction information generation unit as the inspection information to the outside of said display device.

26. The display device according to claim 25,
wherein said data reception related unit further includes a data reception unit operable to receive the video data in sync with the timing signal based on the clock signal in the normal mode, and to receive a test pattern as the test signal in sync with the timing signal based on the clock signal containing the jitter in the test mode, and
wherein said inspection unit further includes an error information generation unit operable to generate, as the inspection information, error information on the test pattern received by said data reception unit.

27. The display device according to claim 20,
wherein said data reception related unit includes a data reception unit operable to receive the video data in the normal mode and to receive a test pattern as the test signal in the test mode,
wherein said inspection unit includes an error information generation unit to generate error information on the test pattern received by said data reception unit in the test mode, and
wherein said transmission unit is operable to transmit the error information generated by said error information generation unit as the inspection information to the outside of said display device.

28. The display device according to claim 27,
wherein said data reception related unit includes a phase locked loop unit operable to generate a timing signal in sync with a received clock signal in the normal mode, and to receive a clock signal containing jitter as the test signal in the test mode to generate a timing signal in sync with the received clock signal,
wherein said inspection unit includes a malfunction information generation unit operable to generate malfunction information on said phase locked loop unit in the test mode, and
wherein said transmission unit is operable to transmit the malfunction information generated by said malfunction information generation unit as the inspection information to the outside of said display device.

29. The display device according to claim 20,
wherein said data reception related unit includes a phase locked loop unit operable to generate a timing signal in sync with a received clock signal in the normal mode, and to receive a clock signal containing jitter as the test signal in the test mode to generate a timing signal in sync with the received clock signal,
wherein said inspection unit includes a malfunction information generation unit operable to generate malfunction information on said phase locked loop unit in the test mode, and wherein said transmission unit is operable to transmit the malfunction information generated by said malfunction information generation unit as the inspection information to the outside of said display device.

30. The display device according to claim 29,
wherein said data reception related unit further includes a data reception unit operable to receive the video data in sync with the timing signal based on the clock signal in the normal mode, and to receive a test pattern as the test signal in sync with the timing signal based on the clock signal containing the jitter in the test mode, and
wherein said inspection unit further includes an error information generation unit operable to generate, as the inspection information, error information on the test pattern received by said data reception unit.

31. The display device according to claim 20, further comprising a cable in connection with said data reception related unit,
wherein the test signal is transmitted via said cable to said data reception related unit.

32. A receiver operable to output received video data to a display unit of a display device that is operable to display the video data, said receiver comprising:
a data reception related unit operable to receive the video data in a normal mode and to receive a test signal in a test mode;
an inspection unit operable to inspect said data reception related unit and to generate inspection information in the test mode; and
an inspection result image generation unit operable to generate image data indicating the inspection information,
wherein said inspection result image generation unit is operable to output the image data to said display unit in the test mode, and
wherein said display unit is operable to receive the video data received by said data reception related unit in the normal mode.

33. The receiver according to claim 32, further comprising:
a control signal reception unit operable to receive and process an external signal other than a test related signal via a component operable to receive the test related signal,
wherein said receiver is operable to operate in the test mode after said control signal reception unit receives a control signal for instructing a commencement of a test as the test related signal.

34. The receiver according to claim 33, further comprising a control signal transmission unit operable to transmit a signal other than a test related signal to the outside of said receiver via a component operable to transmit the test related signal.

35. The receiver according to claim 33, further comprising:
a display switching unit operable to receive the video data from said data reception related unit in the normal mode to output the video data to said display unit,
wherein in the test mode, said display switching unit is operable to receive the image data generated by said inspection result image generation unit to output the image data to said display unit in accordance with a control signal that is received by said control signal reception unit for instructing a display switchover, and,
wherein said display switching unit is operable to receive test video data as the test signal to output the test video data to said display unit.

36. The receiver according to claim 32, further comprising a display switching unit operable to receive the video data from said data reception related unit in the normal mode to output the video data to said display unit and to receive the image data generated by said inspection result image generation unit in the test mode to output the image data to said display unit.

37. The receiver according to claim 36, wherein in the test mode, said display switching unit is operable to superimpose the image data generated by said inspection result image generation unit onto the test signal inputted from said data reception related unit to thereby produce a signal, and is operable to subsequently output the signal to said display unit.

38. The receiver according to claim 37,
wherein said data reception related unit includes a data reception unit operable to receive the video data in the normal mode and to receive a test pattern as the test signal in the test mode,
wherein said inspection unit includes an error information generation unit operable to generate error information on the test pattern received by said data reception unit in the test mode, and
wherein said inspection result image generation unit is operable to generate image data indicating the error information generated by said error information generation unit.

39. The receiver according to claim 38,
wherein said data reception related unit further includes a phase locked loop unit operable to generate a timing signal in sync with a received clock signal in the normal mode, and to receive a clock signal containing jitter as the test signal in the test mode to generate a timing signal in sync with the received clock signal,
wherein said inspection unit further includes a malfunction information generation unit operable to generate malfunction information on said phase locked loop unit in the test mode, and
wherein said inspection result image generation unit is operable to generate image data indicating the malfunction information generated by said malfunction information generation unit.

40. The receiver according to claim 37,
wherein said data reception related unit includes a phase locked loop unit operable to generate a timing signal in sync with a received clock signal in the normal mode, and to receive a clock signal containing jitter as the test signal in the test mode to generate a timing signal in sync with the received clock signal,
wherein said inspection unit includes a malfunction information generation unit operable to generate malfunction information on said phase locked loop unit in the test mode, and
wherein said inspection result image generation unit is operable to generate image data indicating the malfunction information generated by said malfunction information generation unit.

41. The receiver according to claim 40,
wherein said data reception related unit further includes a data reception unit operable to receive the video data in sync with the timing signal based on the clock signal in the normal mode, and to receive a test pattern as the test signal in sync with the timing signal based on the clock signal containing the jitter in the test mode, and
wherein said inspection unit further includes an error information generation unit operable to generate, as the inspection information, error information on the test pattern received by said data reception unit in the test mode.

42. The receiver according to claim 32,
wherein said data reception related unit includes a data reception unit operable to receive the video data in the normal mode and to receive a test pattern as the test signal in the test mode,
wherein said inspection unit includes an error information generation unit operable to generate error information on the test pattern received by said data reception unit in the test mode, and
wherein said inspection result image generation unit is operable to generate image data indicating the error information generated by said error information generation unit.

43. The receiver according to claim 42,
wherein said data reception related unit further includes a phase locked loop unit operable to generate a timing signal in sync with a received clock signal in the normal mode, and to receive a clock signal containing jitter as the test signal in the test mode to generate a timing signal in sync with the received clock signal,
wherein said inspection unit further includes a malfunction information generation unit operable to generate malfunction information on said phase locked loop unit in the test mode, and
wherein said inspection result image generation unit is operable to generate image data indicating the malfunction information generated by said malfunction information generation unit.

44. The receiver according to claim 32,
wherein said data reception related unit includes a phase locked loop unit operable to generate a timing signal in sync with a received clock signal in the normal mode, and to receive a clock signal containing jitter as the test signal in the test mode to generate a timing signal in sync with the received clock signal,
wherein said inspection unit includes a malfunction information generation unit operable to generate malfunction information on said phase locked loop unit in the test mode, and
wherein said inspection result image generation unit is operable to generate image data indicating the malfunction information generated by said malfunction information generation unit.

45. The receiver according to claim 44,
wherein said data reception related unit further includes a data reception unit operable to receive the video data in sync with the timing signal based on the clock signal in the normal mode, and to receive a test pattern as the test signal in sync with the timing signal based on the clock signal containing the jitter in the test mode, and
wherein said inspection unit further includes an error information generation unit operable to generate, as the inspection information, error information on the test pattern received by said data reception unit in the test mode.

46. The receiver according to claim 32, further comprising a cable in communication with said data reception unit,
wherein the test signal is transmitted via said cable to said data reception related unit.

47. A receiver operable to output received video data to a display unit of a display device that is operable to display the video data, said receiver comprising:

a data reception related unit operable to receive the video data in a normal mode and to receive a test signal in a test mode;
an inspection unit operable to inspect said data reception related unit to generate inspection information in the test mode; and
a transmission unit operable to transmit the inspection information to the outside of said receiver,
wherein said data reception related unit is operable to receive image data indicating the inspection information from the outside of said receiver in the test mode,
wherein said display unit is operable to receive the image data indicating the inspection information that is received by said data reception related unit in the test mode, and
wherein said display unit is operable to receive the video data that is received by said data reception related unit in the normal mode.

48. The receiver according to claim 47, further comprising:
a control signal reception unit operable to receive and process an external signal other than a test related signal via a component operable to receive the test related signal,
wherein said receiver is operable to operate in the test mode after said control signal reception unit receives a control signal for instructing a commencement of a test as the test related signal,
wherein said transmission unit is a control signal transmission unit operable to transmit a test related signal to the outside of said receiver, and
wherein said transmission unit is operable to transmit a signal other than the test related signal to the outside of said receiver via a component operable to transmit the test related signal to the outside of said receiver.

49. The receiver according to claim 47, wherein in the test mode, said data reception related unit is operable to receive external image data generated by a superimposition of the image data indicating the inspection information on the test signal and is operable to subsequently output the received image data to said display unit.

50. The receiver according to claim 49,
wherein said data reception related unit includes a data reception unit operable to receive the video data in the normal mode and to receive a test pattern as the test signal in the test mode,
wherein said inspection unit includes an error information generation unit operable to generate error information on the test pattern received by said data reception unit in the test mode, and
wherein said transmission unit is operable to transmit the error information generated by said error information generation unit as the inspection information to the outside of said receiver.

51. The receiver according to claim 50,
wherein said data reception related unit further includes a phase locked loop unit operable to generate a timing signal in sync with a received clock signal in the normal mode, and to receive a clock signal containing jitter as the test signal in the test mode to generate a timing signal in sync with the received clock signal,
wherein said inspection unit further includes a malfunction information generation unit operable to generate malfunction information on said phase locked loop unit in the test mode, and wherein said transmission unit is operable to transmit the malfunction information generated by said malfunction information generation unit to the outside of said receiver.

52. The receiver according to claim 49,
wherein said data reception related unit includes a phase locked loop unit operable to generate a timing signal in sync with a received clock signal in the normal mode, and to receive a clock signal containing jitter as the test signal in the test mode to generate a timing signal in sync with the received clock signal,
wherein said inspection unit includes a malfunction information generation unit operable to generate malfunction information on said phase locked loop unit in the test mode, and
wherein said transmission unit is operable to transmit the malfunction information generated by said malfunction information generation unit to the outside of said receiver.

53. The receiver according to claim 52,
wherein said data reception related unit further includes a data reception unit operable to receive the video data in sync with the timing signal based on the clock signal in the normal mode, and to receive a test pattern as the test signal in sync with the timing signal based on the clock signal containing the jitter in the test mode, and
wherein said inspection unit further includes an error information generation unit operable to generate, as the inspection information, error information on the test pattern received by said data reception unit in the test mode.

54. The receiver according to claim 47,
wherein said data reception related unit includes a data reception unit operable to receive the video data in the normal mode and to receive a test pattern as the test signal in the test mode,
wherein said inspection unit includes an error information generation unit operable to generate error information on the test pattern received by said data reception unit in the test mode, and
wherein said transmission unit is operable to transmit the error information generated by said error information generation unit as inspection information to the outside of said receiver.

55. The receiver according to claim 54,
wherein said data reception related unit further includes a phase locked loop unit operable to generate a timing signal in sync with a received clock signal in the normal mode, and to receive a clock signal containing jitter as the test signal in the test mode to generate a timing signal in sync with the received clock signal,
wherein said inspection unit further includes a malfunction information generation unit operable to generate malfunction information on said phase locked loop unit in the test mode, and
wherein said transmission unit is operable to transmit the malfunction information generated by said malfunction information generation unit to the outside of said receiver.

56. The receiver according to claim 47,
wherein said data reception related unit includes a phase locked loop unit operable to generate a timing signal in sync with a received clock signal in the normal mode, and to receive a clock signal containing jitter as the test signal in the test mode to generate a timing signal in sync with the received clock signal,
wherein said inspection unit includes a malfunction information generation unit operable to generate malfunction information on said phase locked loop unit in the test mode, and
wherein said transmission unit is operable to transmit the malfunction information generated by said malfunction information generation unit to the outside of said receiver.

57. The receiver according to claim 56,
wherein said data reception related unit includes a data reception unit operable to receive the video data in sync with the timing signal based on the clock signal in the normal mode, and to receive a test pattern as the test signal in sync with the timing signal based on the clock signal containing the jitter in the test mode, and
wherein said inspection unit includes an error information generation unit operable to generate, as the inspection information, error information on the test pattern received by said data reception unit in the test mode.

58. The receiver according to claim 47, further comprising a cable in communication with said data reception unit,
wherein the test signal is transmitted via said cable to said data reception related unit.

59. A test apparatus operable to test a display device, said test apparatus comprising:
a control signal transmission unit operable to transmit a control signal for instructing a commencement of a test to the display device;
a control unit operable to command said control signal transmission unit to transmit the control signal for instructing the commencement of the test to the display device;
a test signal generation unit operable to generate a test signal; and
a test signal transmission unit operable to transmit the test signal to the display device,
wherein said test signal generation unit includes a clock signal generation unit operable to generate a clock signal and a jitter signal generation unit operable to generate a jitter signal, and
wherein said test signal transmission unit includes a phase modulation unit operable to superimpose the jitter signal onto the clock signal to generate a clock signal containing jitter and to subsequently transmit the clock signal containing the jitter as the test signal to said display device.

60. The test apparatus according to claim 59,
wherein said test signal generation unit further includes a test pattern generation unit operable to generate a test pattern as the test signal,
wherein said test signal transmission unit further includes a data transmission unit operable to transmit the test pattern to said display device, and
wherein said test pattern generation unit is operable to output the test pattern to said data transmission unit in sync with the clock signal containing the jitter generated by said phase modulation unit.

61. A test apparatus operable to test a display device, said test apparatus comprising:
a control signal transmission unit operable to transmit a control signal for instructing a commencement of a test to the display device;
a control unit operable to command said control signal transmission unit to transmit the control signal for instructing the commencement of the test to the display device;

a test signal generation unit operable to generate a test signal;

a test signal transmission unit operable to transmit the test signal to the display device;

a receiving unit operable to receive from the display device, inspection information on the display device, after the display device has received the test signal;

an inspection information storage unit operable to store the inspection information received by said receiving unit; and an inspection result image generation unit operable to acquire the inspection information from said inspection information storage unit to generate image data indicating the inspection information, wherein the test signal transmission unit transmits the image data generated by said inspection result image generation unit to said display device, wherein said test signal generation unit comprises a test video data generation unit operable to generate test video data as the test signal and a superimposition unit operable to superimpose the image data generated by said inspection result image generation unit onto the test video data to thereby produce a signal, and to output the signal to said test signal transmission unit, and wherein said test signal transmission unit is operable to transmit the signal produced by said superimposition to the display device.

62. A test apparatus operable to test a display device, said test apparatus comprising:

a control signal transmission unit operable to transmit a control signal for instructing a commencement of a test to the display device;

a control unit operable to command said control signal transmission unit to transmit the control signal for instructing the commencement of the test to the display device;

a test signal generation unit operable to generate a test signal;

a test signal transmission unit operable to transmit the test signal to the display device;

a receiving unit operable to receive from the display device, inspection information on the display device, after the display device has received the test signal;

an inspection information storage unit operable to store the inspection information received by said receiving unit; and an inspection result image generation unit operable to acquire the inspection information from said inspection information storage unit to generate image data indicating the inspection information, wherein the test signal transmission unit transmits the image data generated by said inspection result image generation unit to said display device, wherein said test signal generation unit includes a clock signal generation unit operable to generate a clock signal and a jitter signal generation unit operable to generate a jitter signal, and wherein said test signal transmission unit includes a phase modulation unit operable to superimpose the jitter signal on the clock signal to generate a clock signal containing jitter and to subsequently transmit the clock signal containing the jitter as the test signal to the display device.

63. The test apparatus according to claim 62, wherein said test signal generation unit further includes a test pattern generation unit operable to generate a test pattern as the test signal, wherein said test signal transmission unit further includes a data transmission unit operable to transmit the test pattern to said display device, and wherein said test pattern generation unit is operable to output the test pattern to said data transmission unit in sync with the clock signal containing the jitter generated by said phase modulation unit.

* * * * *